(12) United States Patent
Weder

(10) Patent No.: US 7,958,702 B2
(45) Date of Patent: *Jun. 14, 2011

(54) FLORAL EASEL

(75) Inventor: Donald E. Weder, Highland, IL (US)

(73) Assignee: Wanda M. Weder and William F. Straeter, Highland, IL (US), not individually, but as Trustees of The Family Trust U/T/A dated December 8, 1995

( * ) Notice: Subject to any disclaimer, the term of this patent is extended or adjusted under 35 U.S.C. 154(b) by 0 days.

This patent is subject to a terminal disclaimer.

(21) Appl. No.: 12/287,170

(22) Filed: Oct. 7, 2008

(65) Prior Publication Data

US 2009/0065654 A1    Mar. 12, 2009

Related U.S. Application Data

(60) Continuation of application No. 12/150,258, filed on Apr. 25, 2008, now Pat. No. 7,707,806, which is a continuation of application No. 10/973,861, filed on Oct. 26, 2004, now Pat. No. 7,426,813, which is a division of application No. 10/970,979, filed on Oct. 22, 2004.

(60) Provisional application No. 60/572,149, filed on May 18, 2004.

(51) Int. Cl.
*B65B 1/04* (2006.01)

(52) U.S. Cl. .................. 53/473; 53/474; 47/39

(58) Field of Classification Search ............ 248/464, 248/465, 465.1, 434, 168, 170, 440, 175, 248/27.8, 423, 756, 764; 47/39; 53/473
See application file for complete search history.

(56) References Cited

U.S. PATENT DOCUMENTS

| | | | |
|---|---|---|---|
| 1,359,026 A | 11/1920 | Briggs | |
| 1,417,490 A | 5/1922 | Brandon | |
| 1,421,595 A | 7/1922 | Smith | |
| 1,806,454 A | 5/1931 | Goudeau | |
| 2,035,288 A | 3/1936 | Aughtry | |
| 2,289,729 A * | 7/1942 | Robinson et al. | 248/27.8 |
| 2,733,881 A | 2/1956 | Threlfall | |
| 2,940,705 A | 6/1960 | Lotz | |
| 3,148,850 A | 9/1964 | Johnson | |
| 3,481,075 A | 12/1969 | Dastoli et al. | |
| 3,544,051 A * | 12/1970 | Norman | 248/155 |
| D221,970 S | 9/1971 | Kelly | |
| D285,754 S | 9/1986 | Beaty | |
| 4,695,021 A | 9/1987 | Leinfelder | |
| 4,941,283 A | 7/1990 | Armstrong | |
| D392,141 S | 3/1998 | Cavanaugh | |
| D435,177 S | 12/2000 | Buell et al. | |
| 6,322,026 B1 | 11/2001 | Ju | |

OTHER PUBLICATIONS

Southern Steel and Wire Company, Inc., Floral Supply Syndicate, Sympathy Design Books, Wire Easels,2004, p. 143. See also photograph of Wire Easel—Exhibits A-B.
H.O. Norman Company, Floral Supply Syndicate, Sympathy Design Books, Wood Easels, 2004, p. 143. See also photographs of H.O. Norman Company Wood Easel—Exhibits C-H.
Miller Floral Supply, Wholesale Price List 2004, Wood Easel. See also photograph of Miller Floral Supply Wood Easel—Exhibits I-J.
Source Unknown, Photographs taken at Ohio State Florist Association, Columbus, Ohio, Jul. 2004, Flexible molded plastic member for accepting three bamboo sticks serving as a trellis—Exhibits K-N.

* cited by examiner

*Primary Examiner* — A. Joseph Wujciak, III
(74) *Attorney, Agent, or Firm* — Dunlap Codding, P.C.

(57) ABSTRACT

The present invention relates to an erectable and/or collapsible floral easel for holding a floral object, and more particularly but not by way of limitation, to an erectable or collapsible floral easel for holding a floral object. In one aspect, the present invention relates to a floral easel for holding and/or supporting a floral object. In yet another aspect, the present invention relates to methods of shipping a floral easel, methods of using a floral easel, methods of storing a floral easel, and methods of placing a floral object on a floral easel.

8 Claims, 52 Drawing Sheets

//FLORAL EASEL

CROSS REFERENCE TO RELATED APPLICATIONS

The present application is a continuation of U.S. Ser. No. 12/150,258, filed Apr. 25, 2008; now U.S. Pat. No. 7,707,806 which is a continuation of U.S. Ser. No. 10/973,861, filed Oct. 26, 2004, now U.S. Pat. No. 7,426,813, issued Sep. 23, 2008; which is a divisional of U.S. Ser. No. 10/970,979, filed Oct. 22, 2004; which claims benefit under 35 U.S.C. 119(e) of U.S. Provisional Application Ser. No. 60/572,149, filed May 18, 2004. The entire contents of each of the above-referenced patents and patent applications are hereby expressly incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to a floral easel for holding a floral object, and more particularly but not by way of limitation, to an erectable or collapsible floral easel for holding a floral object. In one aspect, the present invention relates to a floral easel for holding and/or supporting a floral object. In yet another aspect, the present invention relates to methods of shipping a floral easel, methods of using a floral easel, methods of storing a floral easel, and methods of placing a floral object on a floral easel.

2. Description of the Related Art

Easels have previously been used in industries such as, for example, art, photography, music, education, framing and the like to support and display designated items. These non-floral easels are expensive to fabricate and unsuitable for use as a floral easel. In the floral industry, floral easels are usually constructed of wood or non-wood materials, such as, for example, steel. Such floral easels are usually cumbersome and difficult to ship, transport, and store in that they do not have the ability to readily fold into a position that is compact and easily manageable. Typically, for example, at least two legs of current floral easels are in an open, fixed (erected) position making it impossible to fold the floral easel into a compact bundle for transportation. Currently, florists attach floral arrangements to wood or non-wood floral easels by affixing the floral arrangement to the two legs that are in the open, fixed (erect) position and transport the easels with only a third leg being collapsed. After a funeral visitation or service in the funeral home or chapel, the only collapsible leg of the current floral easel is collapsed while the other legs remain in the open and erect position. The easel is then transported to the cemetery where the collapsible leg is again erected, usually with the legs pressed several inches into the soil for anchoring purposes. The display is used again during a grave side service or as a decoration at the grave site after the service. These non-wood floral easels are frequently transported to various ceremonies and discarded after the ceremony. The transportability of current non-wood floral easels is therefore not maximized because of the bulky nature of these easels, and recyclability of current non-wood floral easels is poor due to the bulky nature of current non-wood floral easels.

Further, shipping and/or freight costs currently reflect the cumbrous nature of shipping current non-wood floral easels. For example, depending on the freight zone, freight costs may range from 9.26% to 36.14% of the total manufacturing costs. This is because current non-wood floral easels are produced in a factory and shipped to a designated location with two of the three legs fixed in the erected position with only one of the legs being collapsible. Shipping these types of floral easels is costly due to the large amount of space the current floral easel requires because of its inability to fully collapse into a bundle. A floral easel that is fully or partially collapsible would dramatically decrease shipping costs; for example, fully or partially collapsible non-wood floral easels may reduce freight costs by up to 75% when compared to the freight costs of current non-wood floral easels.

Warehousing space must also be maximized to accommodate storage of such floral easels. For example, when arriving at a distributorship or flower shop, current non-wood floral easels require the manufacturer, distributor or florist to provide an excessive and unnecessary amount of storage space for the easel which is attributed to the inability of the floral easel to fully collapse. Also, the reuse of current non-wood floral easels by florists is poor or even non-existent due to the extreme difficulty of packing and transporting the easels.

Current wood floral easels are typically bulkier than non-wood floral easels and require more space even when the current wood floral easel is in a partially collapsed or fully collapsed position. Furthermore, wood is a scarce natural resource and alternative materials are more readily available for the construction of floral easels. Current wood floral easels are subject to warping upon continued use, especially when storing. These easels must be stored in a careful manner, avoiding exposure to certain conditions and must be disposed in a flat plane because of a tendency to conform to a non-linear plane. Current wood floral easels are also subject to insect infestation which requires irradiation when importing (or otherwise be subject to recall), and subject to splintering making the current wood floral easel difficult to transport in commerce as well as difficult to use and re-use. The wood of current wood floral easels must also be treated to provide the desired surface conditions (i.e., for sanding or painting) making the material prohibitively expensive when compared to other non-wood materials from which the floral easel could be constructed. Current wood floral easels also require assembly as well as articulation among the legs.

It is to this end that there is a need in the industry for a fully or partially erectable or collapsible floral easel that overcomes the disadvantages and defects of current floral easels and that is compact, easily transportable, less expensive to ship and store, and is fully reuseable. It is to such a floral easel that the present invention is directed.

SUMMARY OF THE INVENTION

The present invention is directed to a fully or partially erectable or collapsible floral easel for holding a floral object having at least two leg members, each of the leg members having a first end and a second end, the first end of each of the leg members being associated at a joining assembly, wherein the leg members are moveable from an open position to a second position wherein the leg members occupy a lesser volume of space in the second position and further wherein the at least two legs are self-erecting from the second position to the open position and a splay assembly capable of holding the leg members in the open position. The floral easel of the present invention may be self-erecting, self-collapsing, self-erecting and self-collapsing, semi-self-erecting, semi-self-collapsing and/or semi-self-erecting and semi-self-collapsing. Additionally, the present invention relates to methods of shipping an erectable or collapsible floral easel, methods of using an erectable or collapsible floral easel, methods of storing an erectable or collapsible floral easel, methods of placing a floral object on an erectable or collapsible easel, and methods of displaying a floral object on or about an erectable or collapsible floral easel.

DETAILED DESCRIPTION OF THE INVENTION

Figure 1A:
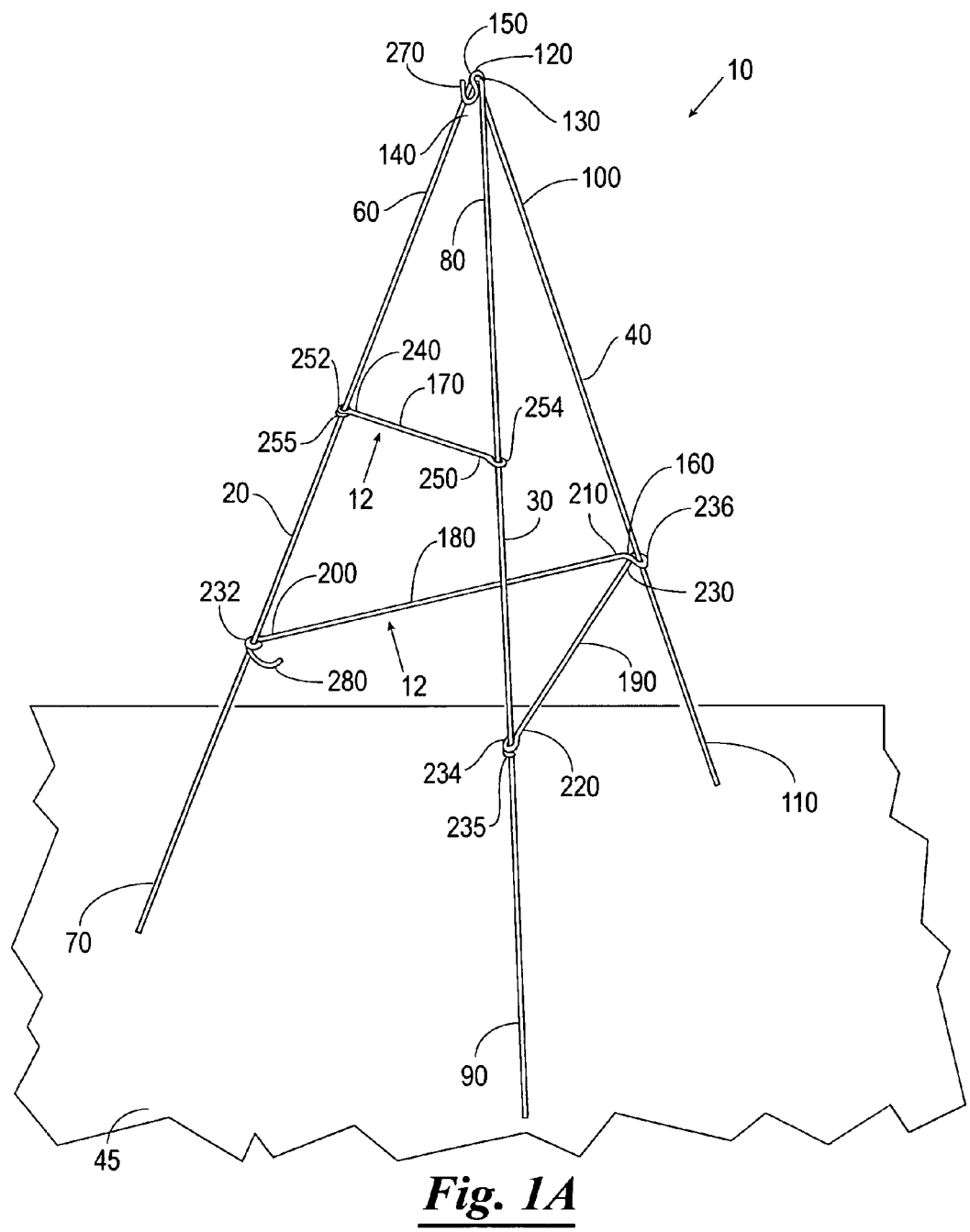
FIG. 1A is a perspective view of the erectable or collapsible floral easel of the present invention in the open position.

It is to be understood that the invention is not limited in its application to the details of construction and the arrangements of the components set forth in the following description or illustrated in the drawings. The invention is capable of other embodiments or of being practiced or carried out in various ways which would be plain to one of ordinary skill in the art given the present specification, drawings and claims appended hereto. Also, it is to be understood that the phraseology and terminology employed herein is for purpose of description and should not be regarded as limiting and the claimed invention should be given its broadest possible meaning consistent with the terms and phrasing used in the claims.

Description of FIG. 1

Figure 1B:
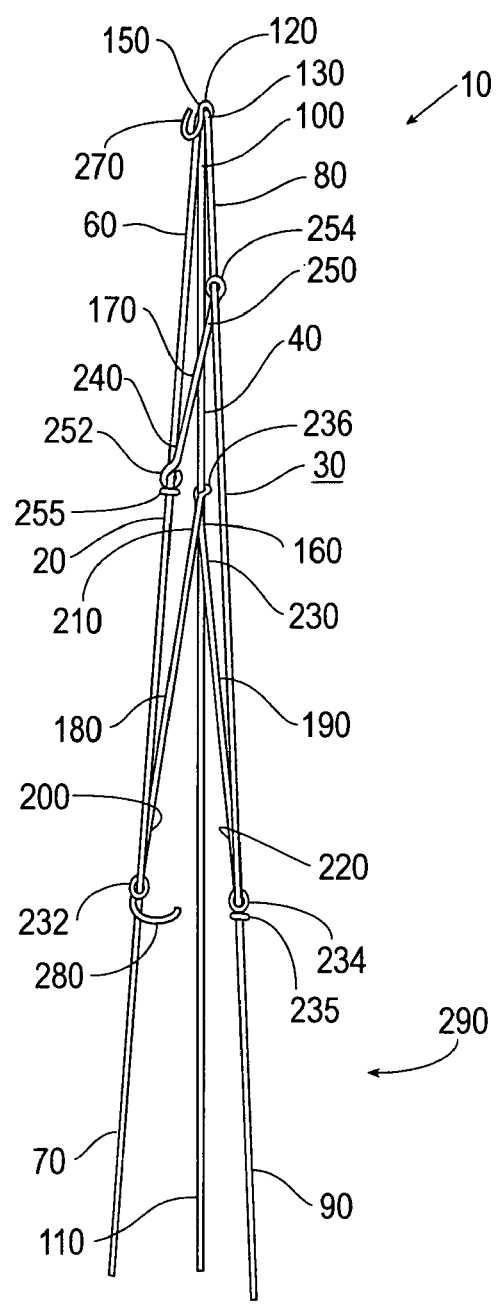
FIG. 1B is a perspective view of the erectable or collapsible floral easel of the present invention in the closed position.

Referring now to FIGS. 1A and 1B, designated generally by the reference numeral 10 is a floral easel. All of the embodiments of the floral easel 10 described herein may be fully erectable and/or collapsible, semi-erectable and/or semi-collapsible, semi-self-erectable and/or semi-self-collapsible, and combinations thereof. Further, all of the embodiments of the floral easel 10 described herein may be erectable without being collapsible and vice-versa. The term "erectable", "erect", or "open" as used herein means that the floral easel 10 is deployed fully for use as intended, i.e., the display of a floral object. The term "collapsible", "collapsed", or "closed" as used herein means that the floral easel 10 is positioned such that at least one of the plurality of leg members are capable of being in or are in a fully or partially collapsed position. The term "fully erectable" as used herein means that at least one of the plurality of leg members are capable of being in or are positioned in the open position. The term "partially erectable" or "semi-erectable" as used herein means that one of the plurality of leg members of the floral easel is in a fully erected position or any number of the plurality of leg members are in a partially erected position. The floral easel 10 may be fully or partially collapsible. The term "fully collapsible" as used herein means that at least one of the plurality of leg members are capable of being positioned in the fully collapsed position. The term "partially collapsible" or "semi-collapsible" as used herein means that one of the plurality of leg members is in a fully collapsed position or any number of the plurality of leg members are in a partially collapsed position. Also, in one embodiment, the floral easel 10 may be reversibly erectable or irreversibly erectable. It should also be understood that the floral easel 10 may only be capable of erecting yet not collapsing, collapsing yet not erecting, and erecting and collapsing.

Figure 1C:
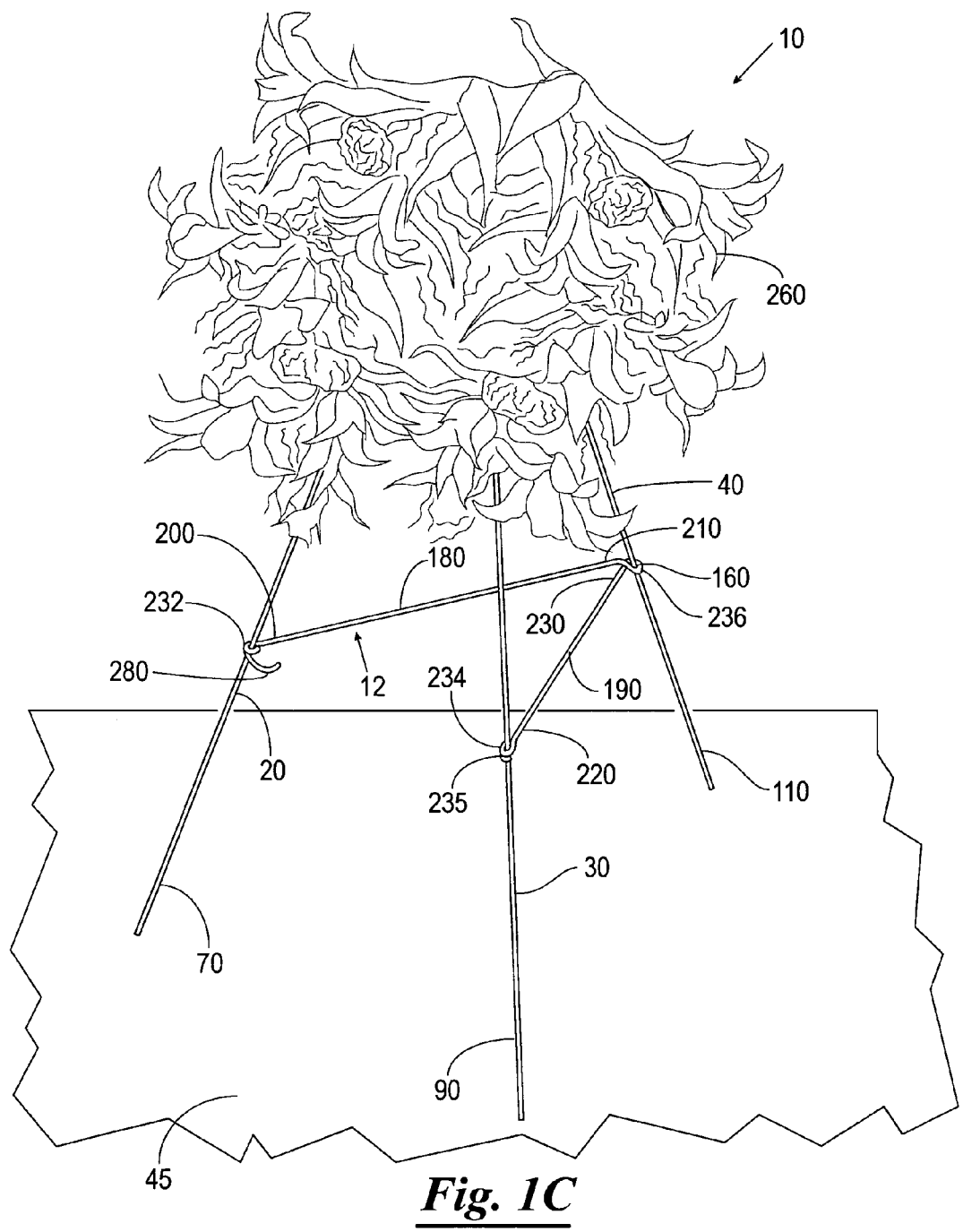
FIG. 1C is a perspective view of the erectable or collapsible floral easel of the present invention in the open position having a floral object placed thereon.

The floral easel 10 has a plurality of leg members and, in one embodiment shown in FIGS. 1A-1C, the floral easel 10 has a first leg member 20, a second leg member 30, and a third leg member 40. The floral easel 10 also includes a splay assembly 12 for sustaining the floral easel 10 in an open or erected position as shown in FIG. 1A.

As shown in FIGS. 1A-1C, the first leg member 20 has a first end 60 and a second end 70. The second leg member 30 has a first end 80 and a second end 90. The third leg member 40 has a first end 100 and a second end 110. The first end 60 of the first leg member 20, the first end 80 of the second leg member 30, and the first end 100 of the third leg member 40 are associated at a joining member 120. The second end 70 of the first leg member 20, the second end 90 of the second leg member 30, and the second end 110 of the third leg member 40 are generally in contact with a substrate 45 to thereby support and hold the floral easel 10 in a position suitable for use as a display for a floral object. The substrate 45 may be any surface such as, for example, a floor, dirt, grass, fiber, plastic, tile, carpet, combinations thereof, or any surface capable of supporting floral easel 10 thereon.

All embodiments of the floral easel 10 described herein could be used with or without anchoring materials known in the art to prevent the floral easel 10 from moving or tipping. Examples of anchoring materials include, but are not limited to, adhesive, cohesive, spikes (metal or plastic), rubber feet or pads, combinations thereof, or any other materials capable of anchoring the floral easel 10 to the substrate 45. The anchoring material may be formed integrally or non-integrally with the floral easel 10 and may be constructed of the same or different material as the floral easel 10.

In all of the embodiments of the floral easel 10 described herein, the leg members may be constructed of any material such as, for example, steel rod (tubular, flat, or profile shaped) and/or wire (coated or uncoated), aluminum rod (tubular, flat, or profile shaped) and/or wire (coated, anodized or uncoated), stainless steel rod (flat or profile shaped) and/or wire (coated or uncoated), plastic pieces of material having cylindrical, tubular, triangular, square, rectangular, polygonal, or other profile shapes or cross-sections of profile shapes, hollow, tubular or profile shaped materials made of metals or polymers, solid or hollow wood, synthetic or man-made materials, natural materials, or any other suitable material. In a preferred embodiment, at least a portion of at least one of the leg members and/or the joining member 120 is constructed of a substantially flexible material, i.e., at least a portion of at least one of the leg members is capable of bending. The leg members may have any size diameter, width, or profile dimensions and/or any length that is desired and useful for the particular use the floral easel 10 is put. In general, however, the floral easel 10 will have a height of from about ½" to 300", more preferably a height from about 10" to about 60", and most preferably a height from about 18" to about 36".

At least two of the first leg member 20, the second leg member 30, and the third leg member 40 may be formed as a single piece of material that is integrally connected (shown in FIGS. 1A and 1B as one piece of tubular material forming an arch 130 having a center area 140). Alternatively, the first leg member 20 and the second leg member 30 may be formed of two or more pieces of material. If the first leg member 20 and the second leg member 30 are formed of two or more pieces of material, the materials may differ or the materials may be the same. For example, if the first leg member 20 and the second leg member 30 are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20, the second leg member 30, and the third leg member 30 may be integrally connected. The plurality of leg members may be constructed of the same material or a different material. For example, at least one of the plurality of leg members may be constructed of steel and the other leg members may be constructed of aluminum.

The joining member 120 for connecting and/or receiving the first end of the leg members may be formed of the same material as the leg members or the joining member 120 may be formed of a different material than the leg members. Also, the joining member 120 may be integrally connected to the first end 100 of the third leg member 40 or formed separately from the first end 100 of the third leg member 40. As shown in FIGS. 1A and 1B, the joining member 120 is integrally connected to the first end 100 of the third leg member 40 and is crimped around and pivotally connected to the arch 130 formed in the center area 140 thereby integrally joining the first end 60 of the first leg member 20 and the first end 70 of the second leg member 30 to define an apex 150. In an alternative embodiment, the joining member 120 need not be integrally connected to the first end 100 of the third leg member 40, and alternatively, the joining member 120 may be welded, clamped, glued, or any other method of connecting the joining member 120 to the first end of each of the leg members. The joining member 120 may also be, for example, a solid block holding device (as shown in FIGS. 11A-11D), or any other device capable of receiving the first ends of the leg members. Also, the first end 100 of the third leg 40 need not be crimped around the arch 130. In an alternative embodiment, the joining member 120 and the arch 130 are connected using materials that permit the floral easel 10 to erect and/or collapse. Also, the first end 100 of the third leg 40 need not be pivotally connected to the arch 130. In an alternative embodiment, the first end 100 may be flexibly connected to the arch 130.

The splay assembly 12 for sustaining the floral easel 10 in the open or erected position has a bracing assembly 160 and a reinforcing member 170. It should be understood that the splay assembly 12 may be formed separately from the legs or the splay assembly 12 may be integrally connected to the legs. Alternatively, the bracing assembly 160 may be formed non-integrally from the legs and the reinforcing member 170 may be formed integrally with the legs or vice-versa. The bracing assembly 160 has a first arm 180 and a second arm 190. The first arm 180 has a first end 200 and a second end 210. The second arm 190 has a first end 220 and a second end 230. The first end 200 of the first arm 180 is connected to the first leg member 20. The first end 220 of the second arm 190 is connected to the second leg member 30. The second end 210 of the first arm 180 and the second end 230 of the second arm 190 are connected to the third leg member 40. In the embodiment shown in FIGS. 1A-1C, the bracing assembly 160 is constructed of one continuous piece of material. The first end 200 of the first arm 180 forms a loop 232 around the first leg member 20 and is slidably connected to the first leg member 20, the first end 220 of the second arm 190 forms a loop 234 around the second leg member 30 and is slidably connected to the second leg member 30, the second end 210 of the first arm 180 and second end 230 of the second arm 190 form a contiguous loop 236 around the third leg member 40 and the loop 236 is slidably and pivotally connected to the third leg member 40. It will be appreciated, however, that the first arm 180 and the second arm 190 may be connected to the leg members in any manner as long as the leg members are able to fully collapse.

The bracing assembly 160 may be a single piece of material, or more than one piece of material. For example, as shown in FIGS. 1A-1C, the bracing assembly 160 is a single piece of material wherein the second end 210 of the first arm 180 and the second end 230 of the second arm 190 form a continuous loop around the third leg member 40 wherein the looped area is slidably and pivotally connected to the third leg member 40. If the bracing assembly 160 is fabricated using sufficiently flexible and springy material, it need not be slidably or pivotally connected to any or all of the plurality of leg members.

The bracing assembly 160 may be constructed of the same material as the leg members or the bracing assembly 160 may be constructed of a different material than the leg members as long as the material allows the bracing assembly 160 to sustain the floral easel 10 in the open or erected position.

If the third leg 40 is not pivotally connected to at least one of the first leg 20 and the second leg 30, or, if the third leg 40 is pivotally connected to at least one of the first leg 20 and the second leg 30 limiting its travel to positions of full erection, full collapse, or intermediate positions; and, if the first leg 20 and the second leg 30 are connected to limit travel to positions from full erection to full collapse, then at least one of the bracing assembly 160 and reinforcing member 170 can be eliminated from this embodiment of the floral easel 10.

A stop member 235 may be connected adjacent and underneath the second arm 190 of the bracing assembly 160 to prevent the bracing assembly 160 from sliding down the second leg member 30 of the floral easel 10. The stop member 235 may be constructed of the same material as the leg member or of a different material than the leg member. In the embodiment shown in FIG. 1A, the stop member 235 is a horizontal cross-piece connected adjacent and below the second arm 190 of the bracing assembly 160. However, the stop member 235 may be connected to any of the leg members of the floral easel 10. It should be understood that the stop member 235 is not required; however, for embodiments in which the bracing assembly 160 is slidably or pivotally connected to at least one leg member, the stop member 235 aids in the erection and enhances the stability of the floral easel 10.

The reinforcing member 170 has a first end 240 and a second end 250. The first end 240 is connected to the first leg member 20 and the second end 250 is connected to the second leg member 30. In the embodiment shown in FIG. 1, the first end 240 forms a loop 252 around the first leg member 20 and is slidably connected to the first leg member 20 and the second end 250 forms a loop 254 around the second leg member 30 and is slidably connected to the second leg member 30. It will be appreciated, however, that the first end 240 and the second end 250 may be connected in any manner to the first leg member 20 and second leg member 30 of the floral easel 10.

For example, but not by way of limitation, the reinforcing member 170 may be selected from the group consisting of elastic, a rope, a cord, a chain, a strap, a cable, a wire, springs, tubing, plastic, profiles, wood, polymer/fiber, adhesive, cohesive, velcro, combinations thereof or any other device which allows the floral easel 10 to be sustained in the open or erected position. The reinforcing member 170 may also be constructed of the same material as the leg members or the reinforcing member 170 may be constructed of a different material than the leg members as long as the material allows the reinforcing member 170 to sustain the floral easel 10 in the open or erected position. It will be appreciated, however, that the reinforcing member 170 is not necessary in alternate embodiments where a more flexible floral easel 10 is desirable or acceptable for use.

A stop member 255 may also be connected to the first leg member 20 of the floral easel 10 and placed adjacent and underneath the first end 240 of the reinforcing member 170 for preventing the reinforcing member 170 from sliding down the first leg member 20 of the floral easel 10. However, it should be understood that the stop member 235 may be placed on either the first leg member 20 or the second leg member 30 of the floral easel 10. The stop member 255 may be constructed of the same material as the designated leg member or of a different material than the designated leg member. In the embodiment shown in FIG. 1A, the stop member 255 is a horizontal cross-piece connected adjacent and below the first end 240 of the reinforcing member 170. However, the stop member 255 may be connected to either the first leg member 20, the second leg member 30, the third leg member 40 or any of the first leg member 20, the second leg member 30, and the third leg member 40 of the floral easel 10. It should be understood that multiple stop members may be used on the floral easel. It should also be understood that the stop members are not necessary to the erection, collapsibility, or stability of the floral easel 10; however, the stop members may enhance stability and facilitate erection of the floral easel 10. The reinforcing member 170 may also provide at least one location on the floral easel 10 to which floral objects and decorations may be fastened using wire clips, glue or any other fastening means capable of securing floral objects and decorations to the floral easel 10.

In all of the embodiments of the floral easel described herein, the floral easel 10 may be employed to hold and/or support a floral object 260 (FIG. 1C) by placing the floral object 260 about the apex 150 of the floral easel 10. The term "floral object" as used herein will be understood to include any floral object which can be placed on a floral easel such as, but not limited to, a floral grouping, a floral decoration, a wreath, hanging potted plants, foam shapes (for example, a cross, words (i.e., mom), a flag), non-floral objects such as, for example, a photograph, a piece of artwork, a flag or any other object that is capable of being displayed on a floral easel.

The term "floral grouping" as used herein refers to a single flower, foliage, a botanical item, a propagule, cut flowers, and/or other fresh and/or artificial plants or floral materials, including secondary plants, growing potted plants having a root portion and/or other ornamentation which adds to the aesthetic qualities of the overall floral grouping. The term "floral grouping" as used herein may also refer to a "floral grouping", as defined above, which is disposed within a pot or a flower pot.

A support member 270 (FIGS. 1A and 1B) may also be employed to hold and/or support the floral object 260 (or non-floral object), however, any portion of the floral easel 10 may hold or support the floral object 260 or non-floral object, such as, for example, the joining member 120, the bracing assembly 160, the reinforcing member 170 or any other area of the floral easel 10 capable of supporting the floral object 260 or a non-floral object. The support member 270 may be connected to any area of the floral easel 10 such as, for example, the joining member 120, the leg members, or to the reinforcing member 170. The support member 270 may be any kind of device capable of supporting the floral object 260. For example, but not by way of limitation, the support member 270 may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object 260. The support member 270, as shown in FIG. 1, is a hook connected to the joining member 120.

The support member 270 may be constructed of the same material as the leg members or the support member 270 may be constructed of a different material than the leg members as long as the material is capable of holding and/or supporting the floral object 260.

All of the embodiments of the floral easel 10 described herein may also have a retaining member 280 for retaining the leg members in the collapsed position. For example, but not by way of limitation, the retaining member 280 may be selected from the group consisting of elastic, a clip or clips, a spring, a band, shrink material, stretch material, the joining member 120, a carton, a tube, a bend in the leg members, a groove, a slot, a loop, a hook, a wire, a bow, a rope, a magnet, a cord, a chain, a strap, a cable, adhesive, combinations thereof, or any other device capable of retaining the leg members in the collapsed position. The retaining member 280 may also be constructed of the same material as the leg members or the retaining member 280 may be constructed of a different material than the leg members as long as the material is capable of retaining the leg members in the collapsed position. Alternatively, the retaining member 280 may be eliminated from the floral easel 10 and the plurality of leg members may be retained in the collapsed position by the joining member 120.

As shown in FIG. 1, the retaining member 280 is connected to the first leg member 20; however, for example, the retaining member 280 may be attached to any of the leg members, the bracing assembly 160, the reinforcing member 170, or to any other area of the floral easel 10 that is suitable for connecting the retaining member 280 or may be a separate device unconnected to the floral easel 10.

To move the floral easel 10 from the open or erected position (shown in FIG. 1A) to the collapsed position (shown in FIG. 1B), the bracing assembly 160 is rotated about the loop 232 and the loop 234 to cause the loop 236 to slide in an upward direction toward the first end 100 of the third leg member 40 thereby pivoting the third leg member 40 inward toward the area between the first leg member 20 and the second leg member 30. The reinforcing member 170 is also moved in an upward direction to cause the loop 254 of the second end 250 of the reinforcing member 170 to slide in an upward manner along the first end 100 of the second leg member 30. The first end 60 of the first leg member 20 and the first end 80 of the second leg member 30 are compressed together thereby decreasing the angle formed at the arch 130 between the center area 140 of the first leg member 20 and the second leg member 30. The second end 70, the second end 90, and the second end 110 may then be inserted into the retaining member 280 forming the leg members into a bundle 290 (shown in FIG. 1B).

While methods of collapsing and methods of erecting the floral easel have been described herein, it is to be understood that other methods of collapsing the easels of the present invention will be evident to a person having ordinary skill in the art and therefore, such additional methods of collapsing and methods of erecting the floral easel are also within the scope of the present invention.

It is also to be understood that the present invention also encompasses any embodiments described herein or modifications thereof with the skill of a person in the art. For example, any of the embodiments of the floral easel described herein may be self-erecting, self-collapsing, self-erecting and self-collapsing, semi-self-erecting, semi-self-collapsing, or semi-self-erecting and semi-self-collapsing. Also, any of the embodiments of the present invention described herein may be made so that no more than one assembly must be accomplished to maintain the easel in the erect position, semi-erect position, collapsed position, or semi-collapsed position.

Description of FIG. 2

Figure 2A:
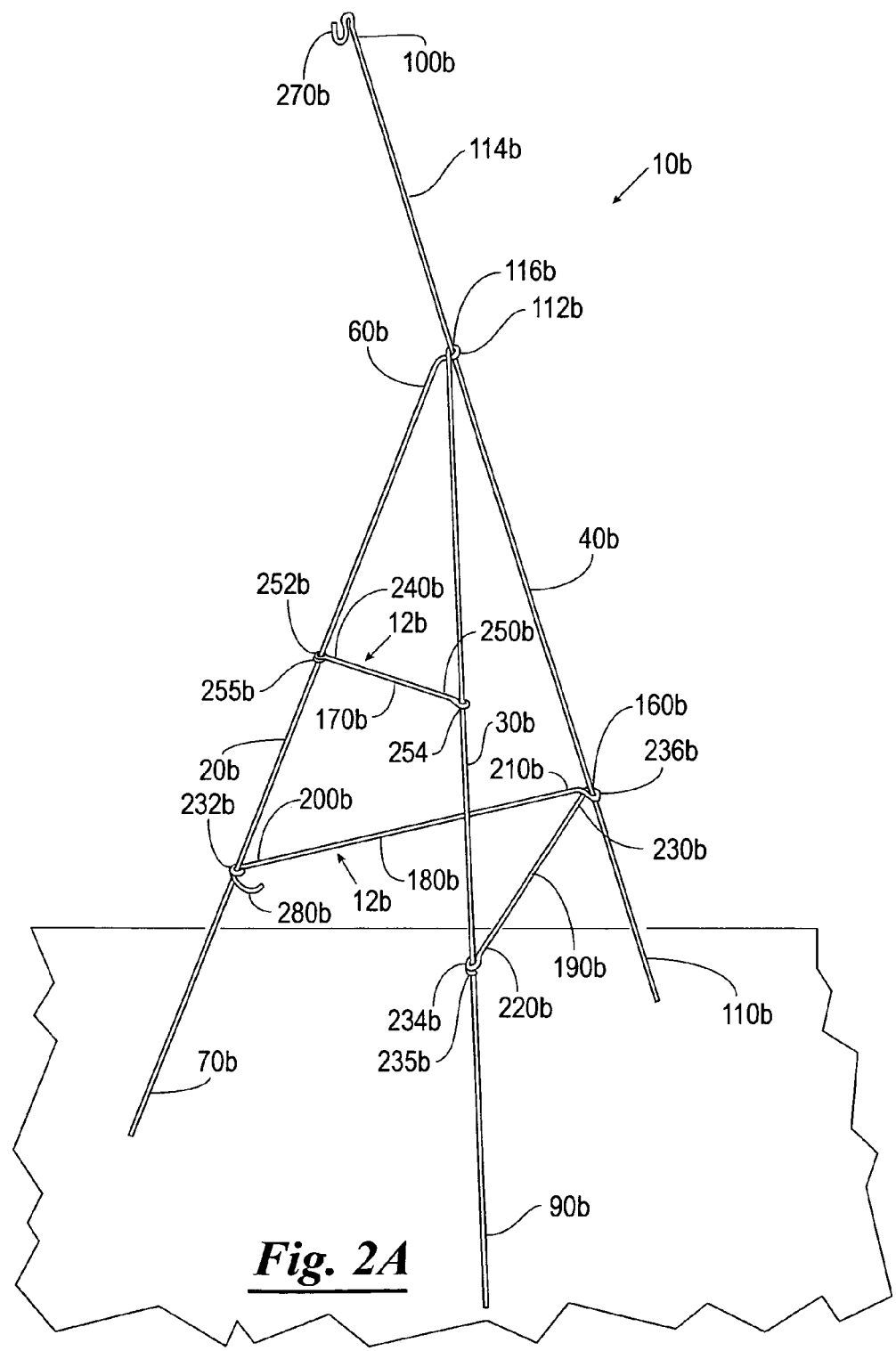
FIG. 2A is a perspective view of another embodiment of the erectable or collapsible floral easel of the present invention in the open position.
Figure 2B:
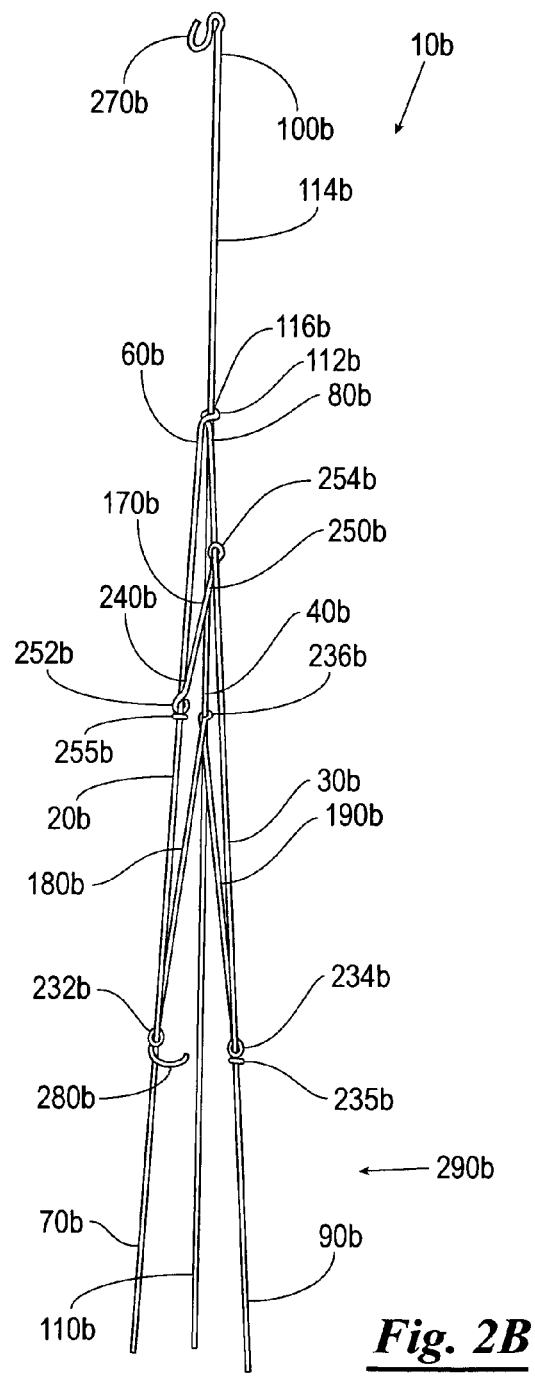
FIG. 2B is a perspective view of another embodiment of the erectable or collapsible floral easel of the present invention in the closed position.

Referring now to FIGS. 2A and 2B, designated generally by the reference numeral 10b is a floral easel.

The floral easel 10b has a plurality of leg members and, in one embodiment shown in FIG. 2, the floral easel 10b has a first leg member 20b, a second leg member 30b and a third leg member 40b. The floral easel 10b also includes a splay assembly 12b that is capable of sustaining the floral easel 10b in an open or erected position as shown in FIG. 2A.

As shown in FIGS. 2A and 2B, the first leg member 20b has a first end 60b and a second end 70b, the second leg member 30b has a first end 80b and a second end 90b, and the third leg member 40b has a first end 100b and a second end 110b. The second end 70b of the first leg member 20b, the second end 90b of the second leg member 30b, and the second end 110b of the third leg member 40b are generally in contact with a substrate 45b to thereby support and hold the floral easel 10b in a position suitable for use as a display for a floral object. The substrate 45b may be any surface such as, for example, a floor, dirt, grass, fiber, plastic, or any surface capable of supporting the floral easel 10b thereon.

At least two of the first leg member 20b, the second leg member 30b, and the third leg member 40b may be formed as a single piece of material that is integrally connected (shown in FIGS. 2A and 2B as one piece of tubular material) thereby forming a loop 112b around a portion of the third leg member 40b. Alternatively, the first leg member 20b and the second leg member 30b may be formed of two or more pieces of material. If the first leg member 20b and the second leg member 30b are formed of two or more pieces of material, the materials may differ or the materials may be the same. For example, if the first leg member 20b and the second leg member 30b are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20b, the second leg member 30b, and the third leg member 30b may be integrally connected. The plurality of leg members may be constructed of the same material or a different material. For example, at least one of the plurality of leg members may be constructed of steel and the other leg members may be constructed of aluminum.

The first end 100b of the third leg member 40b has an extended portion 114b extending a distance beyond a juncture 116b of the first end 60b of the first leg member 20b and the first end 80b of the second leg member 30b.

The splay assembly 12b for sustaining the floral easel 10b in the open or erected position has a bracing assembly 160b and a reinforcing member 170b. It should be understood that the splay assembly 12b may be formed separately from the legs or the splay assembly 12b may be integrally connected to the legs. Alternatively, the bracing assembly 160b may be formed non-integrally from the legs and the reinforcing member 170b may be formed integrally with the legs or vice-versa. The bracing assembly 160b has a first arm 180b and a second arm 190b. The first arm 180b has a first end 200b and a second end 210b. The second arm 190b has a first end 220b and a second end 230b. The first end 200b of the first arm 180b is connected to the first leg member 20b. The first end 220b of the second arm 190b is connected to the second leg member 30b. The second end 210b of the first arm 180b and the second end 230b of the second arm 190b are connected to the third leg member 40b. In the embodiment shown in FIGS. 2A and 2B, the bracing assembly 160b is constructed of one continuous piece of material. The first end 200b of the first arm 180b forms a loop 232b around the first leg member 20b and is slidably connected to the first leg member 20b, the first end 220b of the second arm 190b forms a loop 234b around the second leg member 30b and is slidably connected to the second leg member 30b, the second end 210b of the first arm 180b and second end 230b of the second arm 190b form a contiguous loop 236b around the third leg member 40b and the loop 236b is slidably and pivotally connected to the third leg member 40b. It will be appreciated, however, that the first arm 180b and the second arm 190b may be connected to the leg members in any manner as long as the leg members are able to collapse.

The bracing assembly 160b may be a single piece of material or more than one piece of material. For example, as shown in FIGS. 2A and 2B, the bracing assembly 160b is a single piece of material wherein the second end 210b of the first arm 180b and second end 230b of the second arm 190b form a continuous loop around the third leg member 40b wherein the looped area is slidably and pivotally connected to the third leg member 40b.

The bracing assembly 160b may be constructed of the same material as the leg members or the bracing assembly 160b may be constructed of a different material than the leg members as long as the material allows the bracing assembly 160b to sustain the floral easel 10b in the open or erected position.

If the third leg 40b is not pivotally connected to at least one of the first leg 20b and the second leg 30b, or, if the third leg 40b is pivotally connected to at least one of the first leg 20b and the second leg 30b limiting its travel to positions of full erection, full collapse, or intermediate positions, and if the first leg 20b and the second leg 30b are connected to limit travel to positions from full erection to full collapse; then at least one of the bracing assembly 160b and reinforcing member 170b can be eliminated from this embodiment of the floral easel 10b.

A stop member 235b is connected adjacent and underneath the second arm 190b of the bracing assembly 160b to prevent the bracing assembly 160b from sliding down the second leg member 30b of the floral easel 10b. The stop member 235b may be constructed of the same material as the leg members or of a different material than the leg members. In the embodiment shown in FIG. 2A, the stop member 235b is a horizontal cross-piece connected adjacent and below the second arm 190b of the bracing-assembly 160b. However, the stop member 235b may be connected to any of the leg members of the floral easel 10b. It should be understood that the stop member 235b is not required, however, for embodiments in which the bracing assembly 160b is slidably or pivotally connected to at least one leg member, the stop member 235b aids in the erection and enhances the stability of the floral easel 10b.

The reinforcing member 170b has a first end 240b and a second end 250b. The first end 240b is connected to the first leg member 20b and the second end 250b is connected to the second leg member 30b. In the embodiment shown in FIG. 2, the first end 240b forms a loop 252b around the first leg member 20b and is slidably connected to the first leg member 20b and the second end 250b forms a loop 254b around the second leg member 30b and is slidably connected to the second leg member 30b. It will be appreciated, however, that the first end 240b and the second end 250b may be connected in any manner to the first leg member 20b and second leg member 30b of the floral easel 10b.

For example, but not by way of limitation, the reinforcing member 170b may be selected from the group consisting of elastic, a rope, a cord, a chain, a strap, a cable, a wire, combinations thereof or any other device which allows the floral easel 10b to be sustained in the open or erect position. The reinforcing member 170b may also be constructed of the same material as the leg members or the reinforcing member 170b may be constructed from a different material than the leg members as long as the material allows the reinforcing member 170b to sustain the floral easel 10b in the open or erect position. It will be appreciated, however, that the reinforcing member 170b is not necessary in alternate embodiments where a more flexible floral easel 10b is desirable or acceptable for use.

A stop member 255b may also be connected to the first leg member 20b of the floral easel 10b and placed adjacent and underneath the first end 240b of the reinforcing member 170b for preventing the reinforcing member 170b from sliding down the first leg member 20b of the floral easel 10b. However, it should be understood that the stop member 255b may be placed on either the first leg member 20b or the second leg member 30b of the floral easel 10b. The stop member 255b may be constructed of the same material as the designated leg member or of a different material than the designated leg member. In the embodiment shown in FIG. 2A, the stop member 255b is a horizontal cross-piece connected adjacent and below the first end 240b of the reinforcing member 170b. However, the stop member 255b may be connected to either the first leg member 20b, the second leg member 30b, the third leg member 40b or any of the first leg member 20b, the second leg member 30b, and the third leg member 40b of the floral easel 10b. It should be understood that multiple stop members may be used on the floral easel. It should also be understood that the stop members are not necessary to the erection, collapsibility, or stability of the floral easel 10b; however, the stop members may enhance stability and facilitate erection of the floral easel 10b. The reinforcing member 170b may also provide at least one location on the floral easel 10b to which floral objects and decorations may be fastened using wire clips, glue or any other fastening means capable of securing floral objections and decorations to the floral easel 10b.

A support member 270b (FIGS. 2A and 2B) may also be employed to hold and/or support the floral object (not shown) (or non-floral object), however, any portion of the floral easel 10b may hold or support the floral object 260b or non-floral object, such as, for example, the bracing assembly 160b, the reinforcing member 170b or any other area of the floral easel 10b capable of supporting the floral object 260b or a non-floral object. The support member 270b may be connected to any area of the floral easel 10b such as, for example, the leg members, or to the reinforcing member 170b. The support member 270b may be any kind of device capable of supporting the floral object 260b. For example, but not by way of limitation, the support member 270b may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270b, as shown in FIG. 2, is a hook connected to the first end 100b of the third leg member 40b.

The support member 270b may be constructed of the same material as the leg members or the support member 270b may be constructed of a different material than the leg members as long as the material is capable of holding and/or supporting the floral object.

The floral easel 10b may also have a retaining member 280b for retaining the leg members in the collapsed position. For example, but not by way of limitation, the retaining member 280b may be selected from the group consisting of a hook, a loop, a wire, a bow, a rope, a magnet, a cord, a chain, a strap, a cable, adhesive, combinations thereof, or any other device capable of retaining the leg members in the collapsed position. The retaining member 280b may also be constructed of the same material as the leg members or the retaining member 280b may be constructed from a different material than the leg members as long as the material is capable of retaining the leg members in the collapsed position. For example, but not by way of limitation, the retaining member 280b may be selected from the group consisting of elastic, a clip or clips, a spring, a band, shrink material, stretch material, a carton, a tube, a bend in the leg members, a groove, a slot, a loop, a hook, a wire, a bow, a rope, a magnet, a cord, a chain, a strap, a cable, adhesive, combinations thereof, or any other device capable of retaining the leg members in the collapsed position. The retaining member 280b may also be constructed of the same material as the leg members or the retaining member 280b may be constructed of a different material than the leg members as long as the material is capable of retaining the leg members in the collapsed position.

As shown in FIG. 2, the retaining member 280b is connected to the first leg member 20b, however, for example, the retaining member 280b may be attached to any of the leg members, the bracing assembly 160b, the reinforcing member 170b, or to any other area of the floral easel 10b that is suitable for connecting the retaining member 280b or may be a separate device unconnected to the floral easel 10b.

To move the floral easel 10b from the open or erect position (shown in FIG. 2A) to the collapsed position (shown in FIG. 2B), the bracing assembly 160b is rotated about the loop 232b and the loop 234b to cause the loop 236b to slide in an upward direction through the loop 112b toward the first end 100b of the third leg member 40b thereby pivoting the third leg member 40b inward toward the area between the first leg member 20b and the second leg member 30b. The reinforcing member 170b is also moved in an upward direction to cause the loop 254b of the second end 250b of the reinforcing member 170b to slide in an upward manner along the first end 100b of the second leg member 30b. The second end 70b, the second end 90b, and the second end 110b may then be inserted into the retaining member 280b forming the leg members into a bundle 290b (shown in FIG. 2B).

Description of FIG. 3

Figure 3A:
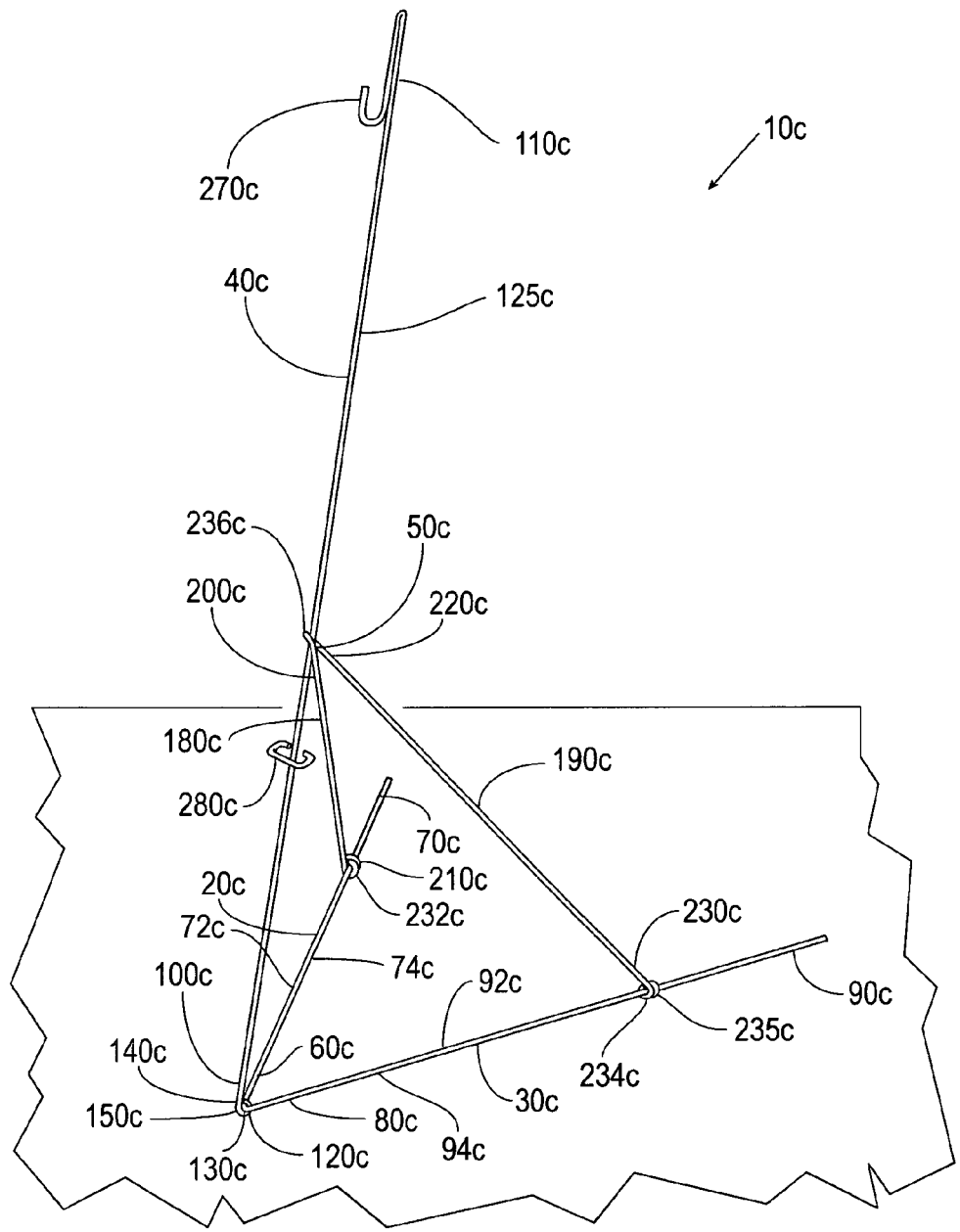
FIG. 3A is a perspective view of another embodiment of the erectable or collapsible floral easel of the present invention in the open position.
Figure 3B:
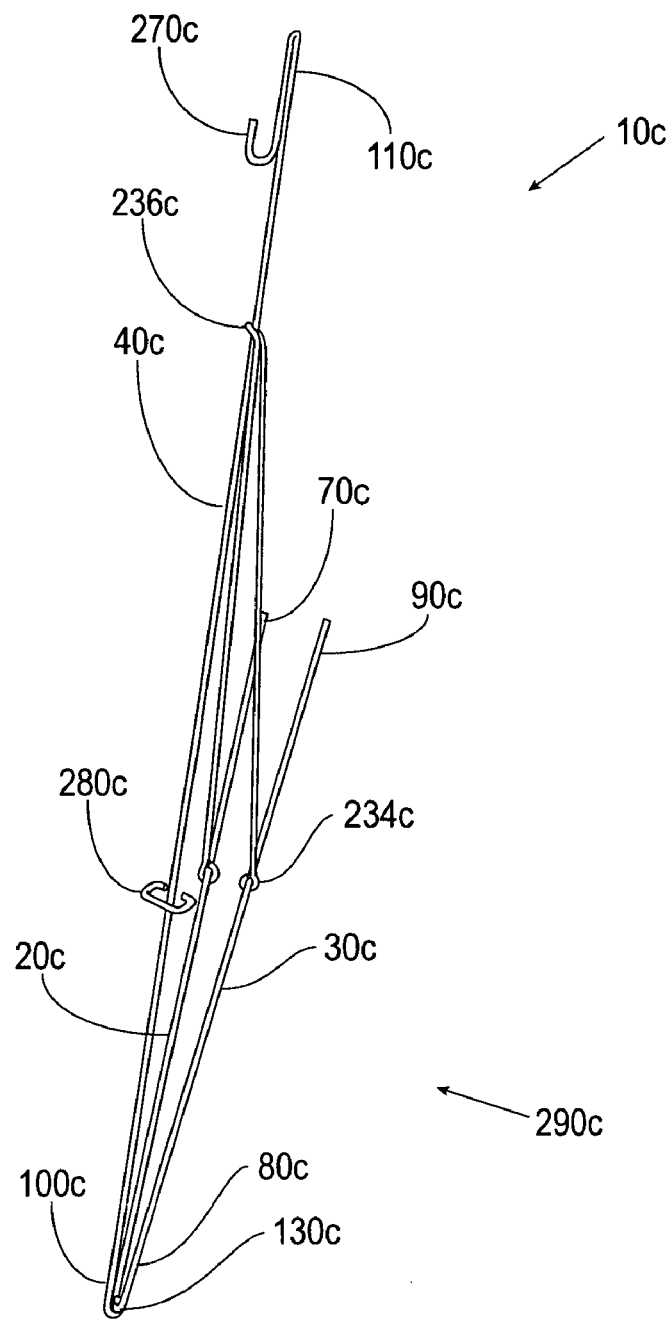
FIG. 3B is a perspective view of another embodiment of the erectable or collapsible floral easel of the present invention in the closed position.

Referring now to FIGS. 3A and 3B, designated generally by the reference numeral 10c is a floral easel. The floral easel 10c has a plurality of leg members and, in one embodiment shown in FIG. 3, the floral easel 10c has a first leg member 20c, a second leg member 30c, and a third leg member 40c. The floral easel 10c also includes a bracing assembly 50c for sustaining the floral easel 10 in an open or erected position shown in FIG. 3A.

As shown in FIGS. 3A and 3B, the first leg member 20c has a first end 60c, a second end 70c, a first side 72c and a second side 74c. The second leg member 30c has a first end 80c, a second end 90c, a first side 92c and a second side 94c. The third leg member 40c has a first end 100c and a second end 110c. The first end 60c of the first leg member 20c, the first end 80c of the second leg member 30c, and the first end 100c of the third leg member 40c may be integrally connected at a joining member 120c. The second side 74c of the first leg member 20c, the second side 94c of the second leg member 30c, and the joining member 120c are generally in contact with a substrate 45c to thereby support and hold the floral easel 10c. The substrate 45c may be any surface such as, for example, a floor, dirt, grass, fiber, plastic, or any surface capable of supporting the floral easel 10c thereon. The third leg member 40c extends a distance 125c perpendicular to the first leg member 20c and the second leg member 30c.

At least two of the first leg member 20c, the second leg member 30c, and the third leg member 40c may be formed as a single piece of material that is integrally connected (shown in FIGS. 3A and 3B as one piece of tubular material forming an arch 130c having a center area 140c). Alternatively, the first leg member 20c and the second leg member 30c may be formed of two or more pieces of material. If the first leg member 20c and the second leg member 30c are formed of two or more pieces of material, the materials may differ or the materials may be the same. For example, if the first leg member 20c and the second leg member 30c are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20c and the second leg member 30c may be integrally connected. The plurality of leg members may be constructed of the same materials or a different material. For example, at least one of the plurality of leg members may be constructed of steel and the other leg members may be constructed of aluminum.

The joining member 120c for connecting and/or receiving the first end of the leg members may be formed of the same material as the leg members or the joining member 120c may be formed of a different material than the leg members. Also, the joining member 120c may be integrally connected to the first end 100c of the third leg member 40c or formed separately from the first end 100c of the third leg member 40c. As shown in FIGS. 3A and 3B, the joining member 120c is integrally connected to the first end 100c of the third leg member 40c and is looped around and pivotally connected to the arch 130c formed in the center area 140c thereby integrally joining the first end 60c of the first leg member 20c and the first end 70c of the second leg member 30c to define a juncture 150c. However, the joining member 120c may be for example, a solid block holding device, or any other device capable of receiving the first ends of the leg members.

The bracing assembly 50c has a first arm 180c and a second arm 190c. The first arm 180c has a first end 200c and a second end 210c. The second arm 190c has a first end 220c and a second end 230c. The first end 200c of the first arm 180c is connected to the first leg member 20c. The first end 220c of the second arm 190c is connected to the second leg member 30c. The second end 210c of the first arm 180c and the second end 230c of the second arm 190c are connected to the third leg member 40c. In the embodiment shown in FIGS. 3A and 3B, the bracing assembly 50c is constructed of one continuous piece of material. The first end 200c of the first arm 180c forms a loop 232c around the first leg member 20c and is slidably connected to the first leg member 20c, the first end 220c of the second arm 190c forms a loop 234c around the second leg member 30c and is slidably connected to the second leg member 30c, the second end 210c of the first arm 180c and second end 230c of the second arm 190c form a contiguous loop 236c around the third leg member 40c and the loop 236c is slidably and pivotally connected to the third leg member 40c. It will be appreciated, however, that the first arm 180c and the second arm 190c may be connected to the leg members in any manner as long as the leg members are able to fully collapse.

The bracing assembly 50c may be a single piece of material or more than one piece of material. For example, as shown in FIGS. 3A and 3B, the bracing assembly 50c is a single piece of material wherein the second end 210c of the first arm 180c and the second end 230c of the second arm 190c form a continuous loop around the third leg member 40c wherein the looped area is slidably and pivotally connected to the third leg member 40c.

The bracing assembly 50c may be constructed of the same material as the leg members or the bracing assembly 50c may be constructed of a different material than the leg members as long as the material allows the bracing assembly 50c to sustain the floral easel 10c in the open or erected position.

If the third leg member 40c is not pivotally connected to at least one of the first leg member 20c and the second leg member 30c or, if the third leg member 40c is pivotally connected to at least one of the first leg member 20c and the second leg member 30c limiting its travel to positions of full erection, full collapse, or intermediate positions and, if the first leg 20c and the second leg 20c are connected to limit travel to positions from full erection to full collapse; then the bracing assembly 50c can be eliminated from this embodiment of the floral easel 10c.

A stop member 235c may be connected adjacent and underneath the second arm 190c of the bracing assembly 50c to prevent the bracing assembly 160c from sliding down the second leg member 30c of the floral easel 10c. The stop member 235c may be constructed of the same material as the leg member or of a different material than the leg member. In the embodiment shown in FIG. 3A, the stop member 235c is a horizontal cross-piece connected adjacent and below the second arm 190c of the bracing assembly 50c. However, the stop member 235c may be connected to any of the leg members of the floral easel 10c. It should be understood that the stop member 235c is not required, however, for embodiments in which the bracing assembly 50c is slidably or pivotally connected to at least one leg member, the stop member 235c aids in the erection and enhances the stability of the floral easel 10c.

The floral easel 10c may be employed to hold and/or support a floral object (not shown) by placing the floral object about the second end 110c of the third leg member 40c of the floral easel 10c.

A support member 270c (FIGS. 3A and 3B) may also be employed to hold and/or support the floral object or non-floral object. The support member 270c may be connected to any area of the floral easel 10c such as, for example, the bracing assembly 50c, the first leg member 20c, the second leg member 30c, the third leg member 40c, or any other area capable of having the support member 270c attached thereto. The support member 270c may be any kind of device capable of supporting the floral object or non-floral object. For example, but not by way of limitation, the support member 270c may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270c, as shown in FIG. 3, is a hook connected to the second end 110c of the third leg member 40c.

The support member 270c may be constructed of the same material as the leg members or the support member 270c may be constructed of a different material than the leg members as long as the material is capable of holding and/or supporting the floral object.

The floral easel 10c may also have a retaining member 280c for retaining the leg members in the collapsed position. For example, but not by way of limitation, the retaining member 280c may be selected of the group consisting of elastic, a clip or clips, a spring, a band, shrink material, stretch material, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining member 280c may also be constructed of the same material as the leg members or the retaining member 280c may be constructed of a different material than the leg members as long as the material is capable of retaining the leg members in the collapsed position.

As shown in FIG. 3, the retaining member 280c is connected to the third leg member 30c, however, for example, the retaining member 280c may be attached to any of the leg members, the bracing assembly 160c, or to any other area of the floral easel 10c that is suitable for connecting the retaining member 280c or may be a separate device unconnected to the floral easel 10c.

To move the floral easel 10c from the open or erected position (shown in FIG. 3A) to the collapsed position (shown in FIG. 3B), the bracing assembly 160c is rotated about the loop 232c and the loop 234c to cause the loop 236c to slide in an upward direction toward the second end 110c of the third leg member 40c thereby pivoting the third leg member 40 inward toward the area between the first leg member 20c and the second leg member 30. The first end 60c of the first leg member 20c and the first end 80c of the second leg member 30c are compressed together thereby decreasing the angle formed at the arch 130c between the center area 140c of the first leg member 20c and the second leg member 30c. The first leg member 20c and the second leg member 30c may then be placed within the retaining member 280c forming the floral easel 10c into a bundle 290c (shown in FIG. 3B).

Description of FIG. 4

Figure 4A:
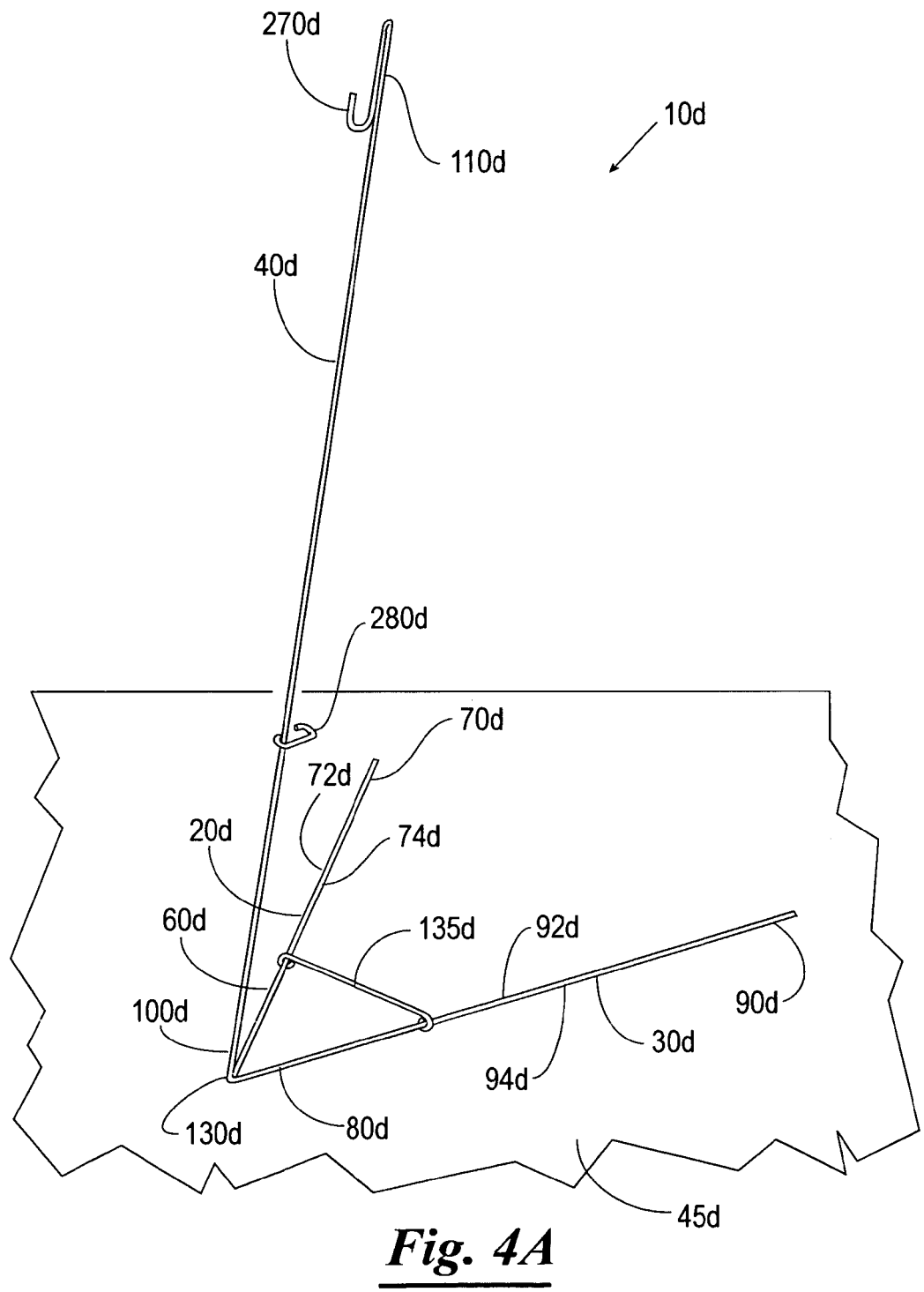
FIG. 4A is a perspective view of another embodiment of the erectable or collapsible floral easel of the present invention in the open position.
Figure 4B:
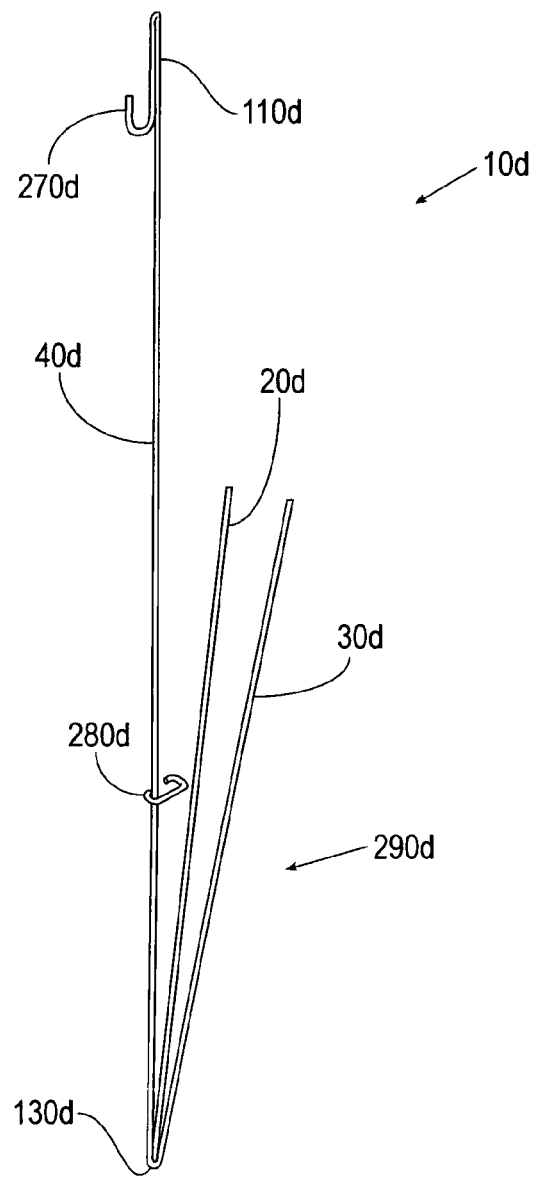
FIG. 4B is a perspective view of another embodiment of the erectable or collapsible floral easel of the present invention in the closed position.

Referring now to FIGS. 4A and 4B, designated generally by the reference numeral 10d is a floral easel. The floral easel 10d has a plurality of leg members and, in one embodiment shown in FIG. 4, the floral easel 10d has a first leg member 20d, a second leg member 30d, and a third leg member 40d.

As shown in FIGS. 4A and 4B, the first leg member 20d has a first end 60d, a second end 70d, a first side 72d and a second side 74d. The second leg member 30d has a first end 80d, a second end 90d, a first side 92d and a second side 94d. The third leg member 40d has a first end 100d and a second end 110d. The first end 60d of the first leg member 20d, the first end 80d of the second leg member 30d, and the first end 100d of the third leg member 40d may be integrally connected as shown in FIGS. 4A and 4B. The second side 74d of the first leg member 20d and the second side 94d of the second leg member 30d are generally in contact with a substrate 45d to thereby support and hold the floral easel 10d. The substrate 45d may be any surface such as, for example, a floor, dirt, grass, fiber, plastic, tile, carpet or any surface capable of supporting the floral easel 10d thereon. The third leg member 40d extends a distance perpendicular to the first leg member 20d and the second leg member 30d.

The anchoring material may be formed integrally or non-integrally with the floral easel 10d. For example, pins (not shown) may be added to the first leg member 20d and the second leg member 30d so as to penetrate the soil. The pins may be retractable or fixed.

At least two of the first leg member 20d, the second leg member 30d, and the third leg member 40d may be formed as a single piece of material that is integrally connected (shown in FIGS. 4A and 4B as one piece of springy, tubular material) forming a juncture 130d. Alternatively, the first leg member 20d, the second leg member 30d, and the third leg member 40d may each be formed of different materials. For example, if the first leg member 20d, the second leg member 30d, and the third leg member 40d are formed of different materials, one of the leg members may be formed of steel and the others may be formed of aluminum. In another embodiment, each of the plurality of leg members may be formed of at least two or more materials. For example, at least a portion of at least one of the leg members may be steel and another portion of the leg member may be aluminum. In yet another embodiment, the first leg member 20d, the second leg member 30d, and the third leg member 40d may be integrally connected. The plurality of leg members may be constructed of the same material or a different material. For example, at least one of the plurality of leg members may be constructed of steel and the other leg members may be constructed of aluminum.

A brace 135d may be placed between the first leg member 20d and the second leg member 30d so as to support the leg members in the open position.

The floral easel 10d may be employed to hold and/or support a floral object (not shown) by placing the floral object about the second end 110d of the third leg member 40d of the floral easel 10d.

A support member 270d (FIGS. 4A and 4B) may also be employed to hold and/or support the floral object or non-floral object, however, any portion of the floral easel 10d may hold or support the floral object or non-floral object. The support member 270d may be connected to any area of the floral easel 10d such as, for example, the first leg member 20d, the second leg member 30d, the third leg member 40d, or any other area capable of having the support member 270d attached thereto. The support member 270d may be any kind of device capable of supporting the floral object. For example, but not by way of limitation, the support member 270d may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270d, as shown in FIG. 4, is a hook connected to the second end 110d of the third leg member 40d.

The support member 270d may be constructed of the same material as the leg members or the support member 270d may be constructed of a different material than the leg members as long as the material is capable of holding and/or supporting the floral object.

The floral easel 10d may also have a retaining member 280d for retaining the leg members in the collapsed position. For example, but not by way of limitation, the retaining member 280d may be selected of the group consisting of elastic, a clip or clips, a spring, a band, shrink material, stretch material, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining member 280d may also be constructed of the same material as the leg members or the retaining member 280d may be constructed of a different material than the leg members as long as the material is capable of retaining the leg members in the collapsed position.

As shown in FIG. 4, the retaining member 280d is connected to the third leg member 30d, however, for example, the retaining member 280d may be attached to any of the leg members or to any other area of the floral easel 10d that is suitable for connecting the retaining member 280d or may be a separate device unconnected to the floral easel 10d.

Further, a display support device (not shown) may be placed on the third leg member 40d for supporting a floral object. For example, the display support device 290d may be a bar attached perpendicularly to the third leg member 40d so as to support a floral object. However, any display support device 290d may be used so long as it is able to support a floral object.

To move the floral easel 10d from the open or erected position (shown in FIG. 4A) to the collapsed position (shown in FIG. 4B), the first leg member 20d and the second leg member 30d are compressed together thereby decreasing the angle formed at the arch 130d between the first leg member 20d and the second leg member 30d. The first leg member 20d and the second leg member 30d are pivoted upwardly toward the third leg member 40d. The first leg member 20d and the second leg member 30d may then be placed within the retaining member 280d forming the floral easel 10d into a bundle 290d (shown in FIG. 4B).

Description of FIG. 5

Figure 5A:
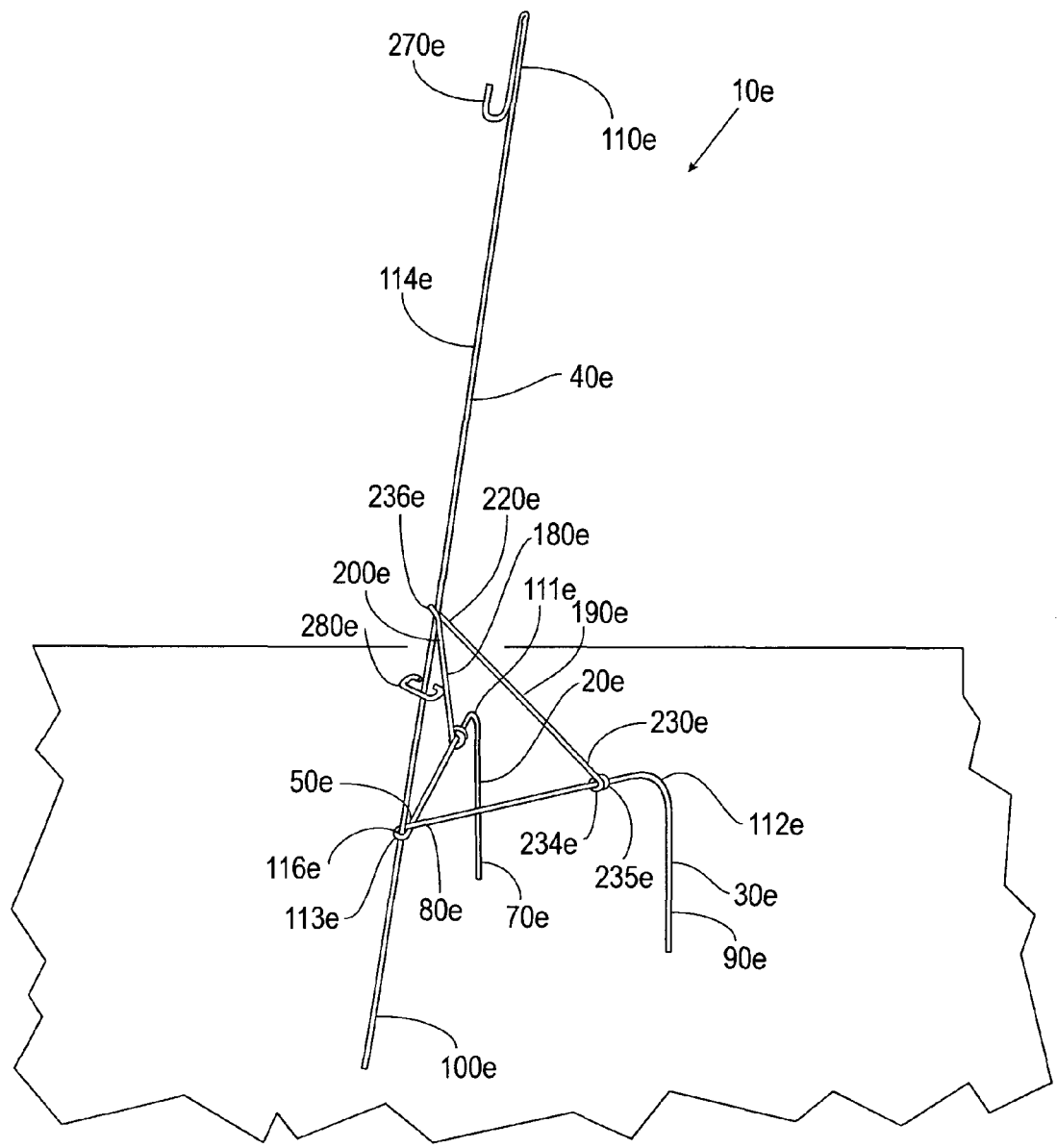
FIG. 5A is a perspective view of another embodiment of the erectable or collapsible floral easel of the present invention in the open position.
Figure 5B:
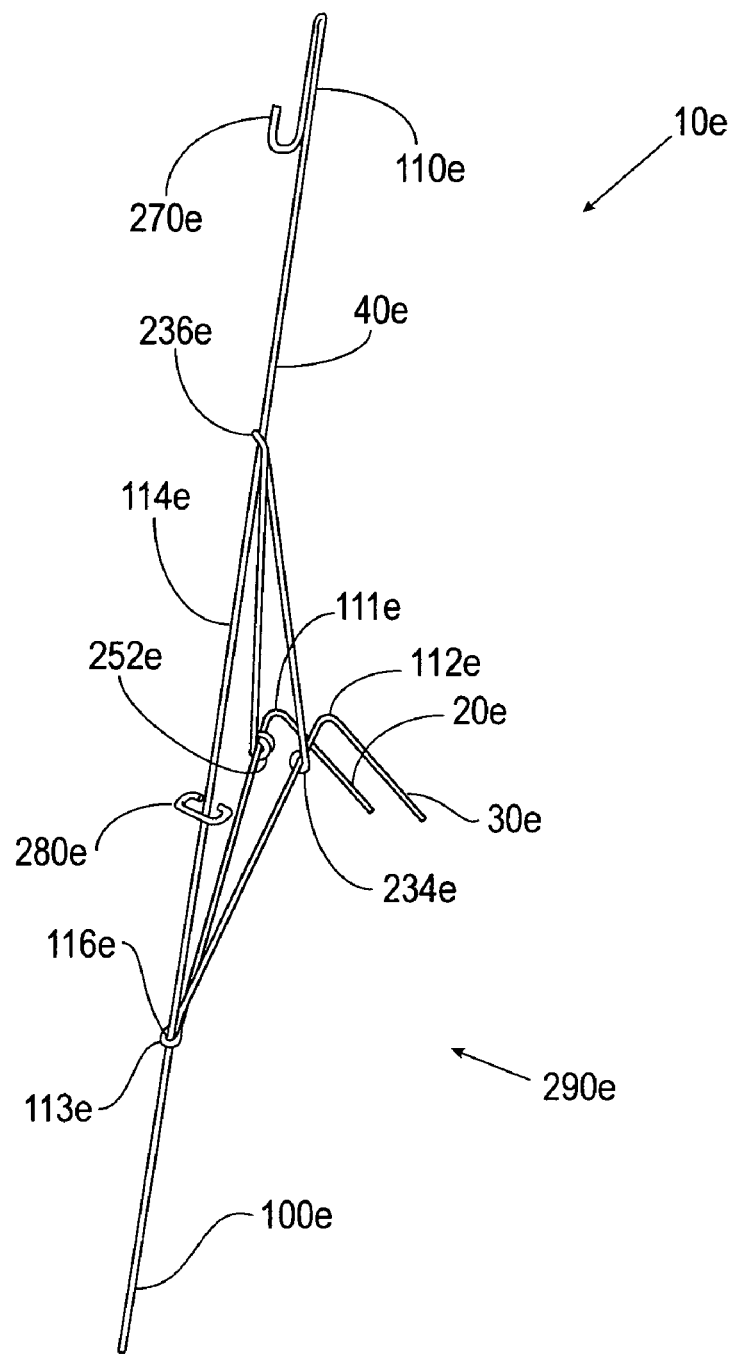
FIG. 5B is a perspective view of another embodiment of the erectable or collapsible floral easel of the present invention in the closed position.

Referring now to FIGS. 5A and 5B, designated generally by the reference numeral 10e is a floral easel. The floral easel 10e has a plurality of leg members and, in one embodiment shown in FIG. 5, the floral easel 10e has a first leg member 20e, a second leg member 30e and a third leg member 40e. The floral easel 10e also includes a bracing assembly 50e for sustaining the floral easel 10e in an open or erected position, shown in FIG. 5A.

As shown in FIGS. 5A and 5B, the first leg member 20e has a first end 60e and a second end 70e, the second leg member 30e has a first end 80e and a second end 90e, and the third leg member 40e has a first end 100e and a second end 110e. The second end 70e of the first leg member 20e, the second end 90e of the second leg member 30e, and the second end 110e of the third leg member 40e are generally in contact with a substrate 45e to thereby support and hold the floral easel 10e. The substrate 45e may be any surface such as, for example, a floor, dirt, grass, fiber, plastic, or any surface capable of supporting the floral easel 10e thereon. As shown in FIG. 5A, a curve 111e may be formed in the first leg member 20e between the first end 60e and the second end 70e for allowing the second end 70e to engage the substrate 45e. A curve 112e is formed in the second leg member 30e between the first end 80e and the second end 90e for allowing the second end 90e to engage the substrate 45e.

At least two of the first leg member 20e, the second leg member 30e, and the third leg member 40e may be formed as a single piece of material that is integrally connected (shown in FIGS. 5A and 5B as one piece of tubular material) thereby allowing the first end 60e and the first end 80e to form a loop 113e around a portion of the third leg member 40e. Alternatively, the first leg member 20e and the second leg member 30e may be formed of two or more pieces of material. If the first leg member 20e and the second leg member 30e are formed of two or more pieces of material, the materials may differ or the materials may be the same. For example, if the first leg member 20e and the second leg member 30e are formed of two or more pieces of material; one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20e, the second leg member 30e, and the third leg member 40e may be integrally connected. The plurality of leg members may be constructed of the same material or a different material. For example, at least one of the plurality of leg members may be constructed of steel and the other leg members may be constructed of aluminum.

The first end 100e of the third leg member 40e has an extended portion 114e extending a distance beyond a juncture 116e of the plurality of leg members.

The bracing assembly 50e for sustaining the floral easel 10e in the open or erected position has a first arm 180e and a second arm 190e. The first arm 180e has a first end 200e and a second end 210e. The second arm 190e has a first end 220e and a second end 230e. The first end 200e of the first arm 180e is connected to the first leg member 20e. The first end 220e of the second arm 190e is connected to the second leg member 30e. The second end 210e of the first arm 180e and the second end 230e of the second arm 190e are connected to the third leg member 40e. In the embodiment shown in FIGS. 5A and 5B, the bracing assembly 50e is constructed of one continuous piece of material. The first end 200e of the first arm 180e forms a loop 232e around the first leg member 20e and is slidably connected to the first leg member 20e, the first end 220e of the second arm 190e forms a loop 234e around the second leg member 30e and is slidably connected to the second leg member 30e, the second end 210e of the first arm 180e and second end 230e of the second arm 190e form a contiguous loop 236e around the third leg member 40e and the loop 236e is slidably and pivotally connected to the third leg member 40e. When stated that the loop 232e, the loop 234e, and the loop 236e are "slidably connected", what is meant is that the loops are able to move a distance up and down each of the respective leg members. It will be appreciated, however, that the first arm 180e and the second arm 190e may be connected to the leg members in any manner as long as the leg members are able to collapse. It will also be appreciated that the loops may either be slidably connected or connected in a fixed manner to each respective leg member.

The bracing assembly 50e may be constructed of the same material as the leg members or the bracing assembly 50e may be constructed of a different material than the leg members as long as the material allows the bracing assembly 50e to sustain the floral easel 10e in the open or erect position.

If the third leg 40e is not pivotally connected to at least one of the first leg 20e and the second leg 30e or, if the third leg 40e is pivotally connected to at least one of the first leg 20e and the second leg 30e limiting its travel to positions of full erection, full collapse, or intermediate positions, and if the first leg 20e and the second leg 30e are connected to limit travel to positions from full erection to full collapse, then the bracing assembly 50e can be eliminated from this embodiment of the floral easel 10e.

A stop member 235e is connected adjacent and underneath the second arm 190e of the bracing assembly 50e to prevent the bracing assembly 50e from sliding down the second leg member 30e of the floral easel 10e. The stop member 235e may be constructed of the same material as the leg members or of a different material than the leg members. In the embodiment shown in FIG. 5A, the stop member 235e is a horizontal cross-piece connected adjacent and below the second arm 190*e* of the bracing assembly 50*e*. However, the stop member 235*e* may be connected to either the first leg member 20*e* or the second leg member 30*e* of the floral easel 10*e*.

It should be understood that the stop member 235*e* is not required, however, for embodiments in which the bracing assembly 50*e* is slidably or pivotally connected to at least one leg member, the stop member 235*e* aids in the erection and enhances the stability of the floral easel 10*e*.

A support member 270*e* (FIGS. 5A and 5B) may also be employed to hold and/or support the floral object or non-floral object, however, any portion of the floral easel 10*e* may hold or support the floral object or non-floral object, such as, for example, the support member 270*e* may be connected to any area of the floral easel 10*e* such as, for example, the first leg member 20*e*, the second leg member 30*e*, the third leg member 40*e*, or any other area capable of having the support member 270*e* attached thereto. The support member 270*e* may be any kind of device capable of supporting the floral object, such as, for example the bracing assembly 50*e* or any other area of the floral easel 10*e* capable of supporting the floral object or non-floral object. For example, but not by way of limitation, the support member 270*e* may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270*e*, as shown in FIG. 5, is a hook connected to the first end 100*e* of the third leg member 40*e*.

The support member 270*e* may be constructed of the same material as the leg members or the support member 270*e* may be constructed of a different material than the leg members as long as the material is capable of holding and/or supporting the floral object.

The floral easel 10*e* may also have a retaining member 280*e* for retaining the leg members in the collapsed position. For example, but not by way of limitation, the retaining member 280*e* may be selected of the group consisting of elastic, a clip or clips, a spring, a band, shrink material, stretch material, a carton, a tube, a bend in the leg members, a groove, a slot, a loop, a hook, a wire, a bow, a rope, a magnet, a cord, a chain, a strap, a cable, adhesive, combinations thereof, or any other device capable of retaining the leg members in the collapsed position. The retaining member 280*e* may also be constructed of the same material as the leg members or the retaining member 280*e* may be constructed from a different material than the leg members as long as the material is capable of retaining the leg members in the collapsed position.

As shown in FIG. 5, the retaining member 280*e* is connected to the third leg member 40*e*, however, for example, the retaining member 280*e* may be attached to any of the leg members, the bracing assembly 160*e*, or to any other area of the floral easel 10*e* that is suitable for connecting the retaining member 280*e* or may be a separate device unconnected to the floral easel 10*e*.

To move the floral easel 10*e* from the open or erected position (shown in FIG. 5A) to the collapsed position (shown in FIG. 5B), the bracing assembly 50*e* is rotated about the loop 232*e* and the loop 234*e* to cause the loop 236*e* to slide in an upward direction toward the first end 100*e* of the third leg member 40*e* thereby pivoting the first leg member 20*e* and the second leg member 30*e* upward toward the third leg member 40*e* causing the third leg member 30*e* to be placed between the first leg member 20*e* and the second leg member 30*e*. The first end 60*e* and the first end 80*e* may then be inserted into the retaining member 280*e* forming the leg members into a bundle 290*e* (shown in FIG. 5B).

Figure 6:
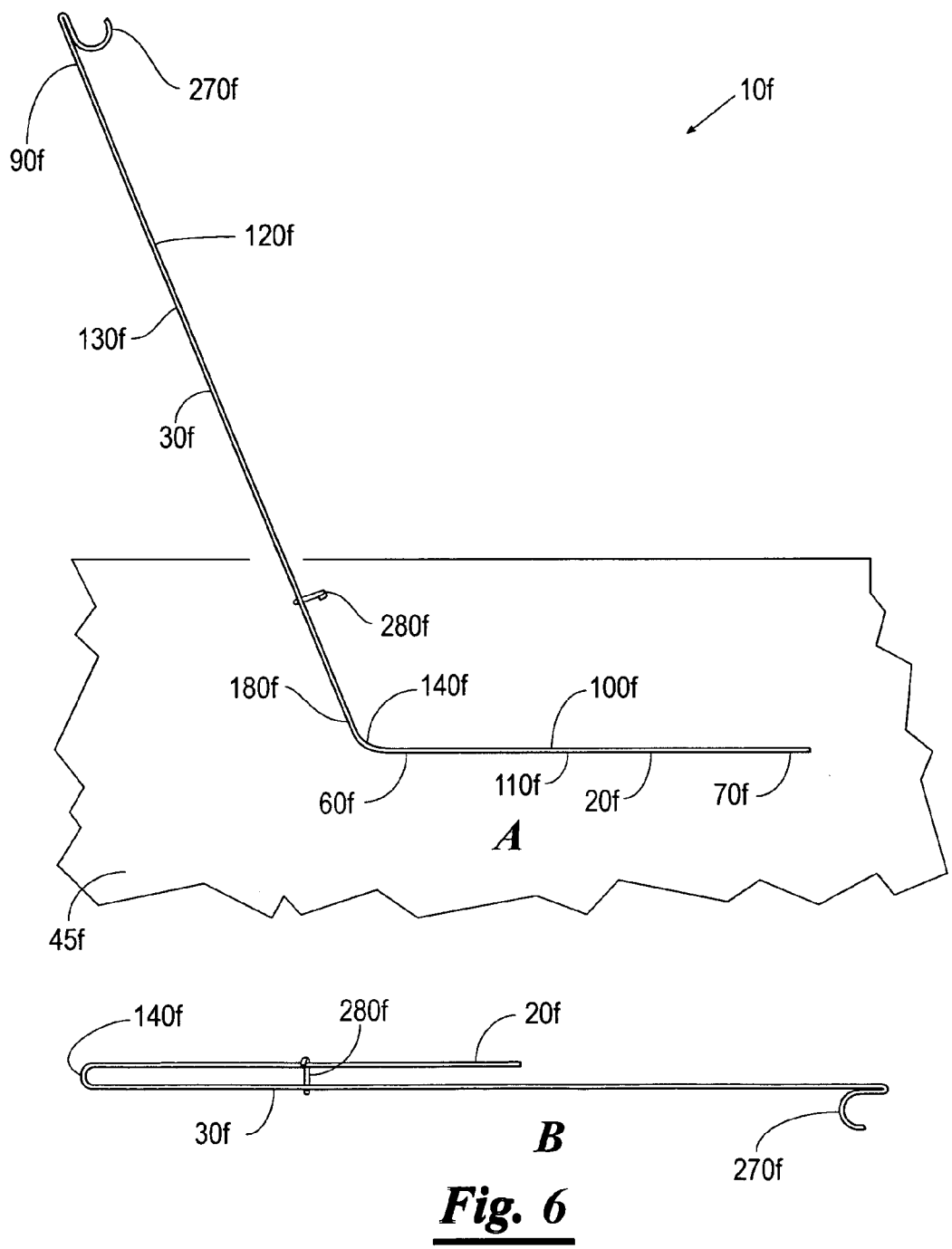
FIG. 6A is a perspective view of another embodiment of the erectable or collapsible floral easel of the present invention in the open position.
FIG. 6B is a perspective view of another embodiment of the erectable or collapsible floral easel of the present invention in the closed position.

Description of FIG. 6

Referring now to FIGS. 6A and 6B, designated generally by the reference numeral 10*f* is a floral easel. The floral easel 10*f* has a plurality of leg members and, in one embodiment shown in FIG. 6, the floral easel 10*f* has a first leg member 20*f* and a second leg member 30*f*.

As shown in FIGS. 6A and 6B, the first leg member 20*f* has a first end 60*f*, a second end 70*f*, a first side 100*f* and a second side 110*f*. The second leg member 30*f* has a first end 80*f*, a second end 90*f*, a first side 120*f* and a second side 130*f*. The first end 60*f* of the first leg member 20*f* and the first end 80*f* of the second leg member 30*f* are integrally connected forming an arch 140*f* where the first end 60*f* and first end 80*f* are joined. The second side 110*f* the first leg member 20*f* is generally in contact with a substrate 45*f* to thereby support and hold the floral easel 10*f*. The substrate 45*f* may be any surface such as, for example, a floor, dirt, grass, fiber, plastic, or any surface capable of supporting the floral easel 10*f* thereon.

The first leg member 20*f* and the second leg member 30*f* may be formed as a single piece of material that is integrally connected (shown in FIGS. 6A and 6B as one piece of springy material). Alternatively, the first leg member 20*f* and the second leg member 30*f* may be formed of two or more pieces of material. If the first leg member 20*f* and the second leg member 30*f* are formed of two or more pieces of material, the materials may differ or the materials may be the same. For example, if the first leg member 20*f* and the second leg member 30*f* are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20*f* and the second leg member 30*f* may be integrally connected. The plurality of leg members may be constructed of the same material or a different material. For example, at least one of the plurality of leg members may be constructed of steel and the other leg member may be constructed of aluminum.

The floral easel 10*f* may be employed to hold and/or support a floral object (not shown) by placing the floral object about the second end 90*h* of the second leg member 30*f* of the floral easel 10*f*.

A support member 270*f* (FIGS. 6A and 6B) may also be employed to hold and/or support the floral object or non-floral object, however, any portion of the floral easel 10*f* may hold or support the floral object or the non-floral object. The support member 270*f* may be connected to any area of the floral easel 10*f* such as, for example, the first leg member 20*f*, the second leg member 30*f* or any other area capable of having the support member 270*f* attached thereto. The support member 270*f* may be any kind of device capable of supporting the floral object. For example, but not by way of limitation, the support member 270*f* may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270*f*, as shown in FIG. 6, is a hook connected to the second end 90*f* of the second leg member 30*f*.

The support member 270f may be constructed of the same material as the leg members or the support member 270f may be constructed of a different material than the leg members as long as the material is capable of holding and/or supporting the floral object.

The floral easel 10f may also have a retaining member 280f for retaining the leg members in the collapsed position. For example, but not by way of limitation, the retaining member 280f may be selected of the group consisting of elastic, a clip or clips, a spring, a band, shrink material, stretch material, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining 280f may also be constructed of the same material as the leg members or the retaining member 280f may be constructed of a different material than the leg members as long as the material is capable of retaining the leg members in the collapsed position.

As shown in FIG. 6, the retaining member 280f is connected to the second leg member 30f, however, for example, the retaining member 280f may be attached to either the first leg member 20f or the second leg member 20f or to any other area of the floral easel 10f that is suitable for connecting the retaining member 280f or may be a separate device unconnected to the floral easel 10f.

To move the floral easel 10f from the open or erected position (shown in FIG. 6A) to the collapsed position (shown in FIG. 6B), the second leg member 30f is rotated counter-clockwise about the arch 140f formed between the first leg member 20f and the second leg member 30f. The second side 110f of the first leg member 20f and the second side 130f of the second leg member 30f are compressed together thereby inverting the arch 140f between the first leg member 20f and the second leg member 30f. The second end 70f and the second end 90f may then be inserted into the retaining member 280f forming the leg members into a bundle 290f (shown in FIG. 6B).

Figure 7:
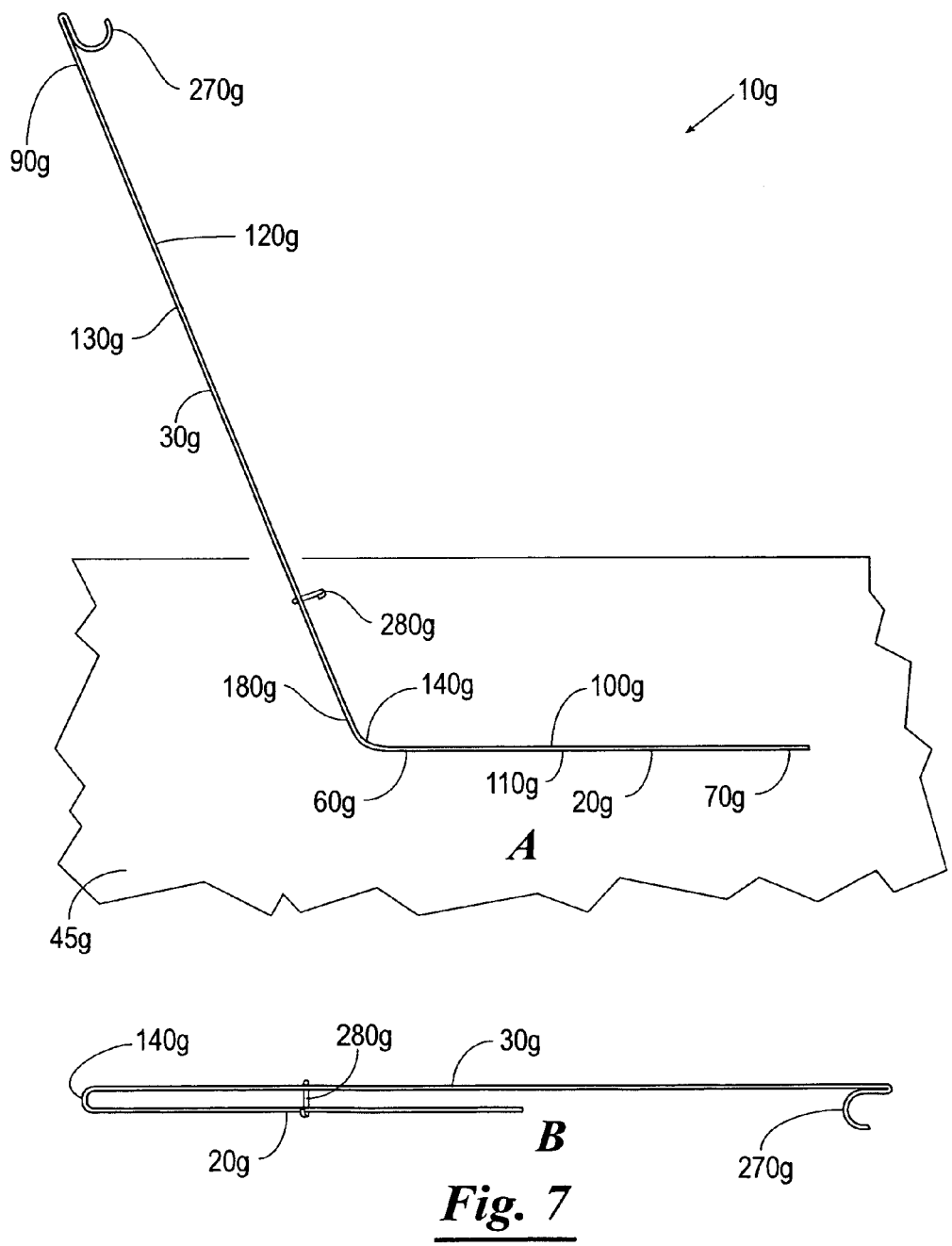
FIG. 7A is a perspective view of another embodiment of the erectable or collapsible floral easel of the present invention in the open position.
FIG. 7B is a perspective view of another embodiment of the erectable or collapsible floral easel of the present invention in the closed position.

Description of FIG. 7

Referring now to FIGS. 7A and 7B, designated generally by the reference numeral 10g is a floral easel. The floral easel 10g has a plurality of leg members and, in one embodiment shown in FIG. 7, the floral easel 10g has a first leg member 20g and a second leg member 30g.

As shown in FIGS. 7A and 7B, the first leg member 20g has a first end 60g, a second end 70g, a first side 10g and a second side 110g. The second leg member 30g has a first end 80g, a second end 90g, a first side 120g and a second side 130g. The first end 60g of the first leg member 20g and the first end 80g of the second leg member 30g are integrally connected forming an arch 140g where the first end 60g and first end 80g are joined. The second side 110g of the first leg member 20g is generally in contact with a substrate 45g to thereby support and hold the floral easel 10g. The substrate 45g may be any surface such as, for example, a floor, dirt, grass, fiber, plastic, or any surface capable of supporting the floral easel 10g thereon.

The first leg member 20g and the second leg member 30g may be formed as a single piece of material that is integrally connected (shown in FIGS. 7A and 7B as one piece of elastic or resilient material). Alternatively, the first leg member 20g and the second leg member 30g may be formed of two or more pieces of material. If the first leg member 20g and the second leg member 30g are formed of two or more pieces of material, the materials may differ or the materials may be the same. For example, if the first leg member 20g and the second leg member 30g are formed of two or more pieces of material, one of the leg members may be formed of steel and the other may be formed of aluminum. In another embodiment, each of the plurality of leg members may be formed of at least two or more materials. For example, at least a portion of at least one of the leg members may be steel and another portion of the leg member may be aluminum. In yet another embodiment, the first leg member 20g and the second leg member 30g may be integrally connected. The plurality of leg members may be constructed of the same material or a different material. For example, at least one of the plurality of leg members may be constructed of steel and the other leg members may be constructed of aluminum.

The floral easel 10g may be employed to hold and/or support a floral object (not shown) by placing the floral object about the second end 90g of the second leg member 30g of the floral easel 10g.

A support member 270g (FIGS. 7A and 7B) may also be employed to hold and/or support the floral object, however, any portion of the floral easel 10g may hold or support the floral object or non-floral object. The support member 270g may be connected to any area of the floral easel 10g such as, for example, the first leg member 20g, the second leg member 30g, or any other area capable of having the support member 270g attached thereto. The support member 270g may be any kind of device capable of supporting the floral object. For example, but not by way of limitation, the support member 270g may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270g, as shown in FIG. 7, is a hook connected to the second end 90g of the second leg member 30g.

The support member 270g may be constructed of the same material as the leg members or the support member 270g may be constructed of a different material than the leg members as long as the material is capable of holding and/or supporting the floral object.

The floral easel 10g may also have a retaining member 280g for retaining the leg members in the collapsed position. For example, but not by way of limitation, the retaining member 280g may be selected of the group consisting of elastic, a clip or clips, a spring, a band, shrink material, stretch material, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining member 280g may also be constructed of the same material as the leg members or the retaining member 280g may be constructed of a different material than the leg members as long as the material is capable of retaining the leg members in the collapsed position.

As shown in FIG. 7, the retaining member 280g is connected to the first leg member 20g, however, for example, the retaining member 280g may be attached to either the first leg member 20g or the second leg member 20g or to any other area of the floral easel 10g that is suitable for connecting the retaining member 280g or may be a separate device unconnected to the floral easel 10g.

To move the floral easel 10g from the open or erected position (shown in FIG. 7A) to the collapsed position (shown in FIG. 7B), the second leg member 30g is rotated clockwise about the arch 140g formed between the first leg member 20g and the second leg member 30g. The first side 100g of the first leg member 20g and the first side 120g of the second leg member 30g are compressed together thereby decreasing the angle formed at the arch 140g between the first leg member 20g and the second leg member 30g. The second end 70g and the second end 90g may then be inserted into the retaining member 280g forming the leg members into a bundle 290g (shown in FIG. 7B).

Description of FIG. 8

Figure 8A:
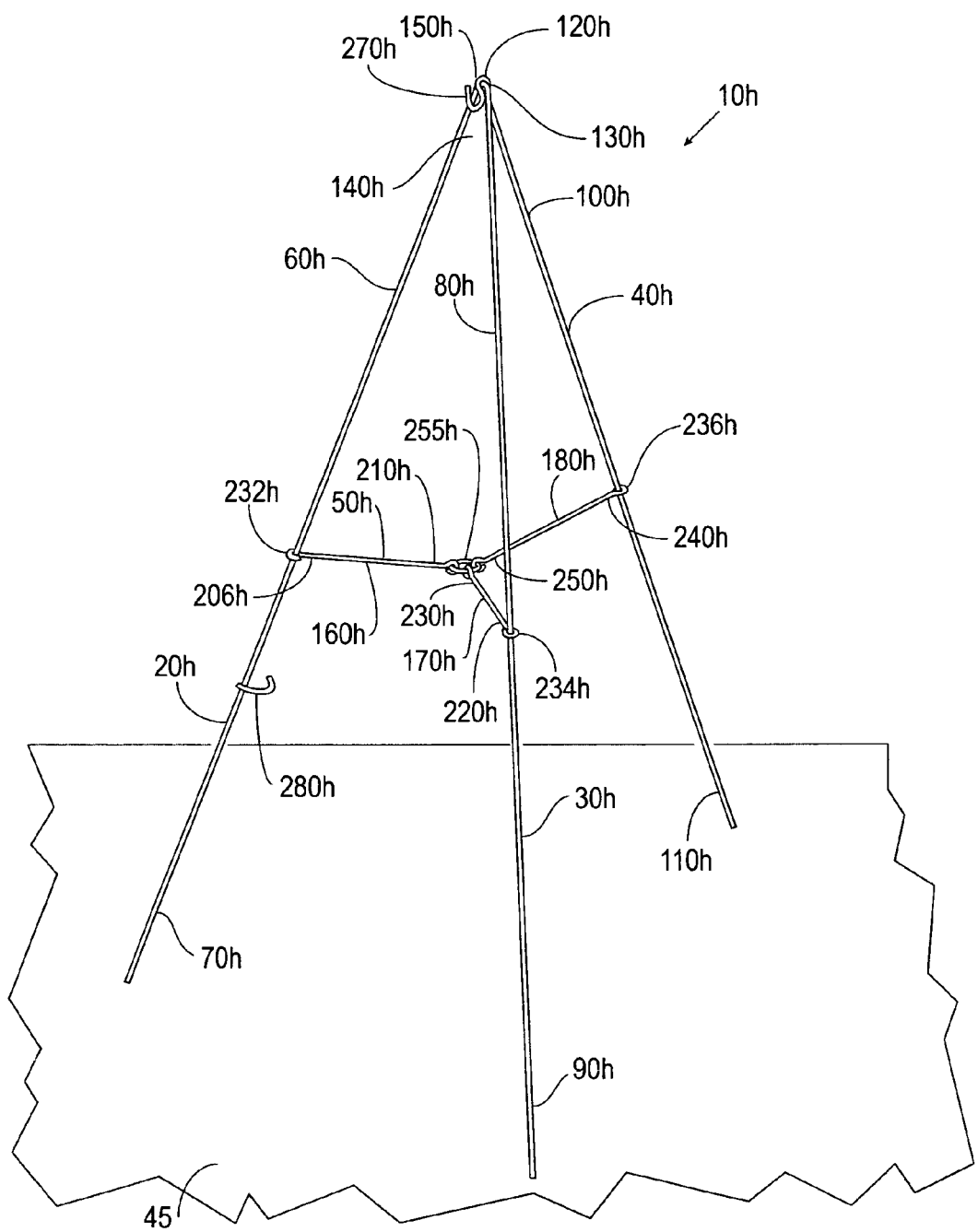
FIG. 8A is a perspective view of another embodiment of the erectable or collapsible floral easel of the present invention in the open position.
Figure 8B:
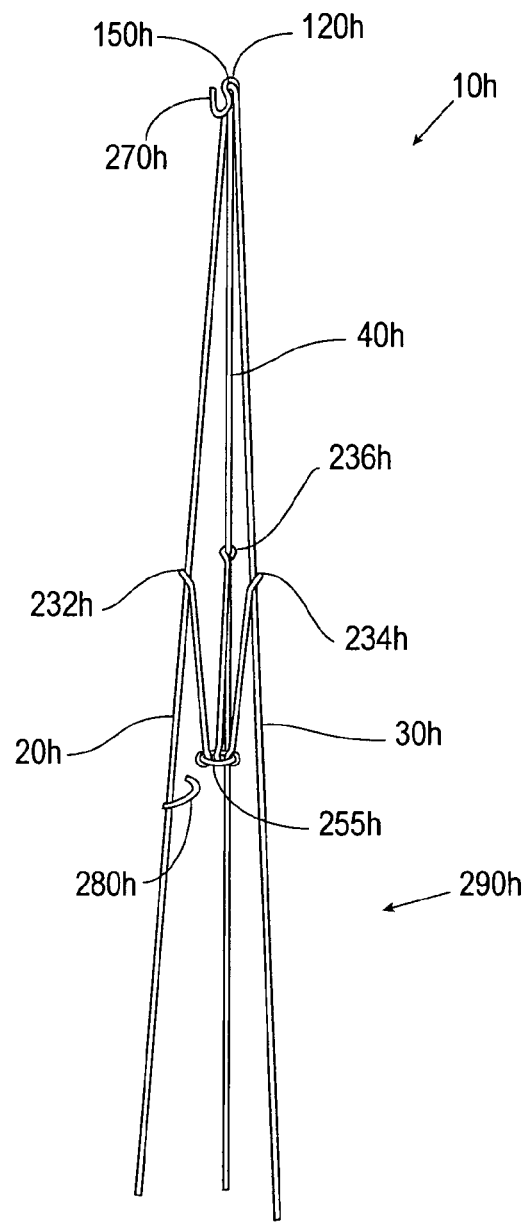
FIG. 8B is a perspective view of another embodiment of the erectable or collapsible floral easel of the present invention in the closed position.

Referring now to FIGS. 8A and 8B, designated generally by the reference numeral 10h, is a floral. The floral easel 10h has a plurality of leg members and, in one embodiment shown in FIG. 8, the floral easel 10h has a first leg member 20h, a second leg member 30h and a third leg member 40h. The floral easel 10h also includes a bracing assembly 50h for sustaining the floral easel 10h in an open or erected position shown in FIG. 8A.

As shown in FIGS. 8A and 8B, the first leg member 20h has a first end 60h and a second end 70h, the second leg member 30h has a first end 80h and a second end 90h, and the third leg member 40h has a first end 100h and a second end 10h. The first end 60h of the first leg member 20h, the first end 80h of the second leg member 30h, and the first end 100h of the third leg member 40h are associated at a joining member 120h. The second end 70h of the first leg member 20h, the second end 90h of the second leg member 30h, and the second end 110h of the third leg member 40h are generally in contact with a substrate 45h to thereby support and hold the floral easel 10h. The substrate 45h may be any surface such as, for example, a floor, dirt, grass, fiber, plastic, tile, carpet, combinations thereof, or any surface capable of supporting the floral easel 10h thereon.

At least two of the first leg member 20h, the second leg member 30h, and the third leg member 40h may be formed as a single piece of material that is integrally connected (shown in FIGS. 8A and 8B as one piece of tubular material forming an arch 130h having a center area 140h). Alternatively, at least two of the first leg member 20h, the second leg member 30h, and the third leg member 40h may be formed of two or more pieces of material. If the leg members are formed of two or more pieces of material, the materials may differ or the materials may be the same. For example, if the first leg member 20h and the second leg member 30h are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20h, the second leg member 30h, and the third leg member 40h may be integrally connected. The plurality of leg members may be constructed of the same material or of a different material. For example, at least one of the plurality of leg members may be constructed of steel and the other leg members may be constructed of aluminum.

The joining member 120h for connecting and/or receiving the first end of the leg members may be formed of the same material as the leg members or the joining member 120h may be formed of a different material than the leg members. Also, the joining member 120h may be integrally connected to the first end 100h of the third leg member 40h or formed separately from the first end 100h of the third leg member 40h. As shown in FIGS. 8A and 8B, the joining member 120h is integrally connected to the first end 100h of the third leg member 40h and is crimped around and pivotally connected to the arch 130h formed in the center area 140h thereby integrally joining the first end 60h of the first leg member 20h and the first end 70h of the second leg member 30h to define an apex 150h. However, the joining member 120h may be, for example, a solid block holding device, or any other device capable of receiving the first ends of the leg members. Also, the first end 100h of the third leg 40h need not be crimped around the arch 130h. In an alternative embodiment, the joining member 120h and the arch 130h are connected using materials that permit at least one of erecting and collapsing the floral easel 10h. Also, the first end 100h of the third leg 40h need not be pivotally connected to the arch 130h. In an alternative embodiment, the first end 100h may be flexibly connected to the arch 130h.

The bracing assembly 50h for sustaining the floral easel 10h in the open or erected position has a first arm 160h, a second arm 170h, and a third arm 180h. The first arm 160h has a first end 200h and a second end 210h. The second arm 170h has a first end 220h and a second end 230h. The third arm 180h has a first end 240h and a second end 250h. The first end 200b of the first arm 160h is connected to the first leg member 20h. The first end 220h of the second arm 170h is connected to the second leg member 30h. The first end 240h of the third arm 180h is connected to the third leg member 40h. The second end 210h of the first arm 160h, the second end 230h of the second arm 170h, and the second end 250h of the third arm 180h are connected to an arm support member 255h.

In the embodiment shown in FIGS. 8A and 8B, the bracing assembly 50h is constructed of more than one piece of material, however it is to be understood that the bracing assembly 50h may be constructed of one integrally connected piece of material. Alternatively, the bracing assembly 50h may be formed non-integrally from the leg members. In the embodiment shown in FIGS. 8A and 8B, the first end 200h of the first arm 160h forms a loop 232h around the first leg member 20h and is slidably connected to the first leg member 20h and the second end 210h of the first arm 160h is connected to the arm support member 255h. The first end 220h of the second arm 170h forms a loop 234h around the second leg member 30h and is slidably connected to the second leg member 30h and the second end 230h of the second arm 170h is connected to the arm support member 255h. The first end 240h of the third arm 180h forms a loop 236h around the third leg member 40h and is slidably connected to the third leg member 40h and the second end 250h of the third arm 180h is connected to the arm support member 255h. It will be appreciated, however, that the first arm 160h, the second arm 170h, and the third arm 180h may be connected to the leg members in any manner as long as the leg members are able to collapse. It will also be appreciated that the loops may either be slidably connected or connected in a fixed manner to each respective leg member.

The bracing assembly 50h may be constructed of the same material as the leg members or the bracing assembly 50h may be constructed of a different material than the leg members as long as the material allows the bracing assembly 50h to sustain the floral easel 10h in the open or erected position.

The floral easel 10h may be employed to hold and/or support a floral object (not shown) by placing the floral object about the first end 100h of the third leg member 40h of the floral easel 10h.

A support member 270h (FIGS. 8A and 8B) may also be employed to hold and/or support the floral object or non-floral object, however, any portion of the floral easel 10h may hold or support the floral object or non-floral object, such as, for example, the bracing assembly 50h, the joining member 120h or any other area of the floral easel 10h capable of supporting the floral object or non-floral object. The support member 270*h* may be connected to any area of the floral easel 10*h* such as, for example, the first ends of the plurality of leg members, the bracing assembly 50*h* or to any other area of the floral easel 10*h* to which the support member 270*h* may be attached. The support member 270*h* may be any kind of device capable of supporting the floral object. For example, but not by way of limitation, the support member 270*h* may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270*h*, as shown in FIG. 8, is a hook connected to the first end 100*h* of the third leg member 40*h*.

The support member 270*h* may be constructed of the same material as the leg members or the support member 270*h* may be constructed of a different material than the leg members as long as the material is capable of holding and/or supporting the floral object.

The floral easel 10*h* may also have a retaining member 280*h* for retaining the leg members in the collapsed position. For example, but not by way of limitation, the retaining member 280*h* may be selected of the group consisting of elastic, a clip or clips, a spring, a band, shrink material, stretch material, the joining member 120*h*, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining member 280*h* may also be constructed of the same material as the leg members or the retaining member 280*h* may be constructed from a different material than the leg members as long as the material is capable of retaining the leg members in the collapsed position. Alternatively, the retaining member 280*h* may be eliminated from the floral easel 10*h* and the plurality of leg members may be retained in the collapsed position by the joining member 120*h*.

As shown in FIG. 8, the retaining member 280*h* is connected to the first leg member 20*h*, however, for example, the retaining member 280*h* may be attached to any of the leg members, the bracing assembly 50*h* or to any other area of the floral easel 10*h* that is suitable for connecting the retaining member 280*h* or may be a separate device unconnected to the floral easel 10*h*.

To move the floral easel 10*h* from the open or erect position (shown in FIG. 8A) to the collapsed position (shown in FIG. 8B), the first end 200*h* of the first arm 160*h* (the loop 232*h*), the first end 220*h* of the second arm 170*h* (the loop 234*h*), and the first end 240*h* of the third arm 180*h* (the loop 236*h*) are moved toward the first end of each respective leg member so as to allow the leg members to collapse inward. The second end 70*h*, the second end 90*h*, and the second end 110*h* may then be inserted into the retaining member 280*h* forming the leg members into a bundle 290*h* (shown in FIG. 8B).

In an alternate embodiment, the loop 232*h*, the loop 234*h*, and the loop 236*h* may be fixed to each respective leg member. To move the floral easel 10*h* from the open or erect position to the closed position, the arm support member 255*h* may be moved in an upward direction so as to allow the first leg member 20*h*, the second leg member 30*h*, and the third leg member 40*h* to move from the open or erect position to the collapsed position so that the second end 70*h*, the second end 90*h*, and the second end 110*h* may be inserted into the retaining member 280*h* forming the leg members into the bundle 290*h* (shown in FIG. 8D).

Figure 8C:
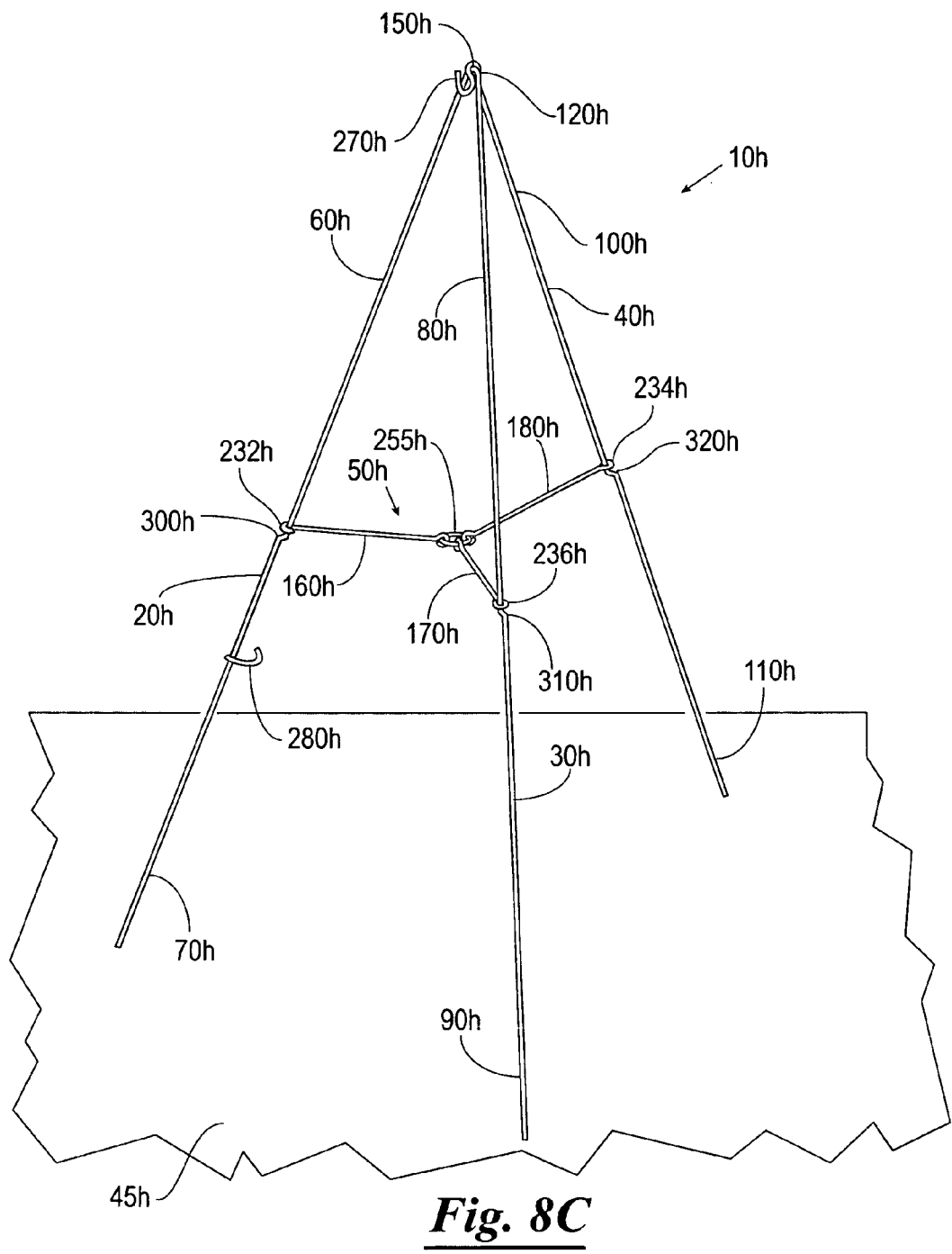
FIG. 8C is a perspective view of another embodiment of the erectable or collapsible floral easel of the present invention in the open position.
Figure 8D:
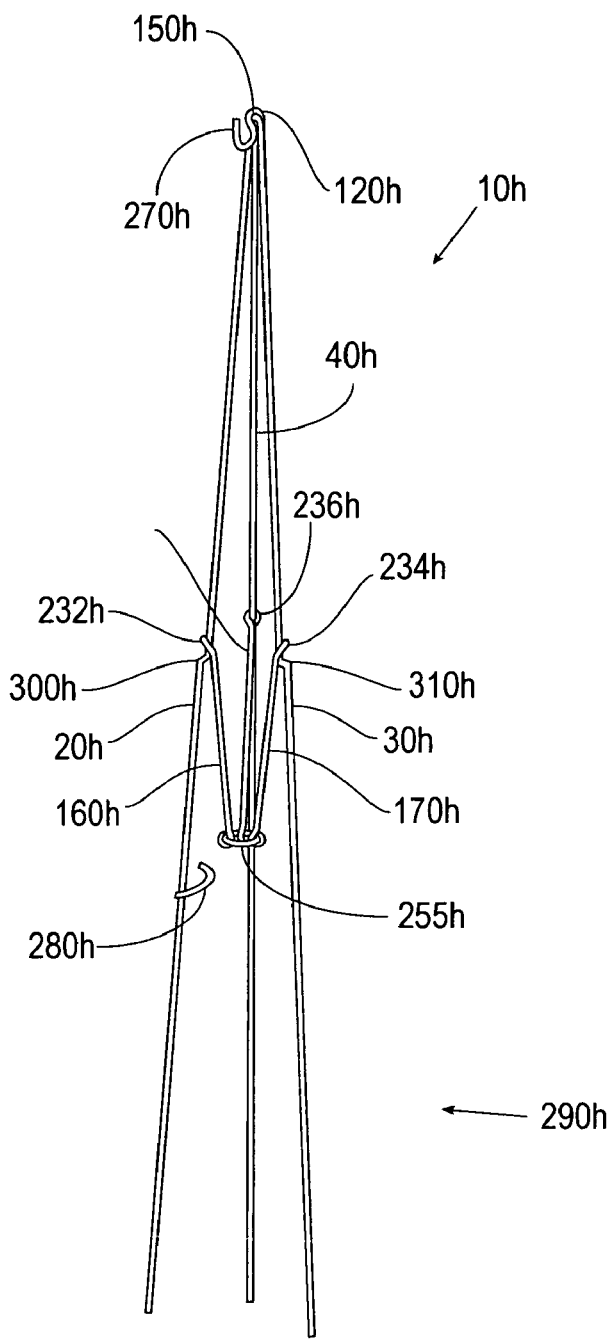
FIG. 8D is a perspective view of another embodiment of the erectable or collapsible floral easel of the present invention in the closed position.

In another embodiment of the present invention shown in FIGS. 8C and 8D, a portion of the first leg member 20*h*, the second leg member 30*h*, and the third leg member 40*h* may be bent to prevent each of the loops from moving toward the second end of each respective leg member. That is, the first leg member 20*h* has a bend 300*h* to prevent the loop 232*h* from moving toward the second end 70*h* of the first leg member 20*h*. The second leg member 30*h* has a bend 310*h* to prevent the loop 234*h* from moving toward the second end 90*h* of the second leg member 30*h*. The third leg member 40*h* has a bend 320*h* to prevent the loop 236*h* from moving toward the second end 110*h* of the third leg member 40*h*.

To move the floral easel 10*h* from the open or erect position (shown in FIG. 8C) to the collapsed position (shown in FIG. 8D), the loop 232*h*, the loop 234*h*, and the loop 236*h* are moved toward the first end of each respective leg member so as to allow the leg members to collapse inward. The second end 70*h*, the second end 90*h*, and the second end 110*h* may then be inserted into the retaining member 280*h* forming the leg members into a bundle 290*h* (shown in FIG. 8D).

In an alternate embodiment, the loop 232*h*, the loop 234*h*, and the loop 236*h* may be fixed to each respective leg member. To move the floral easel 10*h* from the open or erect position to the closed position, the arm support member 255*h* may be moved in an upward direction so as to allow the first leg member 20*h*, the second leg member 30*h*, and the third leg member 40*h* to move from the open or erect position to the collapsed position so that the second end 70*h*, the second end 90*h*, and the second end 110*h* may be inserted into the retaining member 280*h* forming the leg members into the bundle 290*h* (shown in FIG. 8D).

Figure 9:
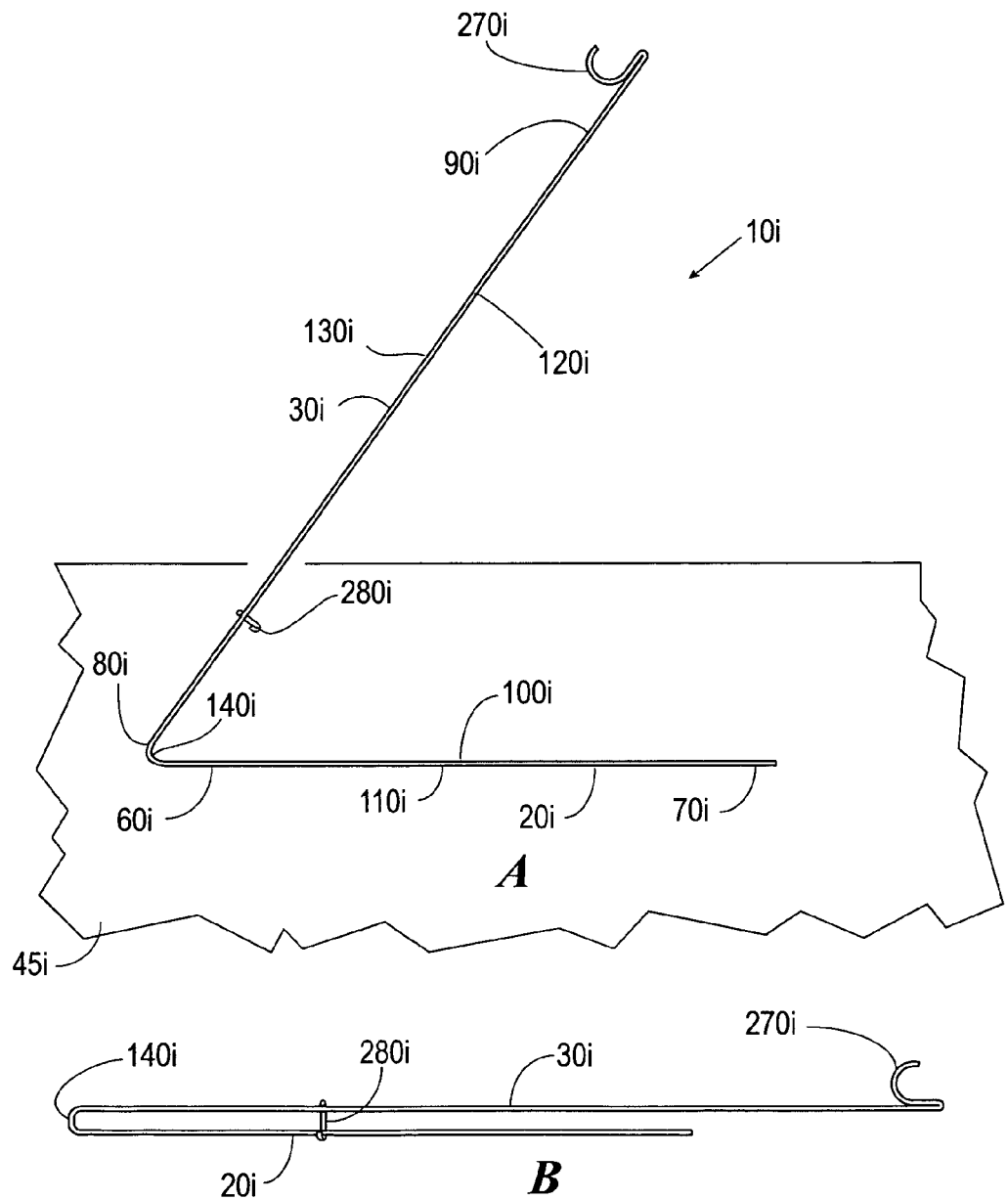
FIG. 9A is a perspective view of another embodiment of the erectable or collapsible floral easel of the present invention in the open position.
FIG. 9B is a perspective view of another embodiment of the erectable or collapsible floral easel of the present invention in the closed position.

Description of FIG. 9

Referring now to FIGS. 9A and 9B, designated generally by the reference numeral 10*i* is a floral easel. The floral easel 10*i* has a plurality of leg members and, in one embodiment shown in FIG. 9, the floral easel 10*i* has a first leg member 20*i* and a second leg member 30*i*.

As shown in FIGS. 9A and B, the first leg member 20*i* has a first end 60*i*, a second end 70*i*, a first side 100*i* and a second side 110*i*. The second leg member 30*i* has a first end 80*i*, a second end 90*i*, a first side 120*i* and a second side 130*i*. The first end 60*i* of the first leg member 20*i* and the first end 80*i* of the second leg member 30*i* are integrally connected forming an acute angle 140*i* where the first end 60*i* and first end 80*i* are joined. The second side 110*i* of the first leg member 20*i* is generally in contact with a substrate 45*i* to thereby support and hold the floral easel 10*i*. The substrate 45*i* may be any surface such as, for example, a floor, dirt, grass, fiber, plastic, or any surface capable of supporting the floral easel 10*i* thereon.

The first leg member 20*i* and the second leg member 30*i* may be formed as a single piece of material that is integrally connected (shown in FIGS. 9A and 9B as one piece of springy material). Alternatively, the first leg member 20*i* and the second leg member 30*i* may be formed of two or more pieces of material. If the first leg member 20*i* and the second leg member 30*i* are formed of two or more pieces of material, the materials may differ or the materials may be the same. For example, if the first leg member 20*i* and the second leg member 30*i* are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20*i* and the second leg member 30*i* may be integrally connected. The plurality of leg members may be constructed of the same material of a different material. For example, at least one of the plurality of leg members may be constructed of steel and the other leg member may be constructed of aluminum.

A support member 270i (FIGS. 9A and 9B) may also be employed to hold and/or support the floral object or non-floral object, however, any portion of the floral easel 10i may hold or support the floral object or the non-floral object. The support member 270i may be connected to any area of the floral easel 10i such as, for example, the first leg member 20i, the second leg member 30i or any other area capable of having the support member 270i attached thereto. The support member 270i may be any kind of device capable of supporting the floral object. For example, but not by way of limitation, the support member 270i may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270i, as shown in FIG. 9, is a hook connected to the second end 90i of the second leg member 30i.

The support member 270i may be constructed of the same material as the leg members or the support member 270i may be constructed of a different material than the leg members as long as the material is capable of holding and/or supporting the floral object.

The floral easel 10i may also have a retaining member 280i for retaining the leg members in the collapsed position. For example, but not by way of limitation, the retaining member 280i may be selected of the group consisting of elastic, a clip or clips, a spring, a band, shrink material, stretch material, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining 280i may also be constructed of the same material as the leg members or the retaining member 280i may be constructed of a different material than the leg members as long as the material is capable of retaining the leg members in the collapsed position.

As shown in FIG. 9, the retaining member 280i is connected to the second leg member 30i, however, for example, the retaining member 280i may be attached to either the first leg member 20i or the second leg member 20i or to any other area of the floral easel 10i that is suitable for connecting the retaining member 280i or may be a separate device unconnected to the floral easel 10i.

To move the floral easel 10i from the open or erected position (shown in FIG. 9A) to the collapsed position (shown in FIG. 9B), the second leg member 30i is rotated either clockwise or counter-clockwise about the acute angle 140i formed between the first leg member 20i and the second leg member 30i. By rotating the floral easel 10i clockwise about the acute angle 140i, the first side 100i of the first leg member 20i and the first side 120i of the second leg member 30i are compressed together thereby decreasing the angle formed at the acute angle 140i between the first leg member 20i and the second leg member 30i. The second end 70i and the second end 90i may then be inserted into the retaining member 280i forming the leg members into a bundle 290i (shown in FIG. 9B). By rotating the floral easel 10i clockwise about the acute angle 140i, the second side 110i of the first leg member 20i and the second side 130i of the second leg member 30i are compressed together thereby inverting the acute angle 140i between the first leg member 20i and the second leg member 30i. The second end 70i and the second end 90i may then be inserted into the retaining member 280i forming the leg members into a bundle 290i(shown in FIG. 9B or NOT SHOWN—need to decide).

Figure 10:
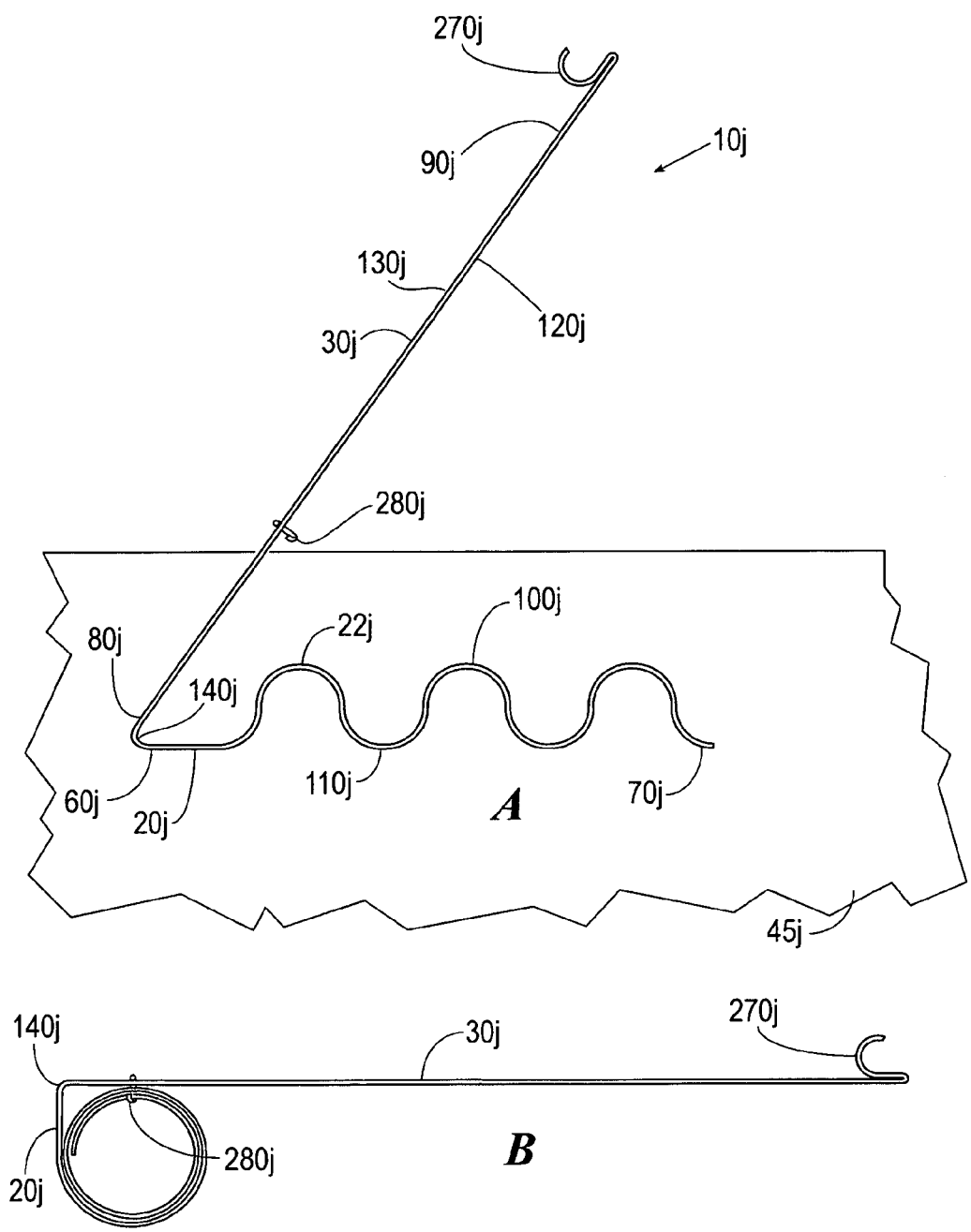
FIG. 10A is a perspective view of another embodiment of the erectable or collapsible floral easel of the present invention in the open position.
FIG. 10B is a perspective view of another embodiment of the erectable or collapsible floral easel of the present invention in the closed position.

Description of FIG. 10

Referring now to FIGS. 10A and 10B, designated generally by the reference numeral 10j is a floral easel. The floral easel 10j has a plurality of leg members and, in one embodiment shown in FIG. 10, the floral easel 10j has a first leg member 20j and a second leg member 30j.

As shown in FIGS. 10A and 10B, the first leg member 20j has a first end 60j, a second end 70j, a first side 100j and a second side 110j. The first leg member 20j has a plurality of arches 22j formed therein. The arches 22j may be rigid or they may be collapsible. The second leg member 30j has a first end 80j, a second end 90j, a first side 120j and a second side 130j. The first end 60j of the first leg member 20j and the first end 80j of the second leg member 30j are integrally connected forming an acute angle 140j where the first end 60j and first end 80j are joined. The second side 110j of the first leg member 20j is generally in contact with a substrate 45j to thereby support and hold the floral easel 10j. The substrate 45j may be any surface such as, for example, a floor, dirt, grass, fiber, plastic, or any surface capable of supporting the floral easel 10j thereon.

The first leg member 20j and the second leg member 30j may be formed as a single piece of material that is integrally connected (shown in FIGS. 10A and 10B as one piece of elastic or resilient material). Alternatively, the first leg member 20j and the second leg member 30j may be formed of two or more pieces of material. If the first leg member 20j and the second leg member 30j are formed of two or more pieces of material, the materials may differ or the materials may be the same. For example, if the first leg member 20j and the second leg member 30j are formed of two or more pieces of material, one of the leg members may be formed of steel and the other may be formed of aluminum. In another embodiment, each of the plurality of leg members may be formed of at least two or more materials. For example, at least a portion of at least one of the leg members may be steel and another portion of the leg member may be aluminum. In yet another embodiment, the first leg member 20j and the second leg member 30j may be integrally connected. The plurality of leg members may be constructed of the same material or a different material. For example, at least one of the plurality of leg members may be constructed of steel and the other leg members may be constructed of aluminum.

The floral easel 10j may be employed to hold and/or support a floral object (not shown) by placing the floral object about the second end 90j of the second leg member 30j of the floral easel 10j.

A support member 270j (FIGS. 10A and 10B) may also be employed to hold and/or support the floral object, however any portion of the floral easel 10j may hold or support the floral object or non-floral object. The support member 270j may be connected to any area of the floral easel 10j such as, for example, the first leg member 20j, the second leg member 30j, or any other area capable of having the support member 270j attached thereto. The support member 270j may be any kind of device capable of supporting the floral object. For example, but not by way of limitation, the support member 270j may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. The support member 270j, as shown in FIG. 10j, is a hook connected to the second end 90j of the second leg member 30j.

The support member 270j may be constructed of the same material as the leg members or the support member 270j may be constructed of a different material than the leg members as long as the material is capable of holding and/or supporting the floral object.

The floral easel 10j may also have a retaining member 280j for retaining the leg members in the collapsed position. For example, but not by way of limitation, the retaining member 280j may be selected of the group consisting of elastic, a clip or clips, a spring, a band, shrink material, stretch material, a carton, a tube, a bend in the leg members, a groove, a slot, a hook, a loop, a wire, a bow, a rope, a magnet, a cord, a chain, a strap, a cable, adhesive, combinations thereof, or any other device capable of retaining the leg members in the collapsed position. The retaining member 280j may also be constructed of the same material as the leg members or the retaining member 280j may be constructed of a different material than the leg members as long as the material is capable of retaining the leg members in the collapsed position.

As shown in FIG. 10j, the retaining member 280j is connected to the first leg member 20j, however, for example, the retaining member 280j may be attached to either the first leg member 20j or the second leg member 20j or to any other area of the floral easel 10j that is suitable for connecting the retaining member 280j or may be a separate device unconnected to the floral easel 10j.

To move the floral easel 10j from the open or erected position (shown in FIG. 10A) to the collapsed position (shown in FIG. 10B), the second leg member 30j is rotated clockwise about the acute angle 140j formed between the first leg member 20j and the second leg member 30j. The first side 100j of the first leg member 20j and the first side 120j of the second leg member 30j are compressed together thereby decreasing the angle formed at the acute angle 140j between the first leg member 20j and the second leg member 30j. The second end 70j and the second end 90j may then be inserted into the retaining member 280j forming the leg members into a bundle 290j (shown in FIG. 10B).

Description of FIG. 11

Referring now to FIGS. 11A-11D, designated generally by the reference numeral 10k is a floral easel. The floral easel 10k has a plurality of leg members and, in one embodiment shown in FIGS. 11A-11B, the floral easel 10k has a first leg member 20k, a second leg member 30k, and a third leg member 40k.

Figure 11A:
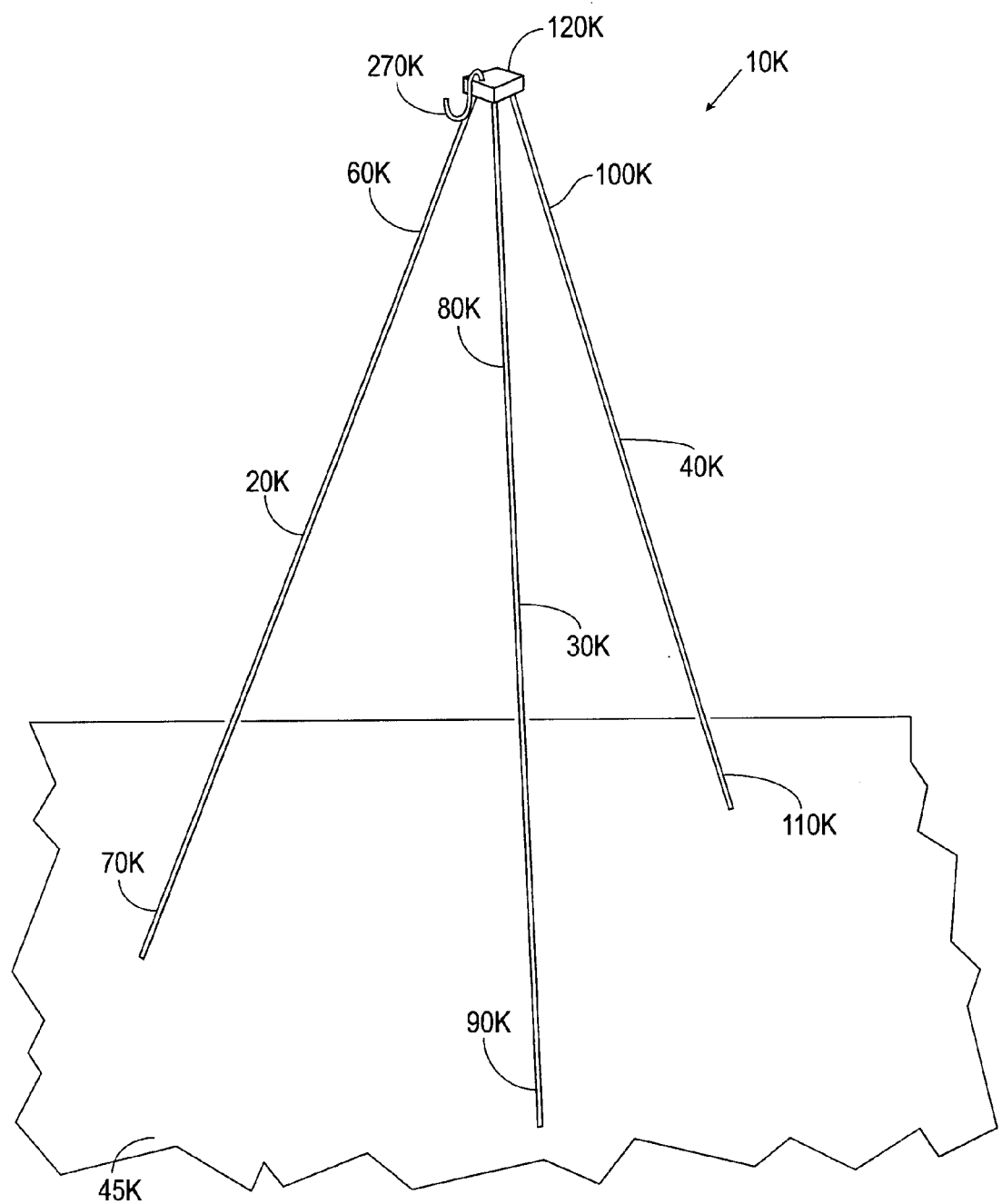
FIG. 11A is a perspective view of another embodiment of the erectable or collapsible floral easel of the present invention in the open position.
Figures 11B, 11C:
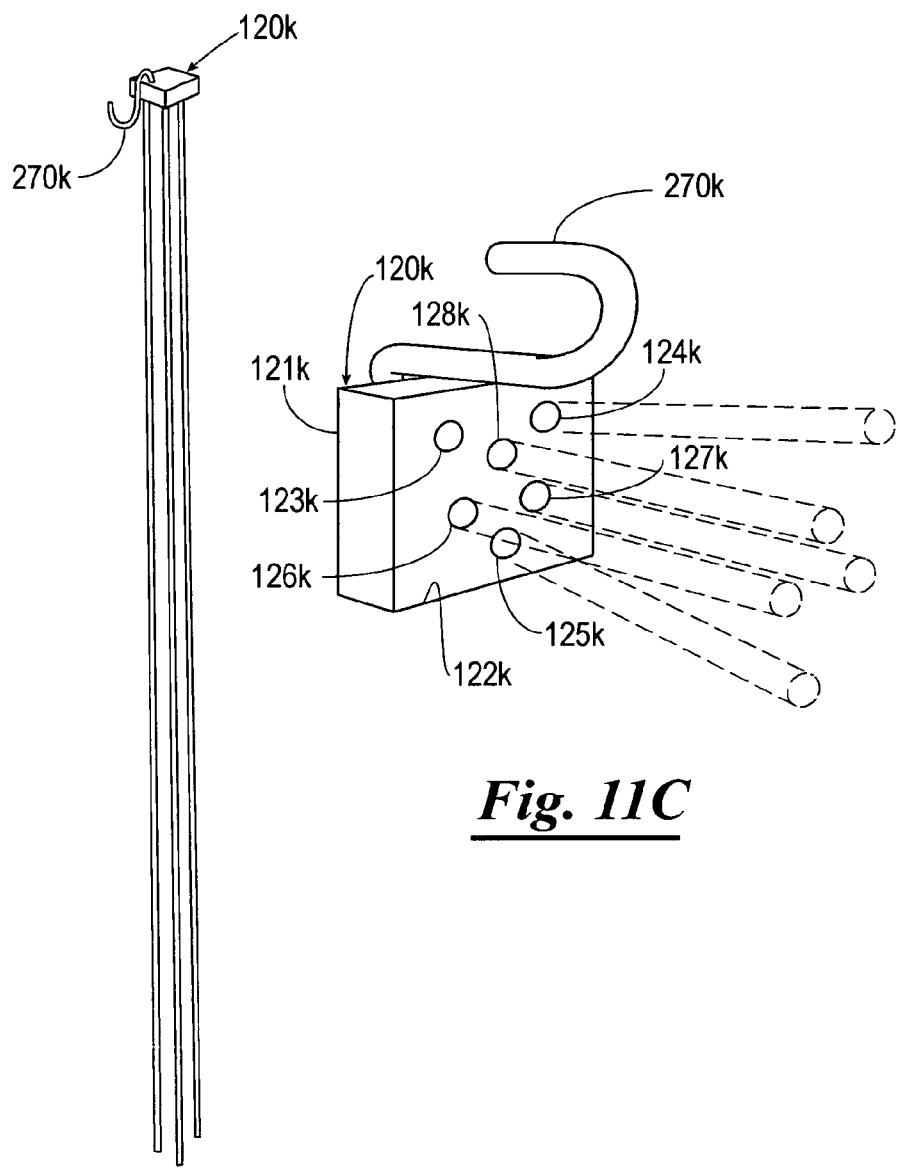
FIG. 11B is a perspective view of another embodiment of the erectable or collapsible floral easel of the present invention in the closed position.
FIG. 11C is a perspective view of the joining member of the embodiment of the erectable or collapsible floral easel as shown in FIGS. 11A-11B.

As shown in FIGS. 11A-11B, the first leg member 20k has a first end 60k and a second end 70k. The second leg member 30k has a first end 80k and a second end 90k. The third leg member 40k has a first end 100k and a second end 110k. The first end 60k of the first leg member 20k, the first end 80k of the second leg member 30k, and the first end 100k of the third leg member 40k are capable of being placed into a joining member 120k having a plurality of openings therein for positioning the leg members in the open or closed position. In the embodiment shown in FIGS. 11A-11C, the joining member 120k has a top portion 121k and a bottom portion 122k. The bottom portion has a first exterior opening 123k, a second exterior opening 124k, and a third exterior opening 125k therein for placing the leg members in the open position (FIG. 11C). The joining member 120k also has a first interior opening 126k, a second interior opening 127k, and a third interior opening 128k for placing the leg members in the closed position (FIG. 11C). The joining member 120k may be any shape so as to support the leg members such as, for example, a block, an oval, a circle, a triangle, a pentagon, a hexagon, or any other shape capable of receiving and supporting the plurality of leg members. Further, the joining member 120k may be constructed of any material capable of receiving and supporting the plurality of leg members such as, for example, wood, plastic, rubber, metal, or any other material capable of receiving and supporting the plurality of leg members. The second end 70k of the first leg member 20k, the second end 90k of the second leg member 30k, and the second end 110k of the third leg member 40k are generally in contact with a substrate 45k (shown in FIG. 11A) to thereby support and hold the floral easel 10k. The substrate 45k may be any surface such as, for example, a floor, dirt, grass, fiber, plastic, tile, carpet, combinations thereof, or any surface capable of supporting the floral easel 10k thereon.

The first leg member 20k and the second leg member 30k may be formed of two or more pieces of material. If the first leg member 20k and the second leg member 30k are formed of two or more pieces of material, the materials may differ or the materials may be the same. For example, if the first leg member 20k and the second leg member 30k are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. In yet another embodiment, the first leg member 20k, the second leg member 30k, and the third leg member 30k may be integrally connected. The plurality of leg members may be constructed of the same material or a different material. For example, at least one of the plurality of leg members may be constructed of steel and the other leg members may be constructed of aluminum.

A support member 270k (FIGS. 11A-11C) may also be employed to hold and/or support the floral object 260k (or non-floral object), however, any portion of the floral easel 10k may hold or support the floral object 260k or non-floral object, such as, for example, the joining member 120k or any other area of the floral easel 10k capable of supporting the floral object 260k or a non-floral object. The support member 270k may be connected to any area of the floral easel 10k such as, for example, the joining member 120k or the leg members. Shown in FIGS. 11A-11C, the support member 270k is connected to the top portion of the joining member 120k. However, the support member 270k may be connected to any portion of the joining member 120k. The support member 270k may be any kind of device capable of supporting the floral object 260k. For example, but not by way of limitation, the support member 270k may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object 260k.

The support member 270k may be constructed of the same material as the leg members or the support member 270k may be constructed of a different material than the leg members as long as the material is capable of holding and/or supporting the floral object 260k.

The floral easel 10k may also have a retaining member (not shown) for retaining the leg members in the collapsed position. For example, but not by way of limitation, the retaining member may be selected from the group consisting of elastic, a clip or clips, a spring, a band, shrink material, stretch material, the joining member 120k, a carton, a tube, a bend in the leg members, a groove, a slot, a loop, a hook, a wire, a bow, a rope, a magnet, a cord, a chain, a strap, a cable, adhesive, combinations thereof, or any other device capable of retaining the leg members in the collapsed position. The retaining member may also be constructed of the same material as the leg members or the retaining member may be constructed of a different material than the leg members as long as the material is capable of retaining the leg members in the collapsed position. Alternatively, the retaining member may be eliminated from the floral easel 10 and the plurality of leg members may be retained in the collapsed position by the joining member 120*k*.

To move the floral easel 10*k* from the open or erected position (shown in FIG. 11A) to the collapsed position (shown in FIG. 11B), the first ends of the leg members are moved from the exterior openings (123*k*, 124*k* and 125*k*) (FIG. 11C) in the joining member 120*k* to the interior openings (126*k*, 127*k*, and 128*k*) (FIG. 11C) in the joining member 120*k*.

Figure 11D:
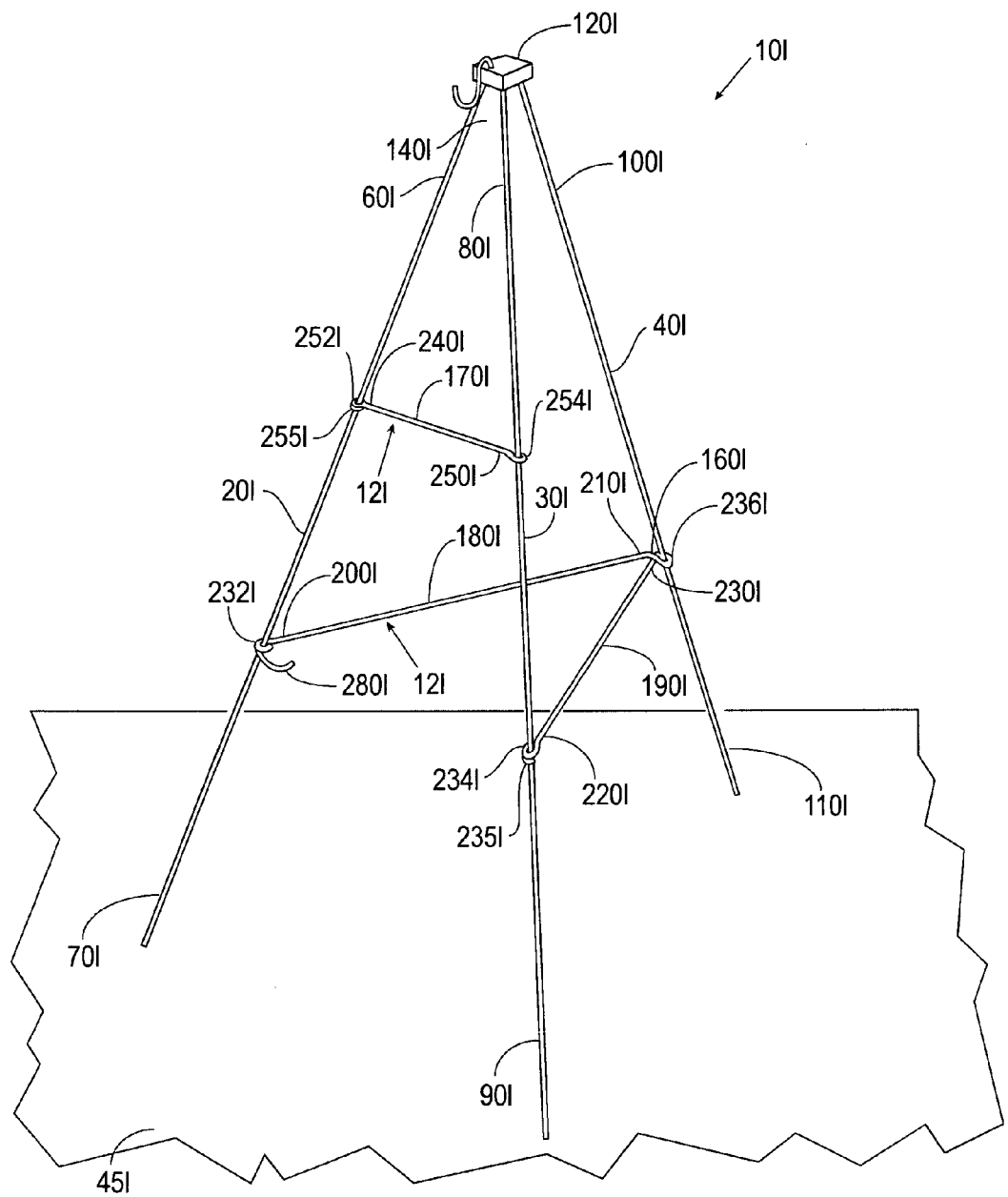
FIG. 11D is a perspective view of another embodiment of the erectable or collapsible floral easel of the present invention in the open position.

Shown in FIG. 11D is another embodiment of the floral easel 10*l* wherein the floral easel 10*l* has a splay assembly 12*l* for sustaining the floral easel 10*l* in the open or erected position. The splay assembly 12*l* has a bracing assembly 160*l* and a reinforcing member 170*l*. It should be understood that the splay assembly 12*l* may be formed separately from the legs or the splay assembly 12*l* may be integrally connected to the legs. Alternatively, the bracing assembly 160*l* may be formed non-integrally from the legs and the reinforcing member 170*l* may be formed integrally with the legs or vice-versa. The bracing assembly 160*l* has a first arm 180*l* and a second arm 190*l*. The first arm 180*l* has a first end 200*l* and a second end 210*l*. The second arm 190*l* has a first end 220*l* and a second end 230*l*. The first end 200*l* of the first arm 180*l* is connected to the first leg member 20*l*. The first end 220*l* of the second arm 190*l* is connected to the second leg member 30*l*. The second end 210*l* of the first arm 180*l* and the second end 230*l* of the second arm 190*l* are connected to the third leg member 40*l*. In the embodiment shown in FIG. 11D, the bracing assembly 160*l* is constructed of one continuous piece of material. The first end 200*l* of the first arm 180*l* forms a loop 232*l* around the first leg member 20*l* and is slidably connected to the first leg member 20*l*, the first end 220*l* of the second arm 190*l* forms a loop 234*l* around the second leg member 30*l* and is slidably connected to the second leg member 30*l*, the second end 210*l* of the first arm 180*l* and second end 230*l* of the second arm 190*l* form a contiguous loop 236*l* around the third leg member 40*l* and the loop 236*l* is slidably and pivotally connected to the third leg member 40*l*. It will be appreciated, however, that the first arm 180*l* and the second arm 190*l* may be connected to the leg members in any manner as long as the leg members are able to fully collapse.

The bracing assembly 160*l* may be a single piece of material, or more than one piece of material. For example, as shown in FIG. 11D, the bracing assembly 160*l* is a single piece of material wherein the second end 210*l* of the first arm 180 and the second end 230*l* of the second arm 190*l* form a continuous loop around the third leg member 40*l* wherein the looped area is slidably and pivotally connected to the third leg member 40. If the bracing assembly 160*l* is fabricated using sufficiently flexible and springy material, it need not be slidably or pivotally connected to any or all of the plurality of leg members.

The bracing assembly 160*l* may be constructed of the same material as the leg members or the bracing assembly 160*l* may be constructed of a different material than the leg members as long as the material allows the bracing assembly 160*l* to sustain the floral easel 10 in the open or erected position.

If the third leg 40*l* is not pivotally connected to at least one of the first leg 20*l* and the second leg 30*l* or, if the third leg 40*l* is pivotally connected to at least one of the first leg 20*l* and the second leg 30*l* limiting its travel to positions of full erection, full collapse, or intermediate positions and, if the first leg 20*l* and the second leg 30*l* are connected to limit travel to positions from full erection to full collapse, then at least one of the bracing assembly 160*l* and reinforcing member 170*l* can be eliminated from this embodiment of the floral easel 10*l*.

A stop member 235*l* may be connected adjacent and underneath the second arm 190*l* of the bracing assembly 160*l* to prevent the bracing assembly 160*l* from sliding down the second leg member 30*l* of the floral easel 10*l*. The stop member 235*l* may be constructed of the same material as the leg member or of a different material than the leg member. In the embodiment shown in FIG. 11D, the stop member 235*l* is a horizontal cross-piece connected adjacent and below the second arm 190*l* of the bracing assembly 160*l*. However, the stop member 235*l* may be connected to any of the leg members of the floral easel 10*l*. It should be understood that the stop member 235*l* is not required, however, for embodiments in which the bracing assembly 160*l* is slidably or pivotally connected to at least one leg member, the stop member 235*l* aids in the erection and enhances the stability of the floral easel 10*l*.

The reinforcing member 170*l* has a first end 240*l* and a second end 250*l*. The first end 240*l* is connected to the first leg member 20*l* and the second end 250*l* is connected to the second leg member 30*l*. In the embodiment shown in FIG. 11D, the first end 240*l* forms a loop 252*l* around the first leg member 20*l* and is slidably connected to the first leg member 20*l* and the second end 250*l* forms a loop 254*l* around the second leg member 30*l* and is slidably connected to the second leg member 30*l*. It will be appreciated, however, that the first end 240*l* and second end 250*l* may be connected in any manner to the first leg member 20*l* and second leg member 30*l* of the floral easel 10*l*.

For example, but not by way of limitation, the reinforcing member 170*l* may be selected from the group consisting of elastic, a rope, a cord, a chain, a strap, a cable, a wire, springs, tubing, plastic, profiles, wood, polymer/fiber, adhesive, cohesive, velcro, combinations thereof or any other device which allows the floral easel 10*l* to be sustained in the open or erected position. The reinforcing member 170*l* may also be constructed of the same material as the leg members or the reinforcing member 170*l* may be constructed of a different material than the leg members as long as the material allows the reinforcing member 170*l* to sustain the floral easel 10*l* in the open or erected position. It will be appreciated, however, that the reinforcing member 170*l* is not necessary in alternate embodiments where a more flexible floral easel 10*l* is desirable or acceptable for use.

A stop member 255*l* may also be connected to the first leg member 20*l* of the floral easel 10*l* and placed adjacent and underneath the first end 240*l* of the reinforcing member 170*l* for preventing the reinforcing member 170*l* from sliding down the first leg member 20*l* of the floral easel 10*l*. However, it should be understood that the stop member 235*l* may be placed on either the first leg member 20*l* or the second leg member 30*l* of the floral easel 10*l*. The stop member 255*l* may be constructed of the same material as the designated leg member or of a different material than the designated leg member. In the embodiment shown in FIG. 11D, the stop member 255*l* is a horizontal cross-piece connected adjacent and below the first end 240*l* of the reinforcing member 170*l*. However, the stop member 255*l* may be connected to either the first leg member 20*l*, the second leg member 30, the third leg member 40*l* or any of the first leg member 20*l*, the second leg member 30*l*, and the third leg member 40*l* of the floral easel 10*l*. It should be understood that multiple stop members may be used on the floral easel. It should also be understood that the stop members are not necessary to the erection, collapse, or stability of the floral easel 10*l*; however, the stop members may enhance stability and facilitate erection of the floral easel 10*l*. The reinforcing member 170*l* may also provide at least one location on the floral easel 10*l* to which floral objects and decorations may be fastened using wire clips, glue or any other fastening means capable of securing floral objects and decorations to the floral easel 10*l*.

The floral easel 10*l* may also have a retaining member 280*l* for retaining the leg members in the collapsed position. For example, but not by way of limitation, the retaining member 280*l* may be selected from the group consisting of elastic, a clip or clips, a spring, a band, shrink material, stretch material, the joining member 120*l*, a carton, a tube, a bend in the leg members, a groove, a slot, a loop, a hook, a wire, a bow, a rope, a magnet, a cord, a chain, a strap, a cable, adhesive, combinations thereof, or any other device capable of retaining the leg members in the collapsed position. The retaining member 280*l* may also be constructed of the same material as the leg members or the retaining member 280*l* may be constructed of a different material than the leg members as long as the material is capable of retaining the leg members in the collapsed position. Alternatively, the retaining member 280*l* may be eliminated from the floral easel 10*l* and the plurality of leg members may be retained in the collapsed position by the joining member 120*l*.

As shown in FIG. 11D, the retaining member 280 is connected to the first leg member 20; however, for example, the retaining member 280 may be attached to any of the leg members, the bracing assembly 160, the reinforcing member 170, or to any other area of the floral easel 10 that is suitable for connecting the retaining member 280 or may be a separate device unconnected to the floral easel 10.

To move the floral easel 10*l* from the open or erected position (shown in FIG. 11D) to the collapsed position (not shown), the bracing assembly 160*l* is rotated about the loop 232*l* and the loop 234*l* to cause the loop 236*l* to slide in an upward direction toward the first end 100*l* of the third leg member 40*l* thereby pivoting the third leg member 40*l* inward toward the area between the first leg member 20*l* and the second leg member 30*l*. The reinforcing member 170*l* is also moved in an upward direction to cause the loop 254*l* of the second end 250*l* of the reinforcing member 170*l* to slide in an upward manner along the first end 100*l* of the second leg member 30*l*. The first end 60*l* of the first leg member 20*l* and the first end 80*l* of the second leg member 30*l* are compressed together thereby decreasing the angle formed at the arch 130*l* between the center area 140*l* of the first leg member 20*l* and the second leg member 30*l*. The second end 70*l*, the second end 90*l*, and the second end 110*l* may then be inserted into the retaining member 280*l* forming the leg members into a bundle 290*l* (not shown).

The various embodiments of the floral easel described herein in FIGS. 1-11, may be further shipped and/or stored. To ship the various embodiments of the floral easel described herein in FIGS. 1-11, the plurality of legs of the floral easel may be collapsed to the closed position and held in place by the retaining member; the floral easel may then be placed into a shipping container such as, for example, a box or crate, and the floral easel may be shipped to a predetermined location. Further, the various embodiments of the floral easel described herein in FIGS. 1-11, may be placed into a storage area for an indefinite period of time wherein the plurality of legs are collapsed into the closed position so as to store the floral easel in a storage area for an indefinite period of time.

Description of FIG. 12

Referring now to FIGS. 12A-12I, designated generally by the reference numeral 10*m*-10*u*, respectively, is a floral easel. The floral easel 10*m*-10*u* has a top end 20*m*-20*u*, a bottom end 30*m*-30*u* and a side wall 40*m*-40*u* extending therebetween. The top end 20*m*-20*u*, the bottom end 30*m*-30*u* and the sidewall 40*m*-40*u* are formed so as to have the appearance of a cone as shown in FIGS. 12A-12I. The top end 20*m*-20*u* may have an aperture therethrough or may be solid. The bottom end 30*m*-30*u* may have an aperture therethrough or may be solid. The floral easel 10*m*-10*u* may be a solid structure or may be hollow. The bottom end 30*m*-30*u* is generally in contact with a substrate 45*m*-45*u* to thereby support and hold the floral easel 10*m*-10*u*. The substrate 45*m*-45*u* may be any surface such as, for example, a floor, dirt, grass, fiber, plastic, or any surface capable of supporting the floral easel 10*m*-10*u* thereon.

Figure 12A:
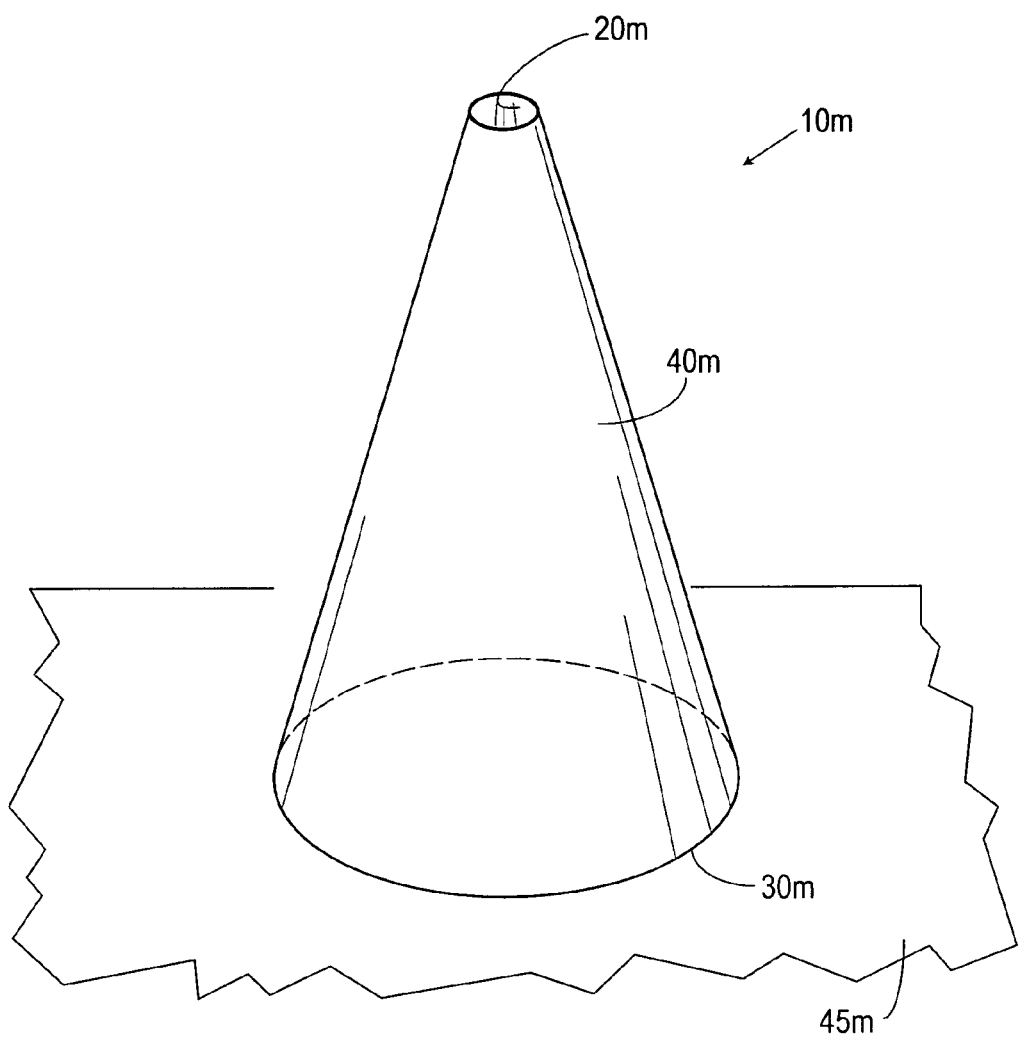
FIG. 12A is a perspective view of another embodiment of the floral easel of the present invention.
Figure 12B:
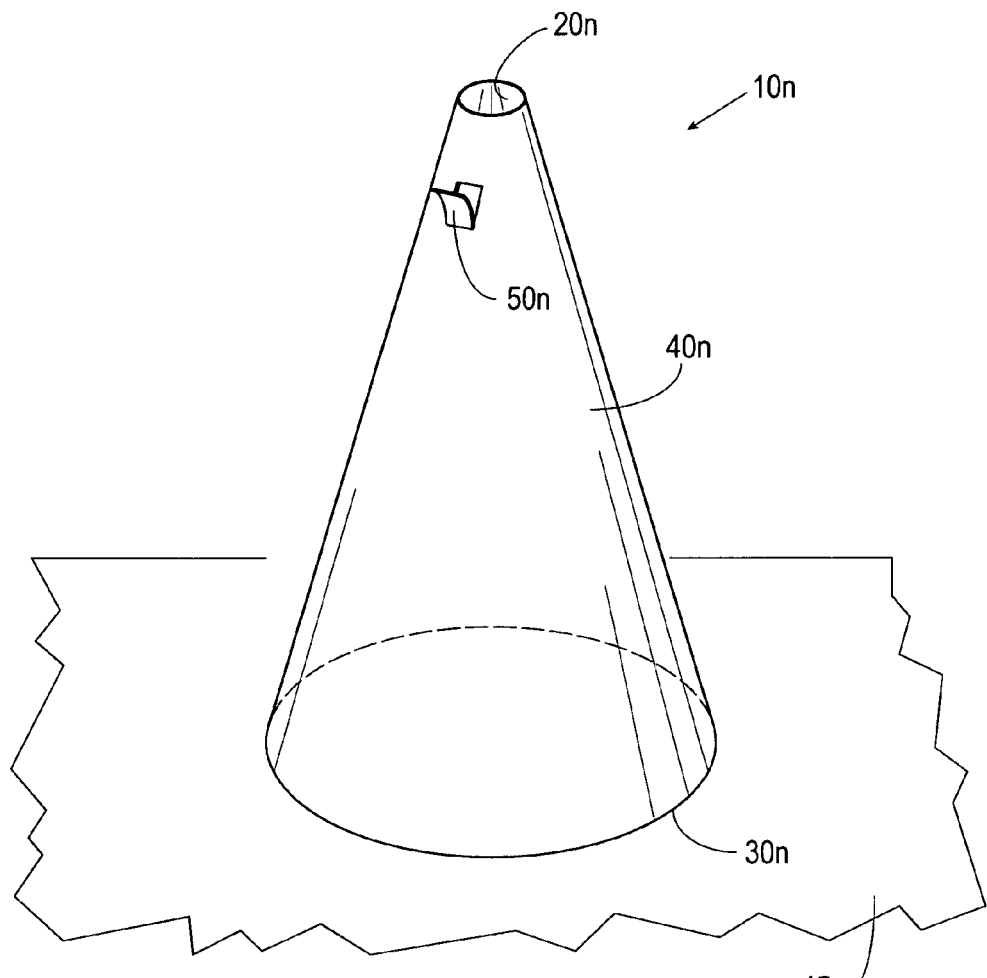
FIG. 12B is a perspective view of another embodiment of the floral easel of the present invention.
Figure 12C:
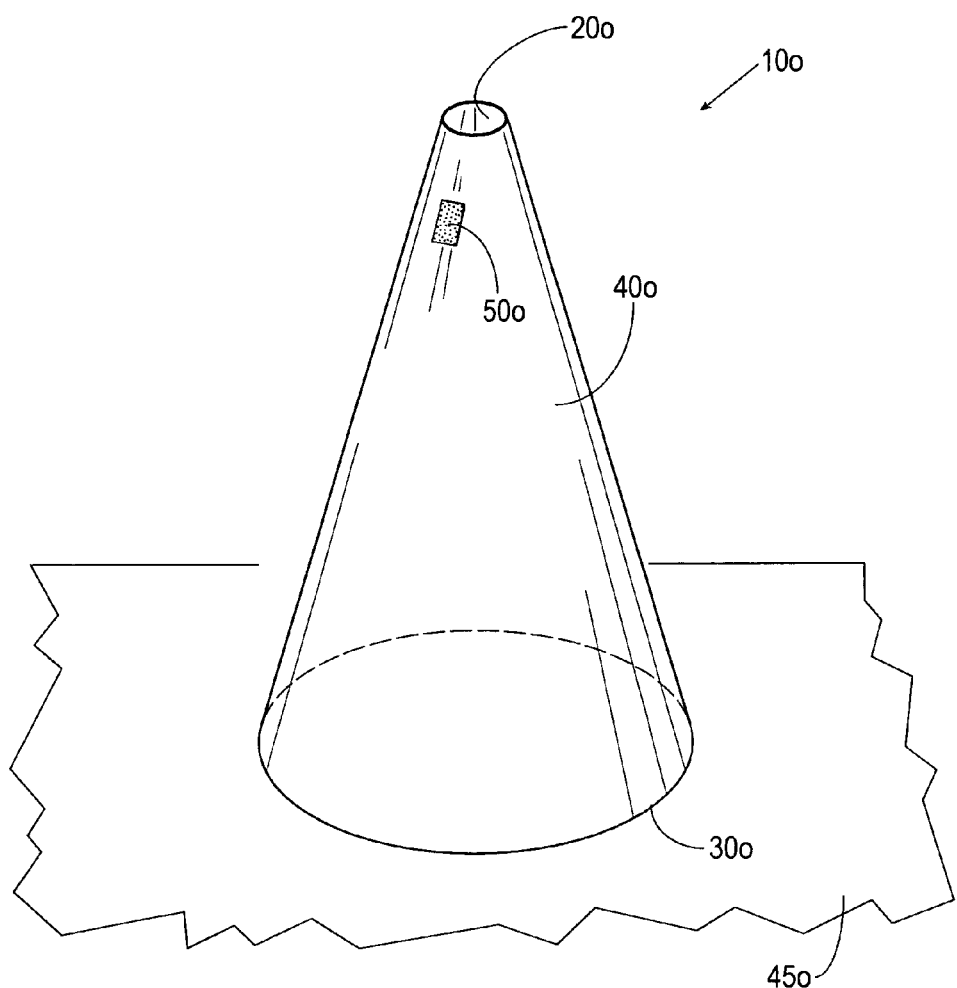
FIG. 12C is a perspective view of another embodiment of the floral easel of the present invention.
Figure 12D:
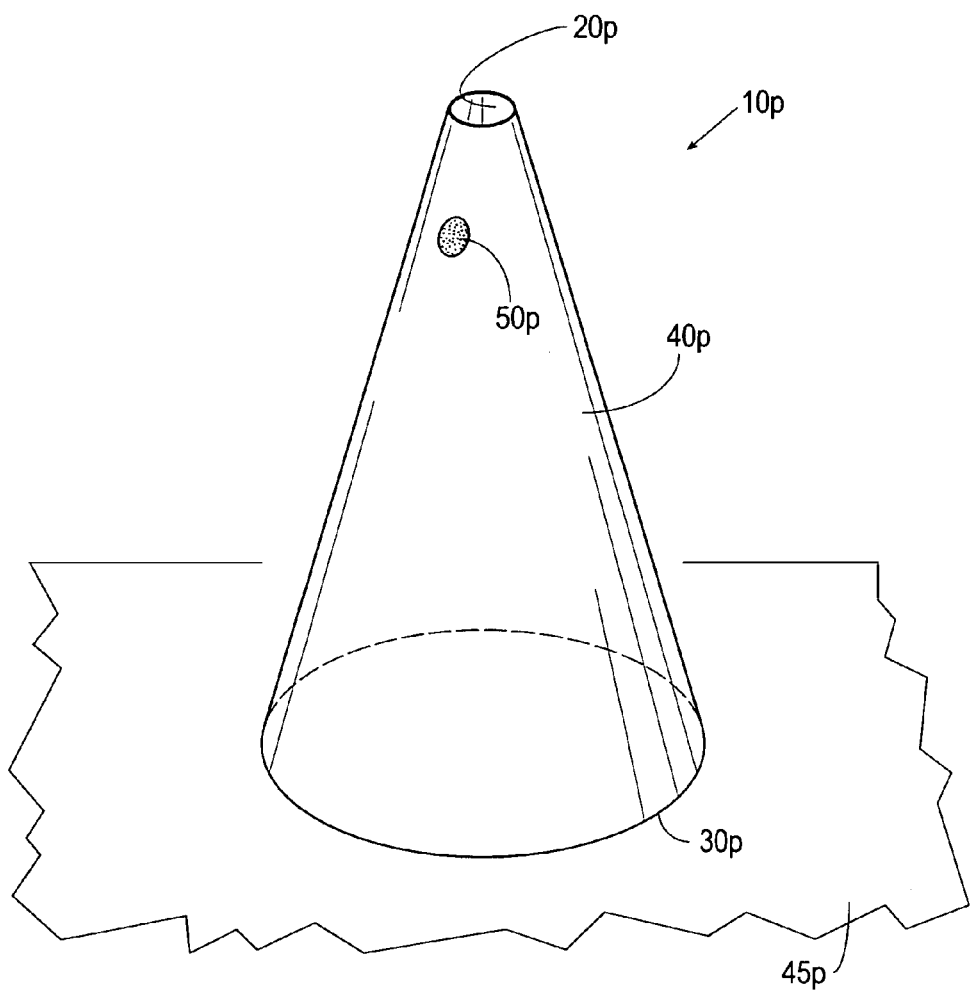
FIG. 12D is a perspective view of another embodiment of the floral easel of the present invention.
Figure 12E:
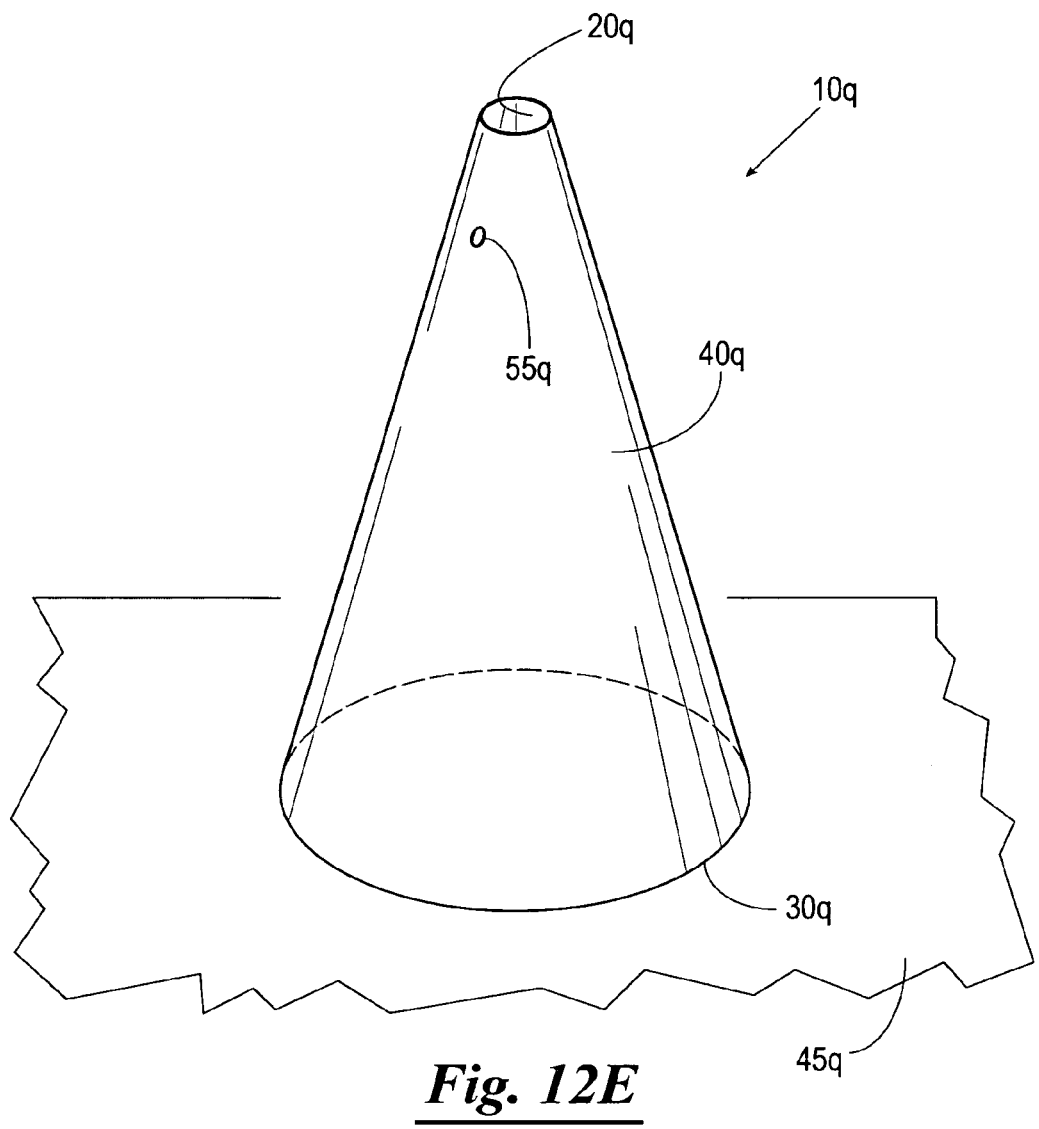
FIG. 12E is a perspective view of another embodiment of the floral easel of the present invention.

In the embodiment shown in FIG. 12A, the floral object (not shown) may be placed adjacent to the top end 20*m* of the floral easel 10*m*. In the embodiments shown in FIGS. 12B-12E, a support member 50*n*-50*q* may be employed to hold and/or support the floral object, however, any portion of the floral easel 10*n*-10*q* may hold or support the floral object or non-floral object. The support member 50*n*-50*q* may be any kind of device capable of supporting the floral object. For example, but not by way of limitation, the support member 50*n*-50*q* may be selected from the group consisting of a hook, a platform, a magnet, wire, adhesive, cohesive, velcro, a slot, a loop, a tab, a groove, a spring, elastic, a band, ribbon, a clip, combinations thereof, or any other device that is capable of holding and/or supporting the floral object. In the embodiment shown in FIG. 12B, the support member 50*n* is a tab created by making a cut-out in the floral easel 10*n* wherein a bottom portion 60*n* of the support member 50*n* remains connected to the floral easel 10*n*. In the embodiment shown in FIGS. 12C and 12D, the support member 50*o* and 50*p*, respectively, is adhesive located on the floral easel 10*o*-10*p*. The adhesive may be, for example, glue, a tab, tape or any other type of adhesive capable of holding and/or supporting the floral object. The adhesive tab shown in FIGS. 12C and 12D may be any shape such as rectangular as shown in FIG. 12C or circular as shown in FIG. 12D. However, it should be understood that the adhesive may be any shape so long as a floral object may be connected thereto. In the embodiment shown in FIG. 12E, the floral easel 10*q* includes an aperture 55*q* through a portion of the sidewall 40*q* of the floral easel 10*q* so that a support member (not shown) such as, for example, an s-hook may be placed therethrough. The aperture 55*q* may be any shape and/or size and may be located on any area of the sidewall 40*q* for placing the support member therethrough.

In the various embodiments of the floral easel described herein, the support member may be constructed of the same material as the floral easel or the support member may be constructed of a different material than the floral easel so long as the material is capable of holding and/or supporting the floral object. It should be understood however, that the support member is not required. The floral object may alternatively be placed around the top portion of the floral easel. It should also be understood that the floral object may be placed on either or both the top portion and/or the support member of the floral easel.

Figure 12F:
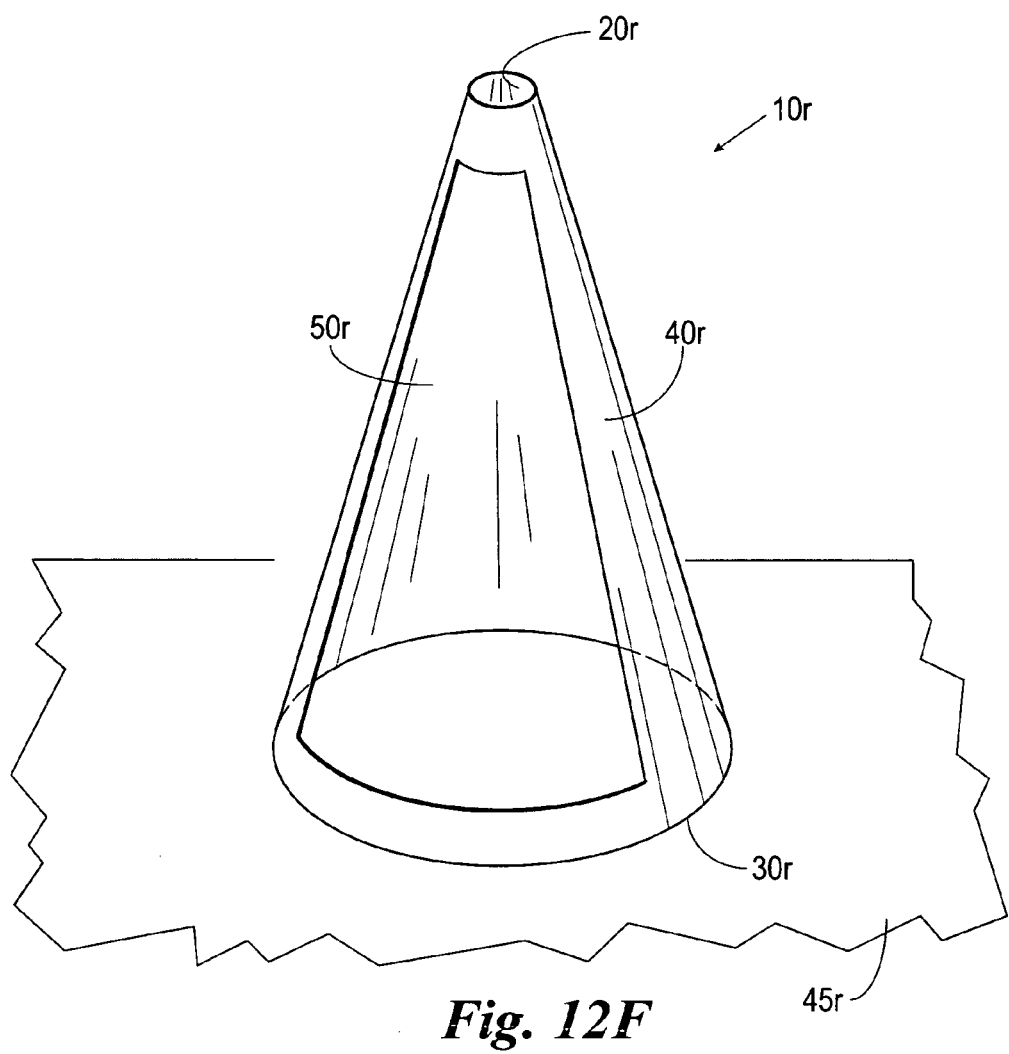
FIG. 12F is a perspective view of another embodiment of the floral easel of the present invention.

Shown in FIG. 12F is a floral easel 10*r* having a portion of the sidewall 40*r* removed so as to create a support member 50*r* extending the length of a sidewall 40*r* for placing a floral object therethrough.

Figure 12G:
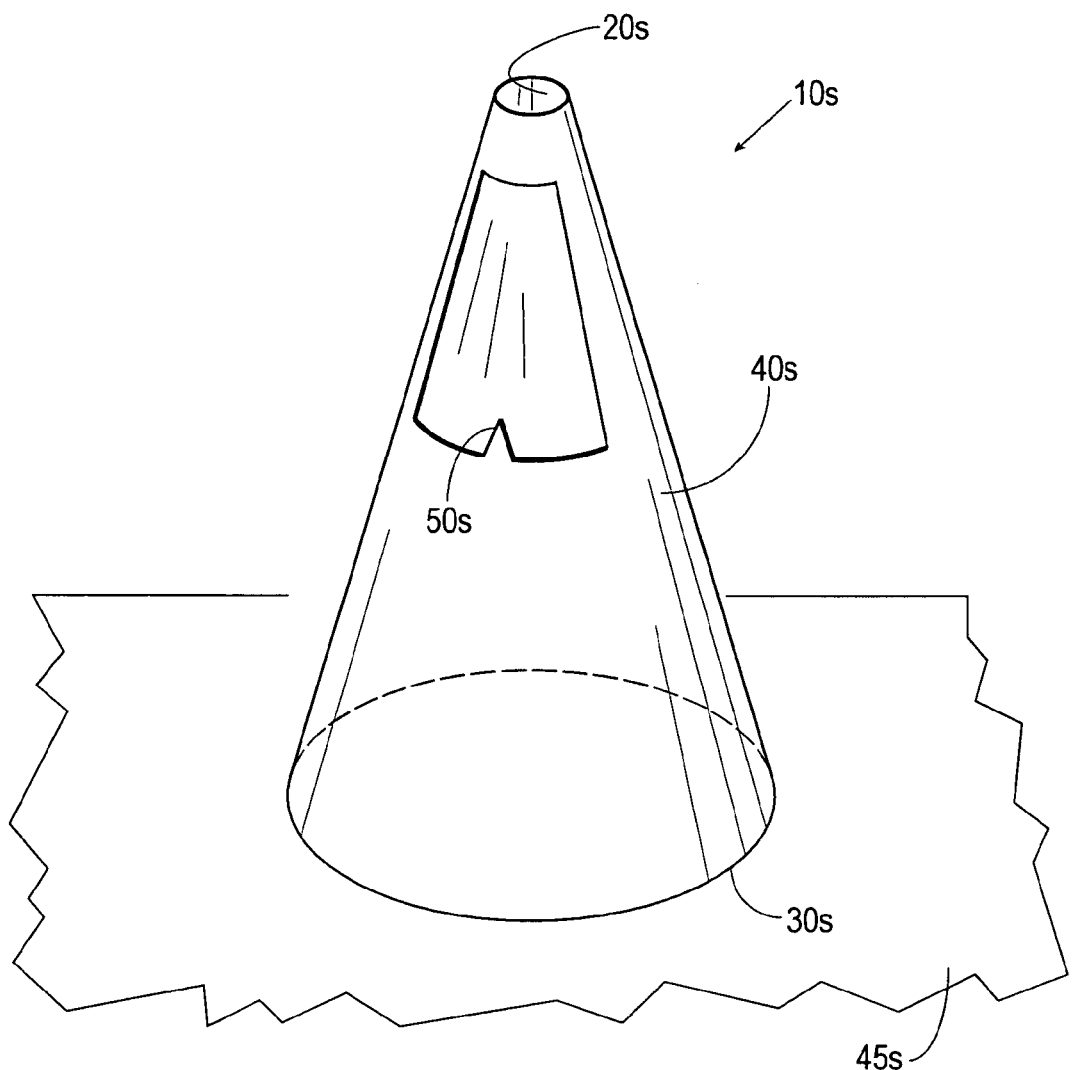
FIG. 12G is a perspective view of another embodiment of the floral easel of the present invention.

Shown in FIG. 12G is a floral easel 10*s* having a portion of the sidewall 40*s* removed wherein a portion of the sidewall 40*s* remains connected to the floral easel 10*s* thereby creating a support member 50*s*, such as a tab, for hanging a floral object thereon. The support member 50*s* may be any shape or size. For example, as shown in FIG. 12G, the support member 50*s* is substantially triangular.

Figure 12H:
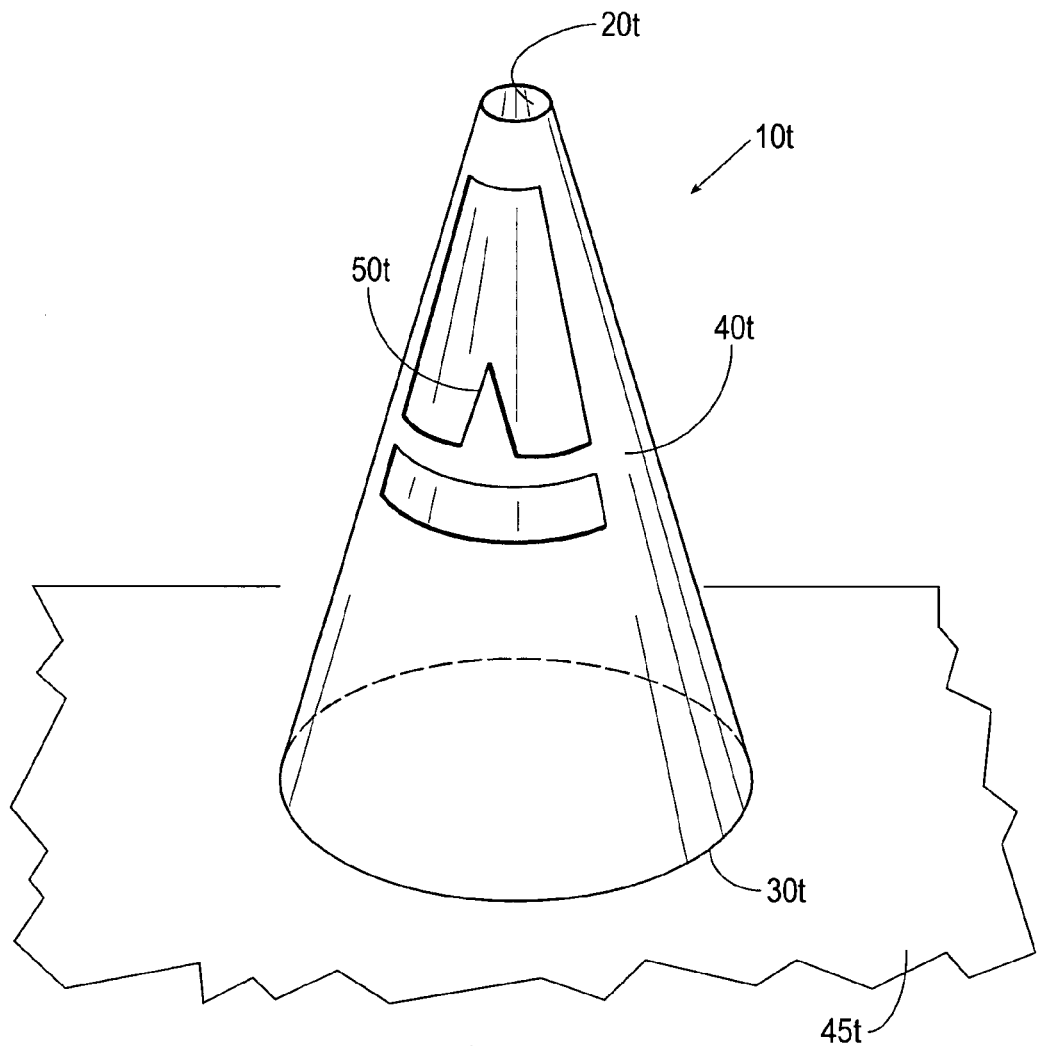
FIG. 12H is a perspective view of another embodiment of the floral easel of the present invention.
Figure 12I:
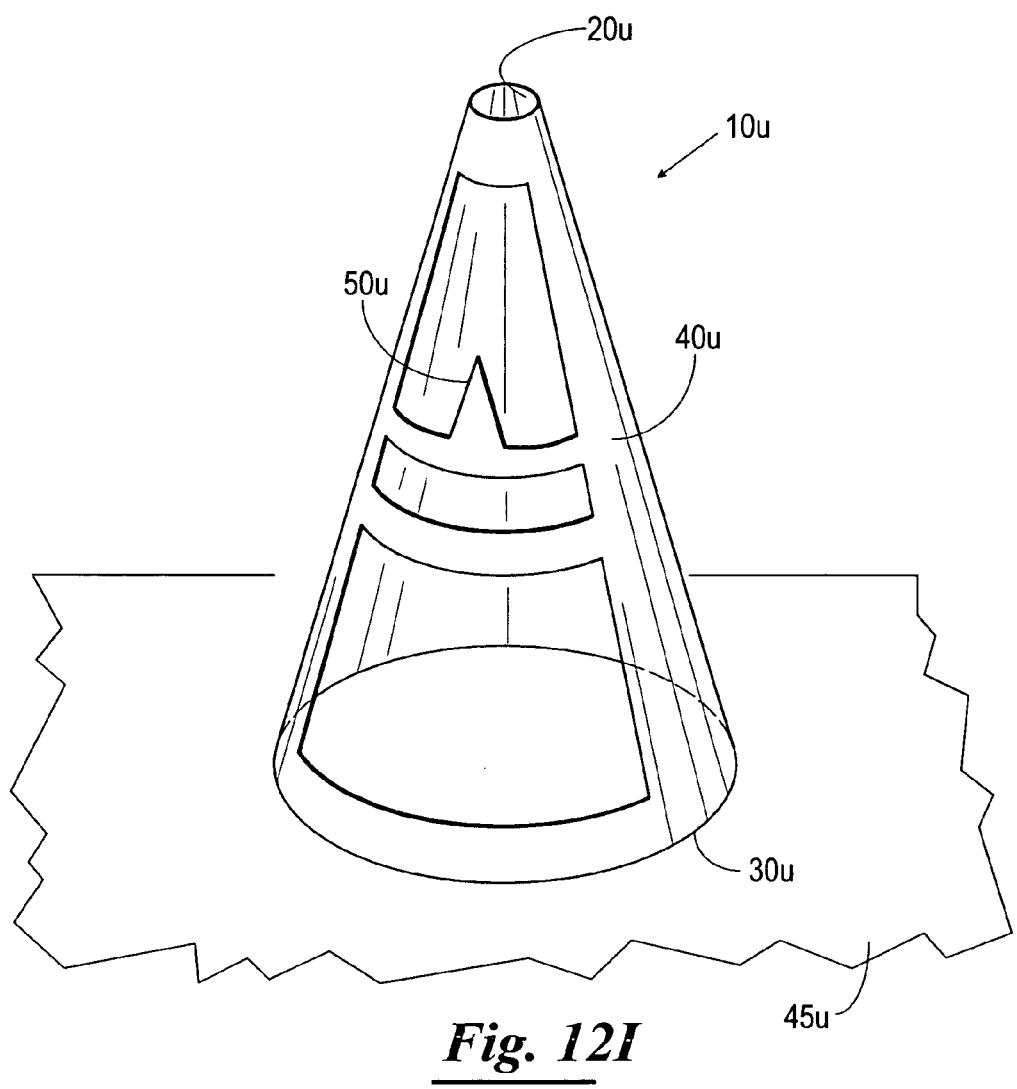
FIG. 12I is a perspective view of another embodiment of the floral easel of the present invention.
Figure 13A:
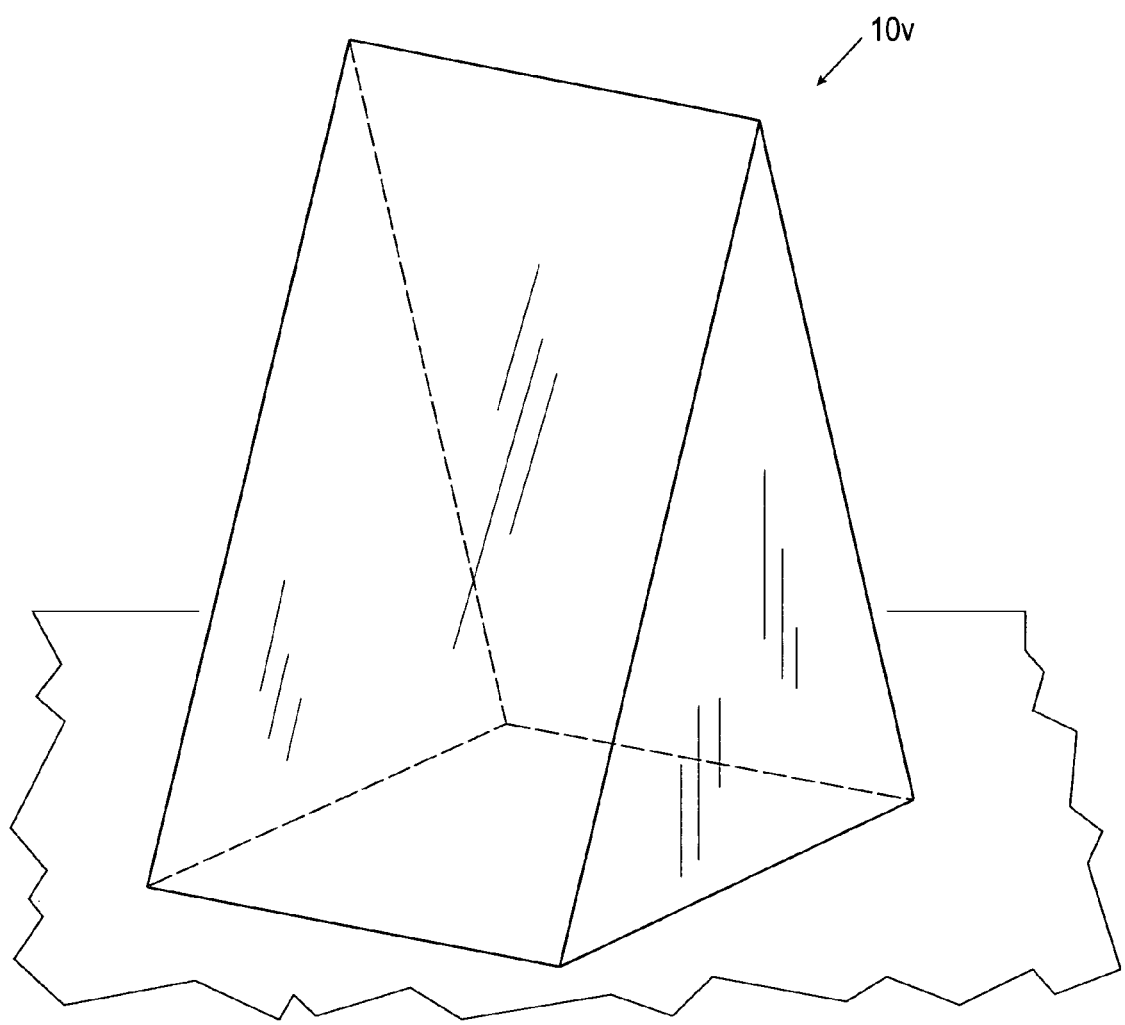
FIG. 13A is a perspective view of another embodiment of the floral easel of the present invention.
Figure 13B:
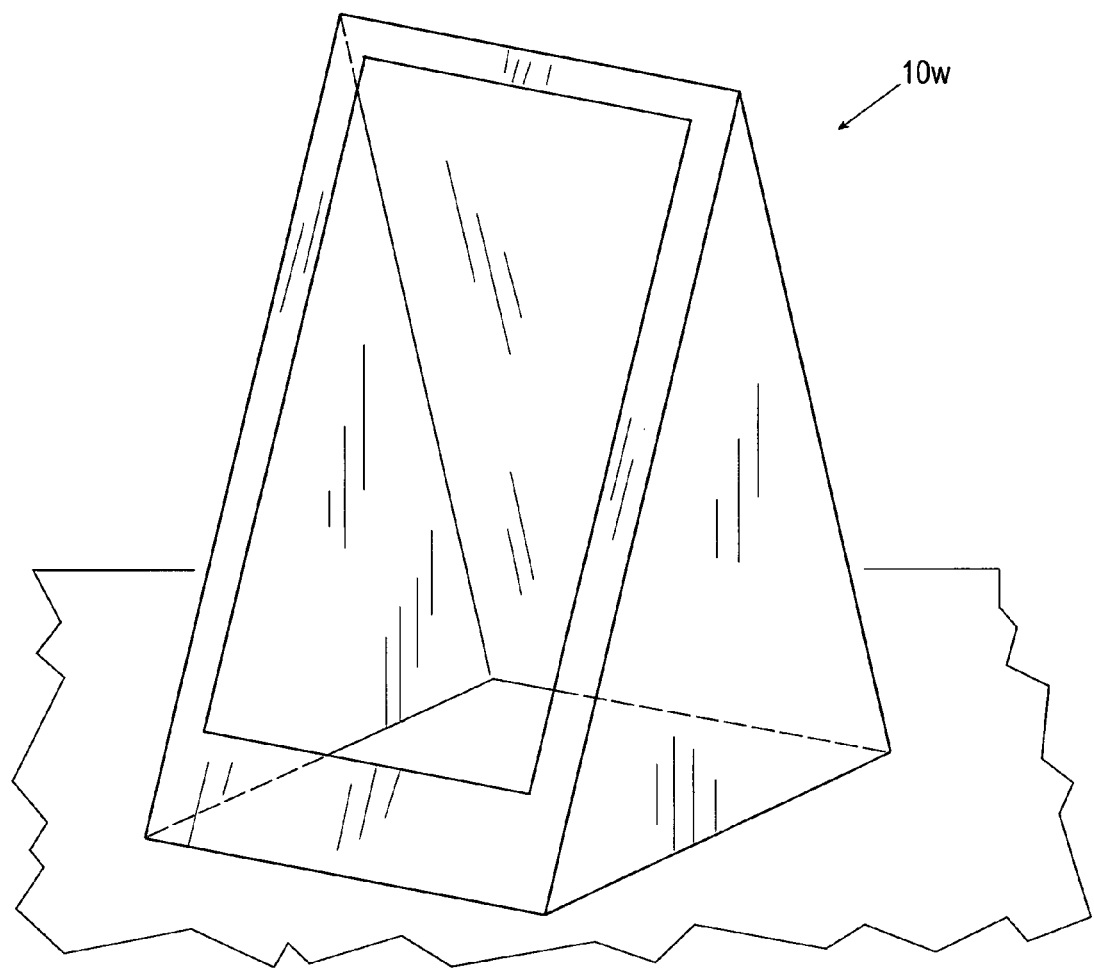
FIG. 13B is a perspective view of another embodiment of the floral easel of the present invention.
Figure 13C:
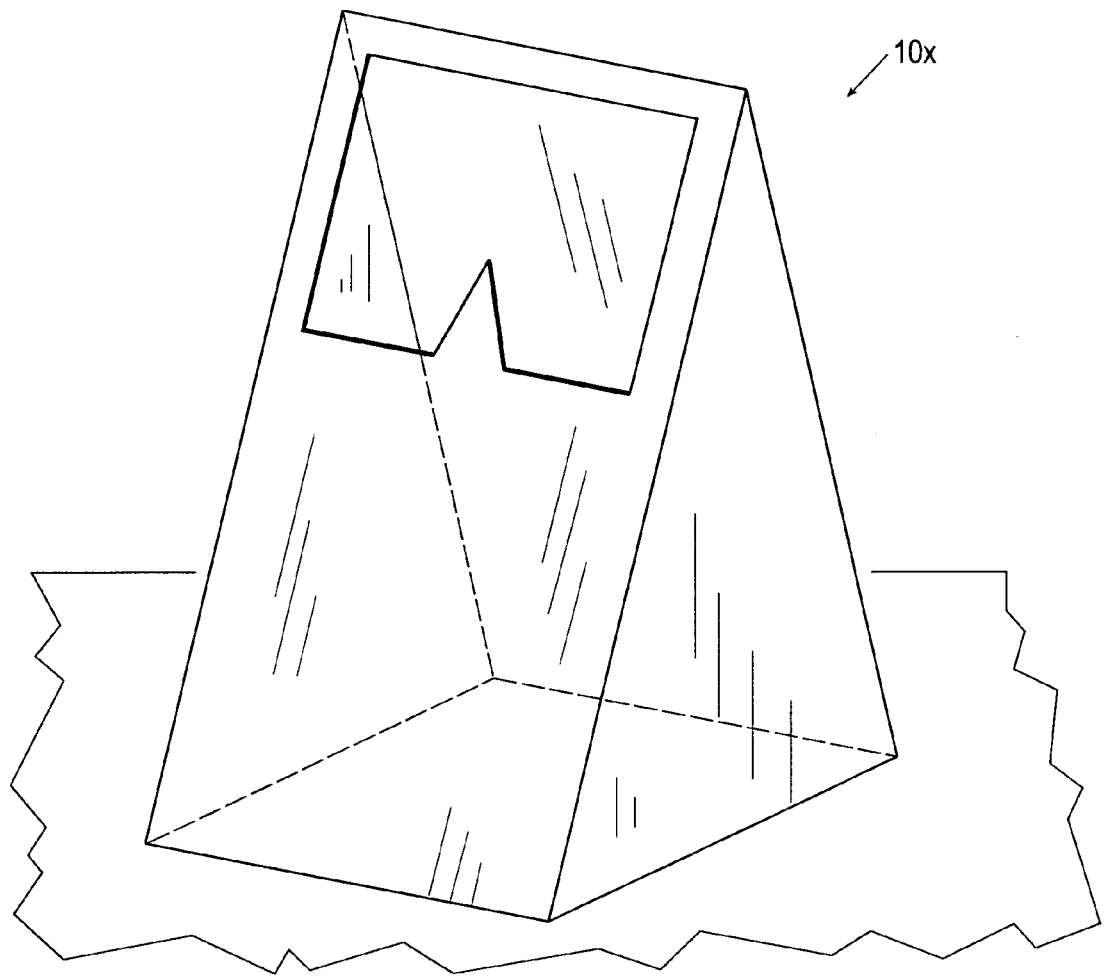
FIG. 13C is a perspective view of another embodiment of the floral easel of the present invention.
Figure 13D:
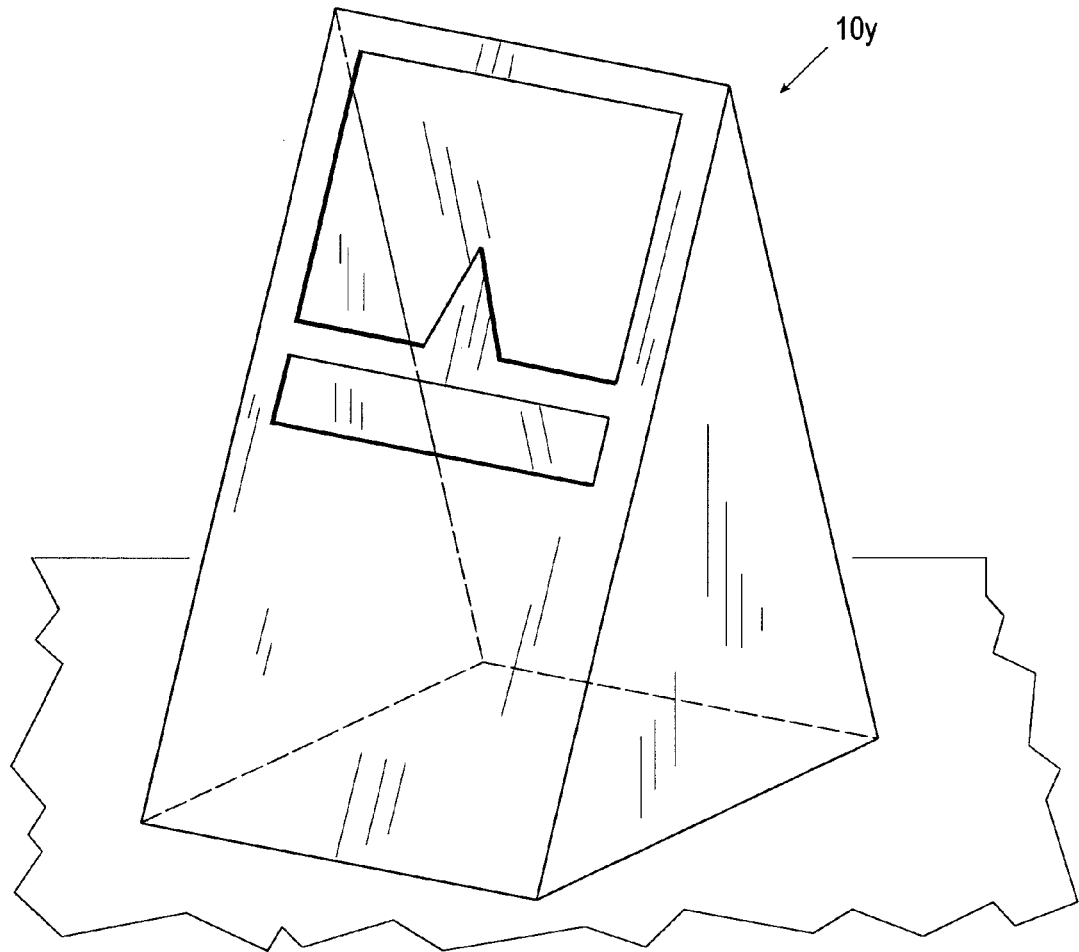
FIG. 13D is a perspective view of another embodiment of the floral easel of the present invention.
Figure 13E:
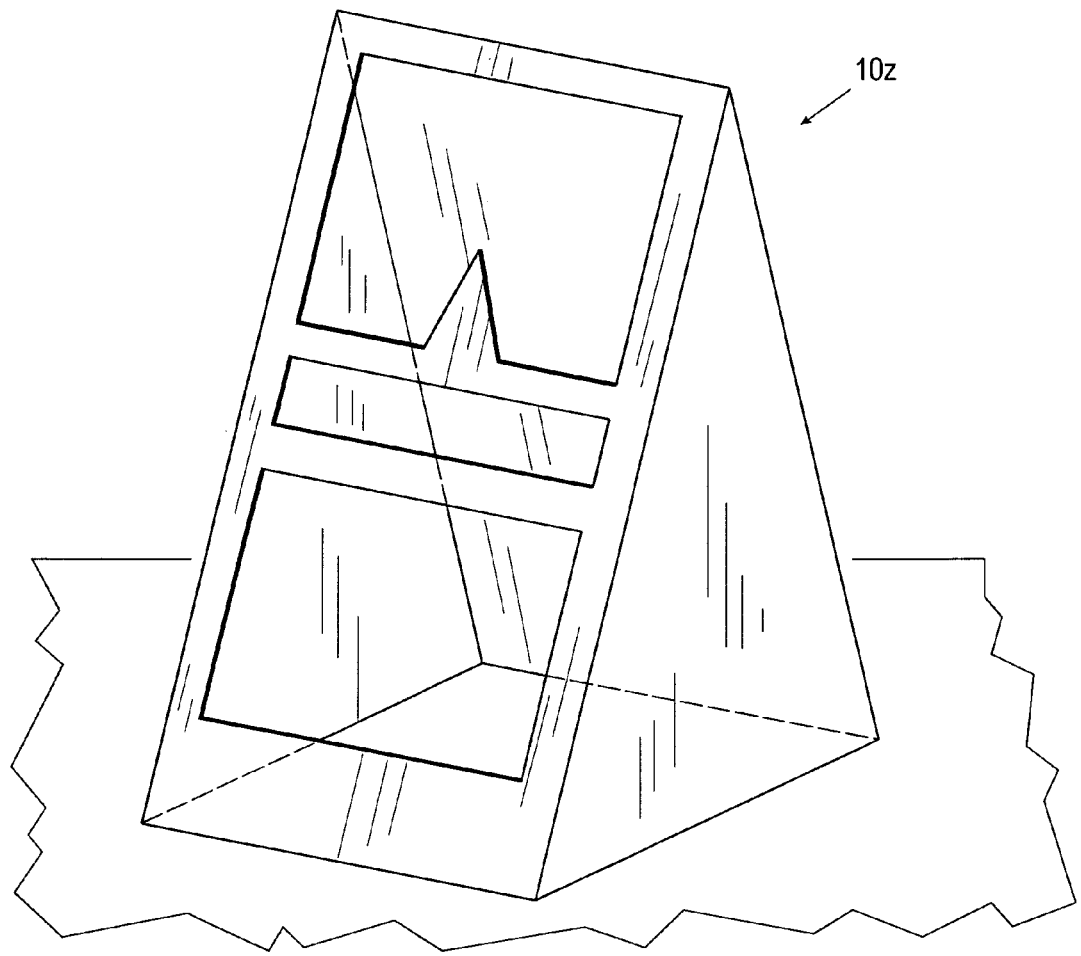
FIG. 13E is a perspective view of another embodiment of the floral easel of the present invention.
Figure 14A:
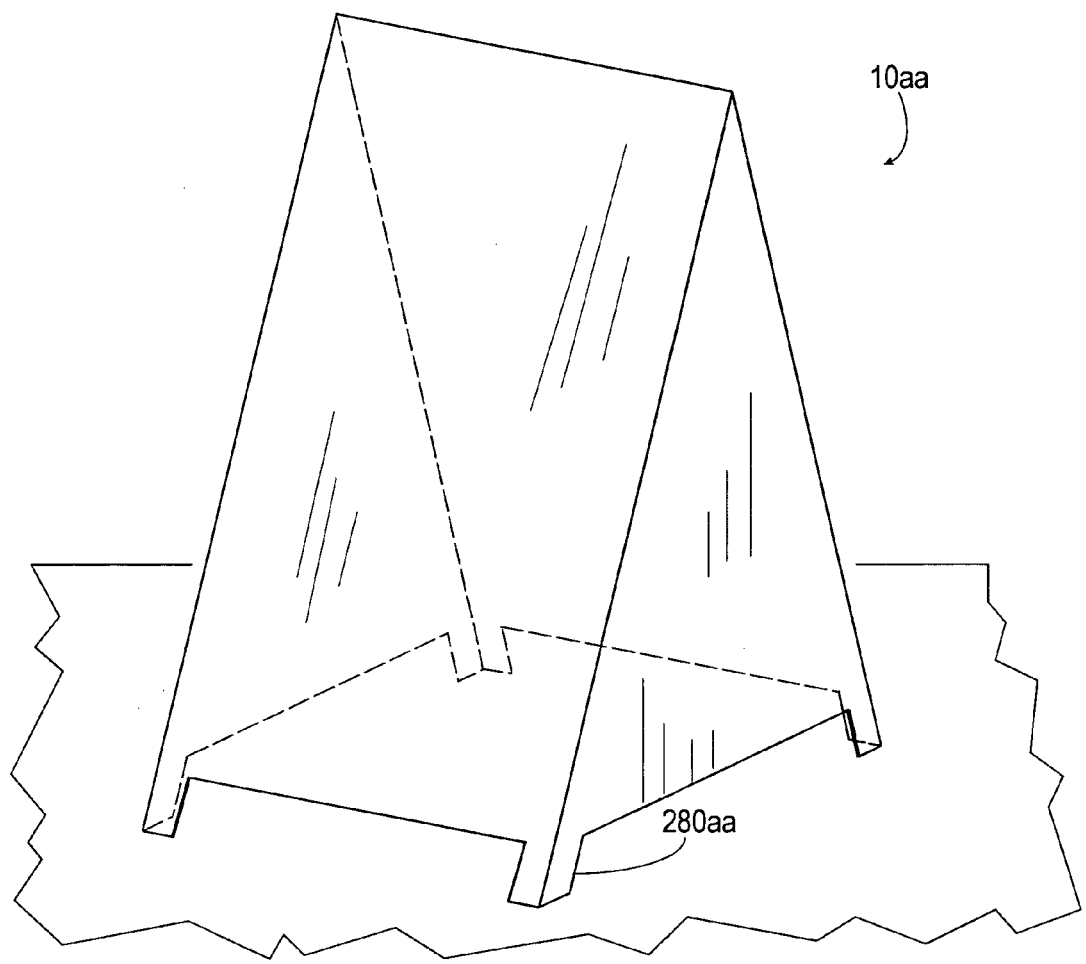
FIG. 14A is a perspective view of another embodiment of the floral easel of the present invention.
Figure 14B:
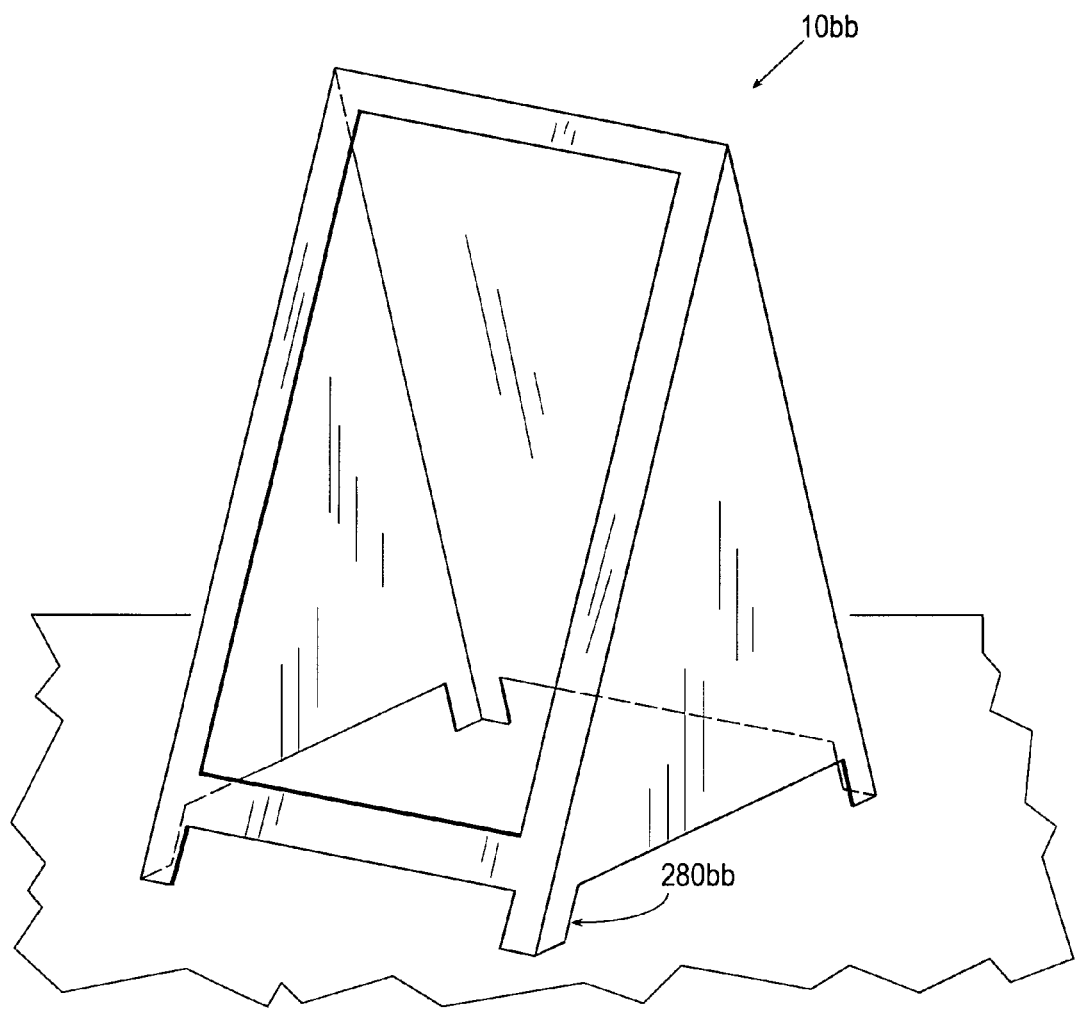
FIG. 14B is a perspective view of another embodiment of the floral easel of the present invention.
Figure 14C:
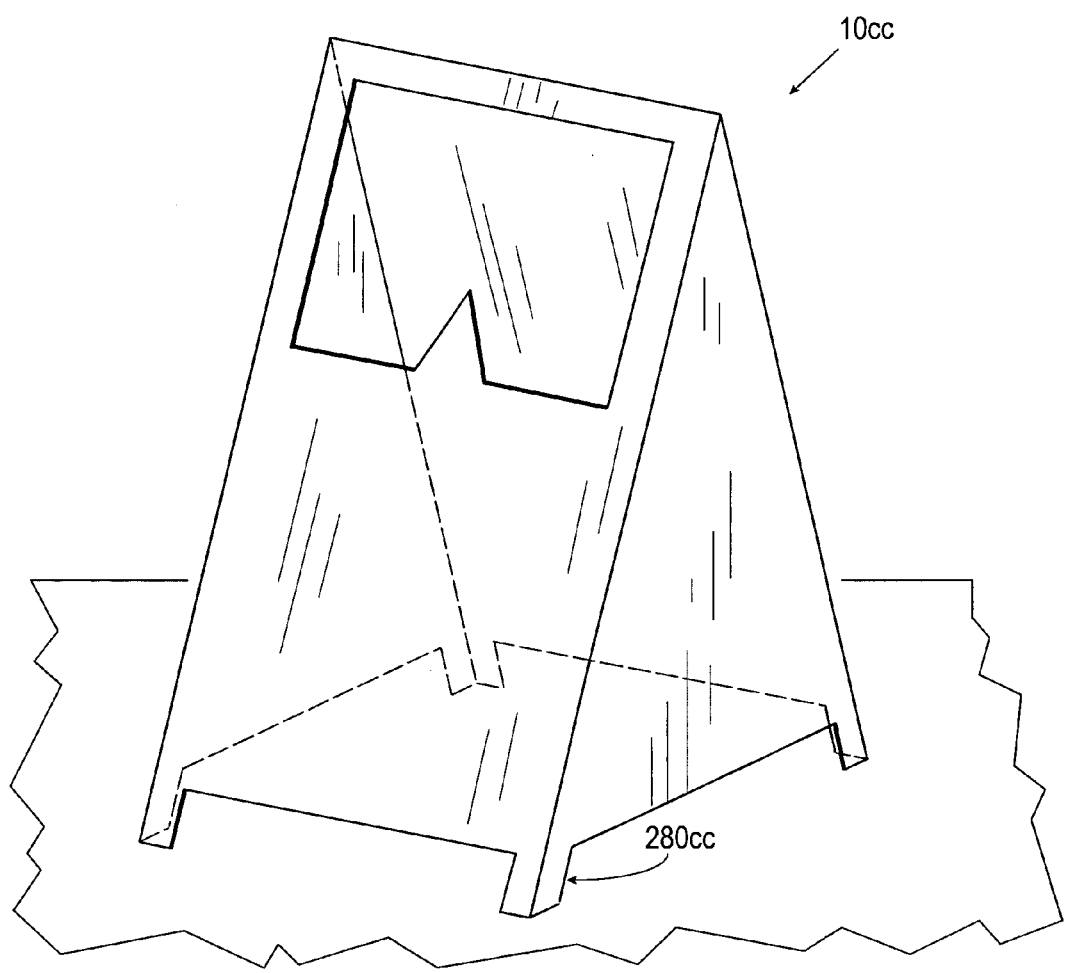
FIG. 14C is a perspective view of another embodiment of the floral easel of the present invention.
Figure 14D:
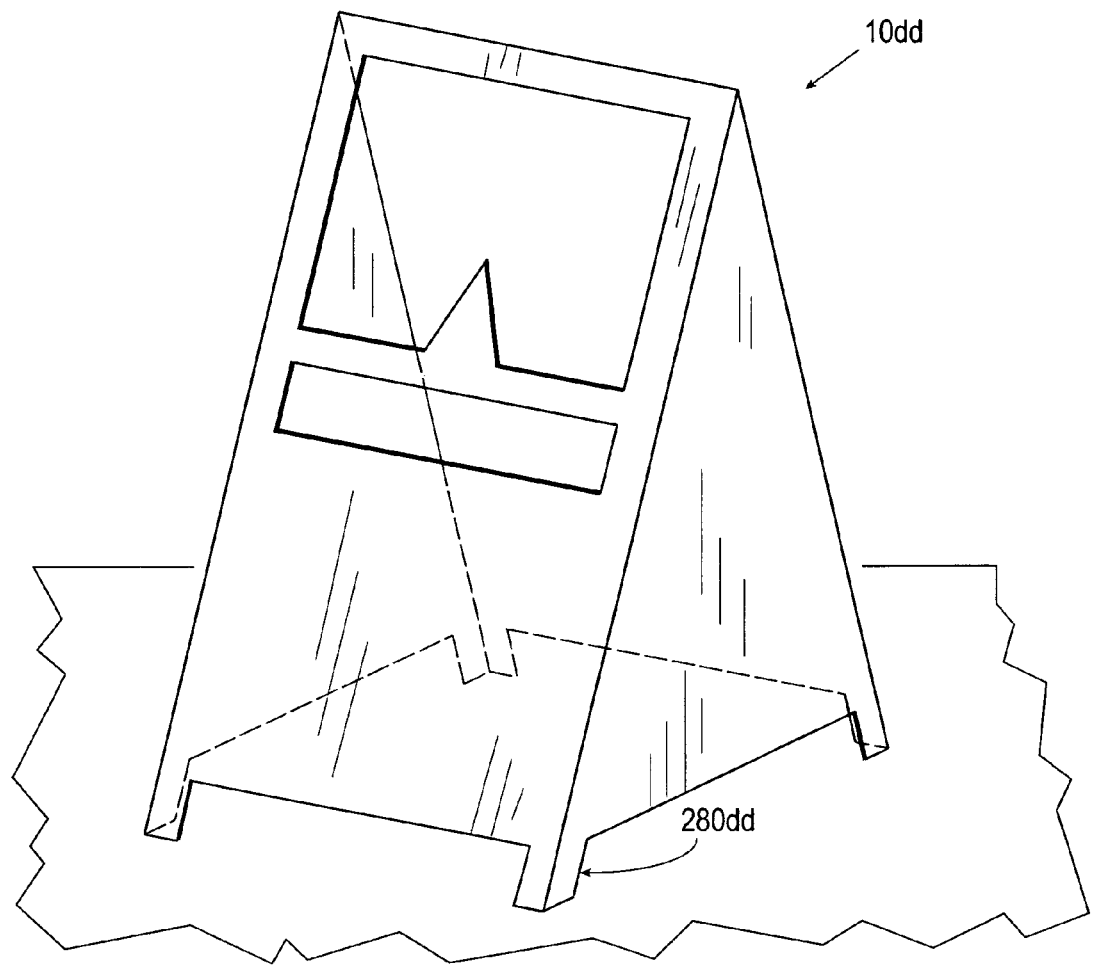
FIG. 14D is a perspective view of another embodiment of the floral easel of the present invention.
Figure 14E:
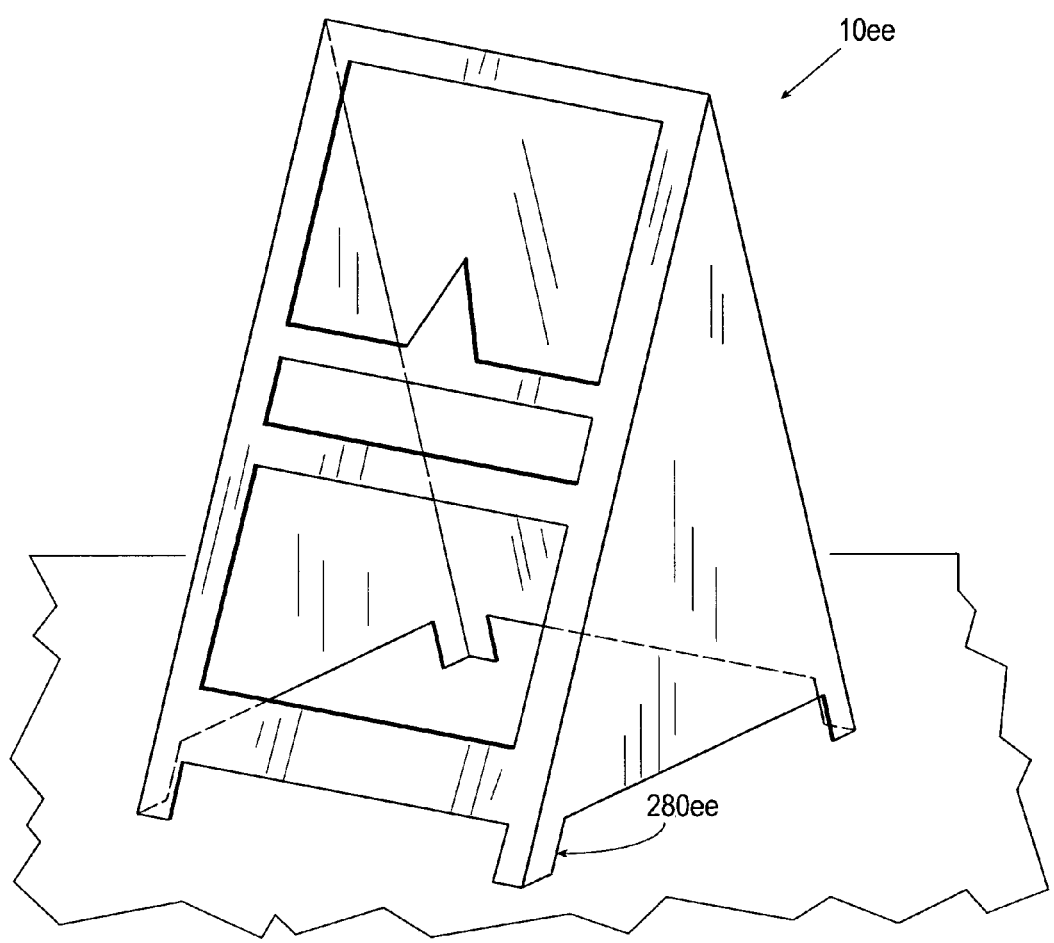
FIG. 14E is a perspective view of another embodiment of the floral easel of the present invention.
Figure 15A:
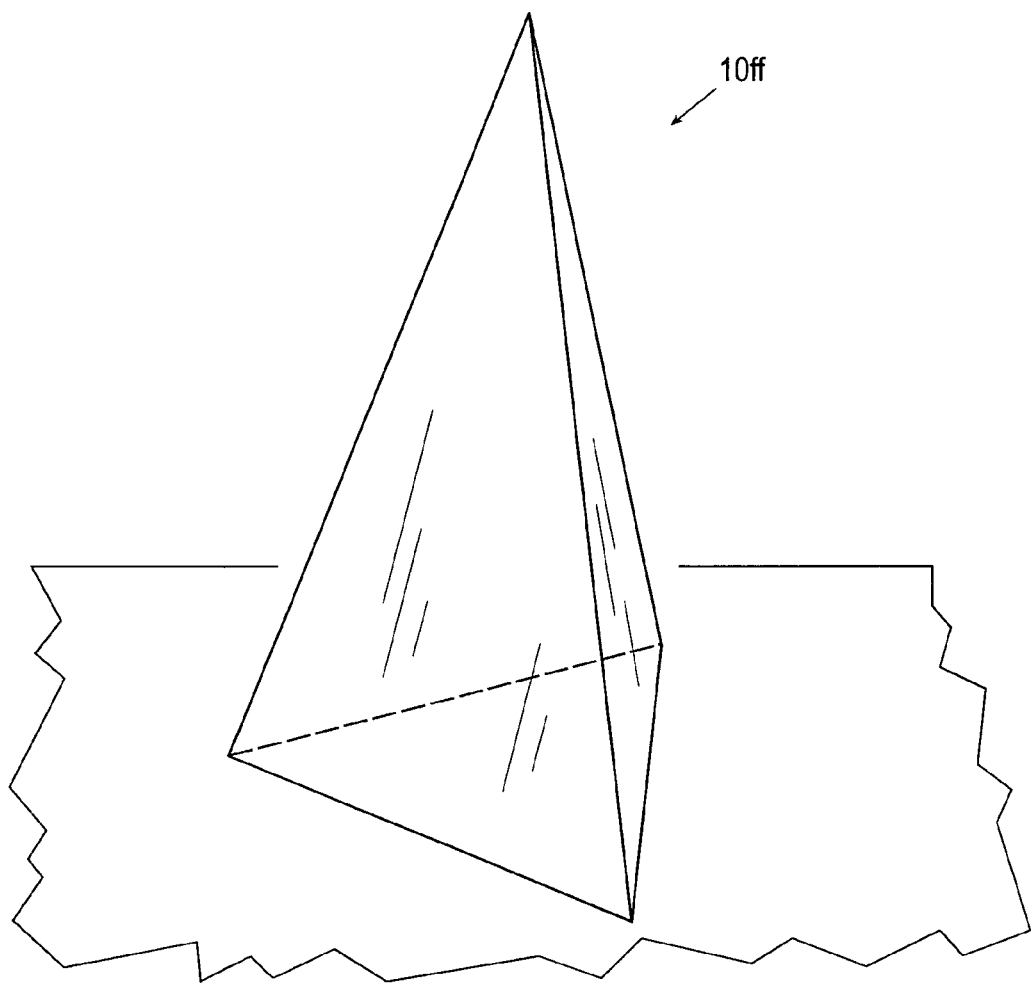
FIG. 15A is a perspective view of another embodiment of the floral easel of the present invention.
Figure 15B:
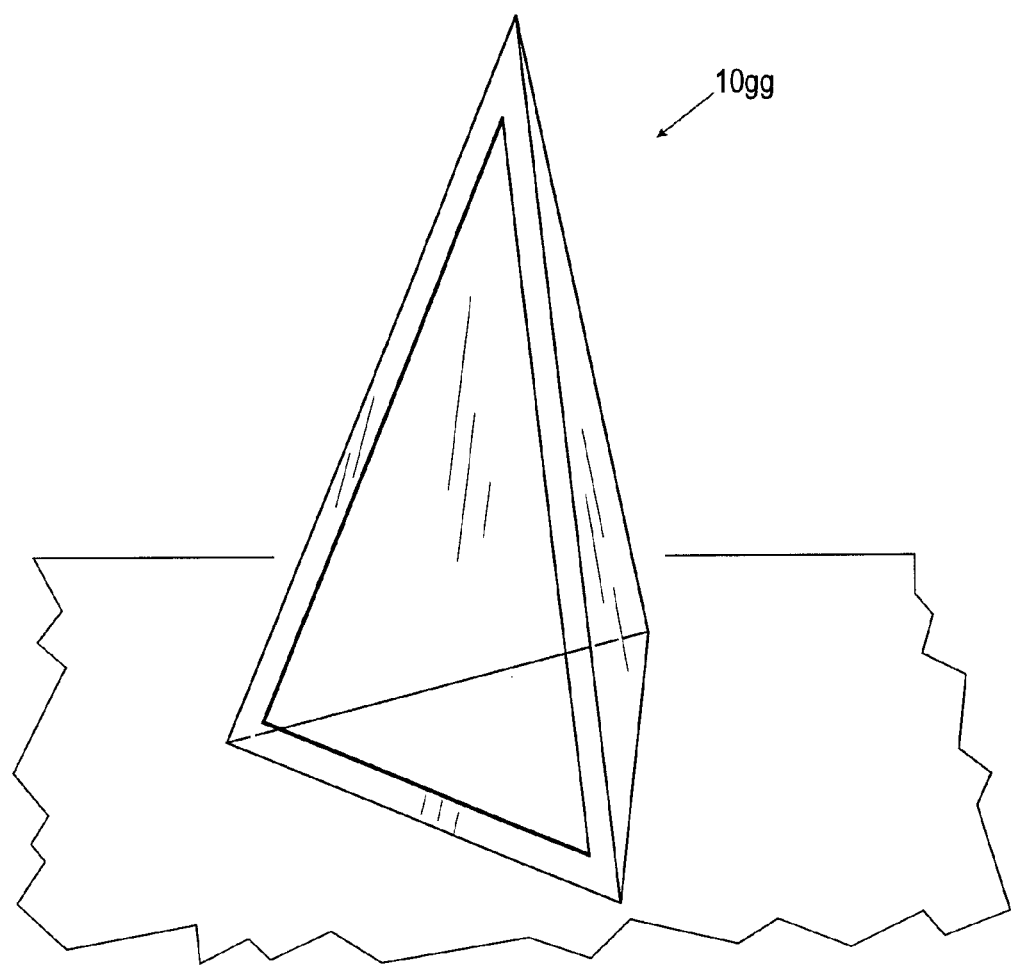
FIG. 15B is a perspective view of another embodiment of the floral easel of the present invention.
Figure 15C:
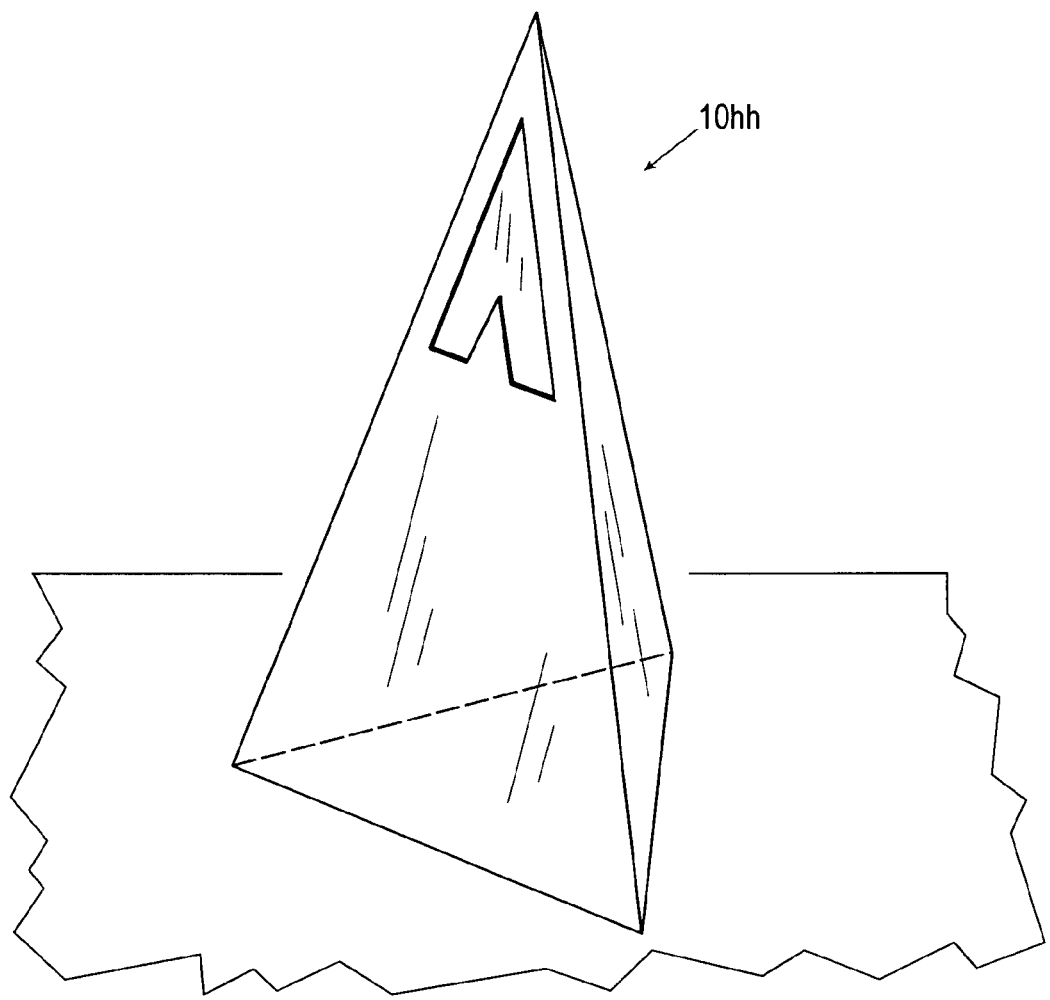
FIG. 15C is a perspective view of another embodiment of the floral easel of the present invention.
Figure 15D:
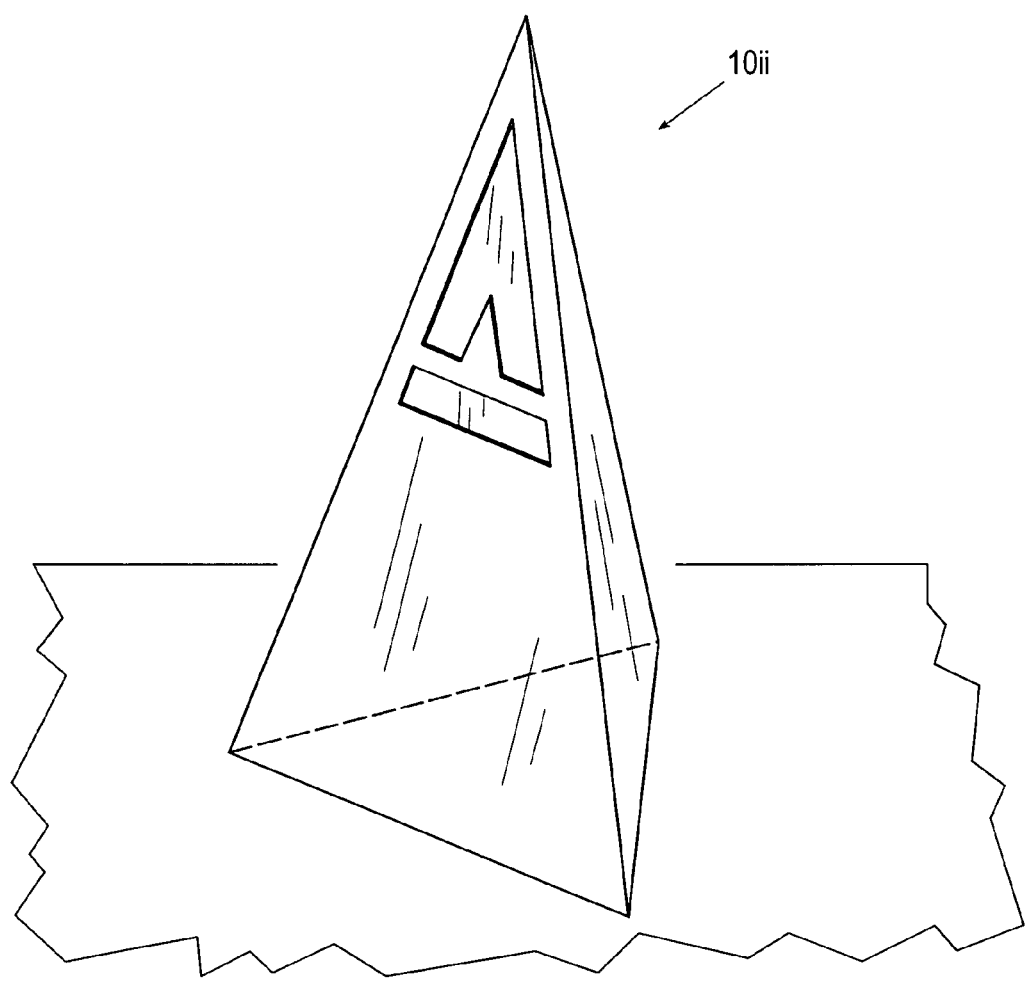
FIG. 15D is a perspective view of another embodiment of the floral easel of the present invention.
Figure 15E:
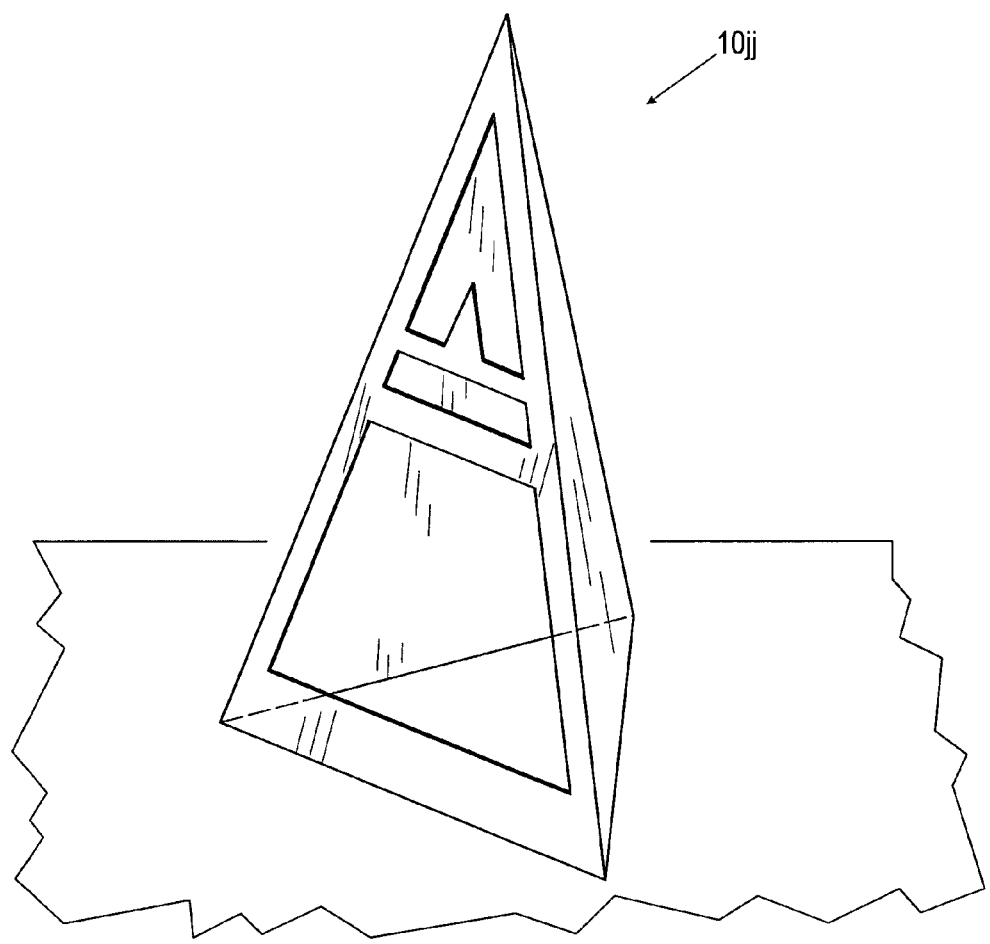
FIG. 15E is a perspective view of another embodiment of the floral easel of the present invention.
Figure 16A:
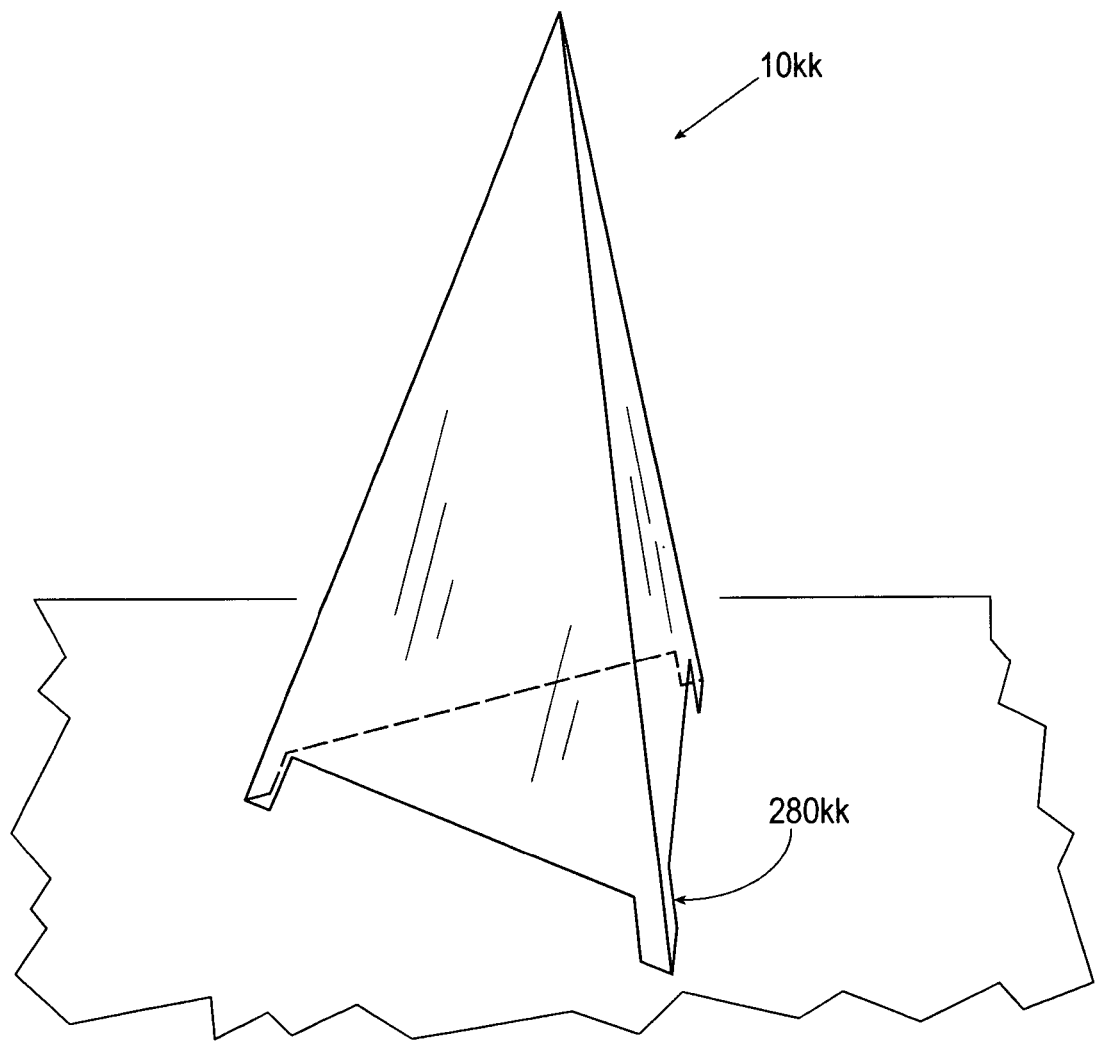
FIG. 16A is a perspective view of another embodiment of the floral easel of the present invention.
Figure 16B:
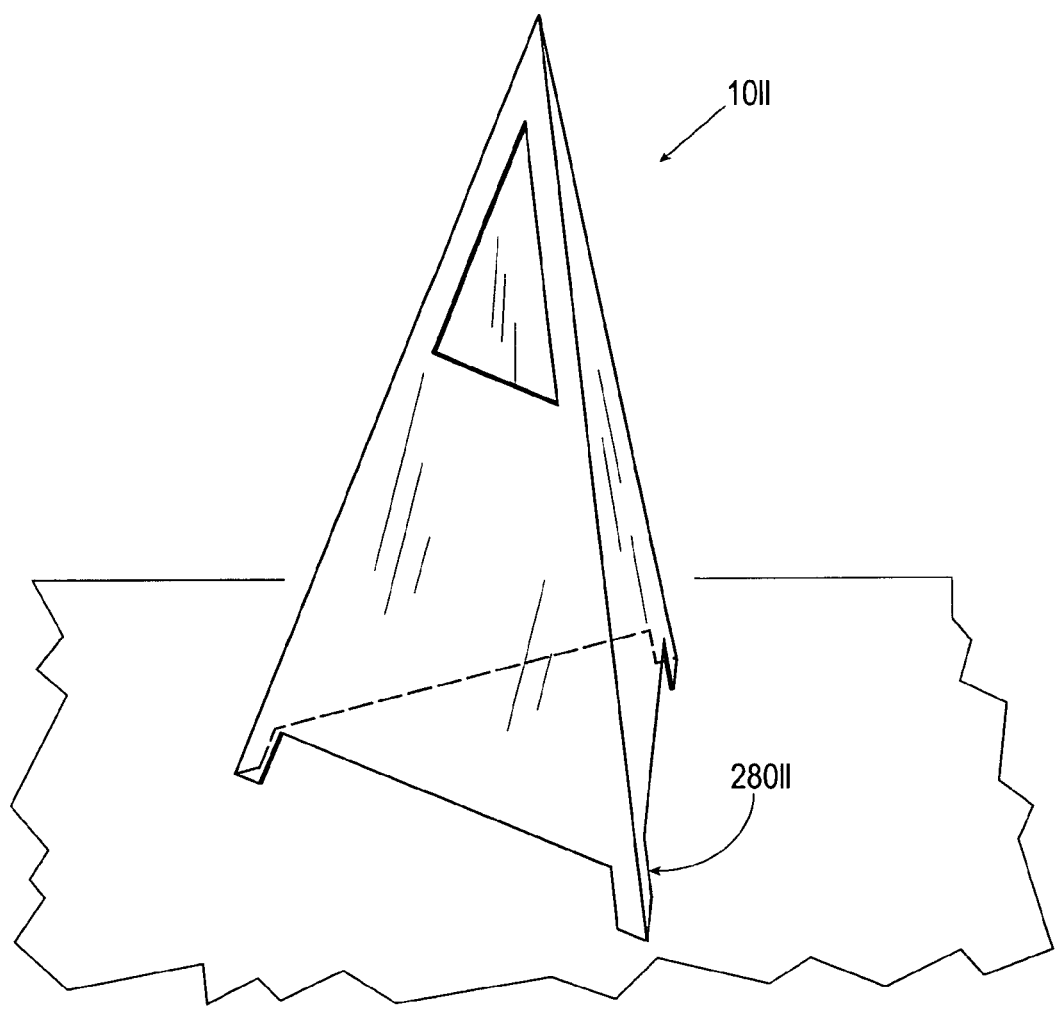
FIG. 16B is a perspective view of another embodiment of the floral easel of the present invention.
Figure 16C:
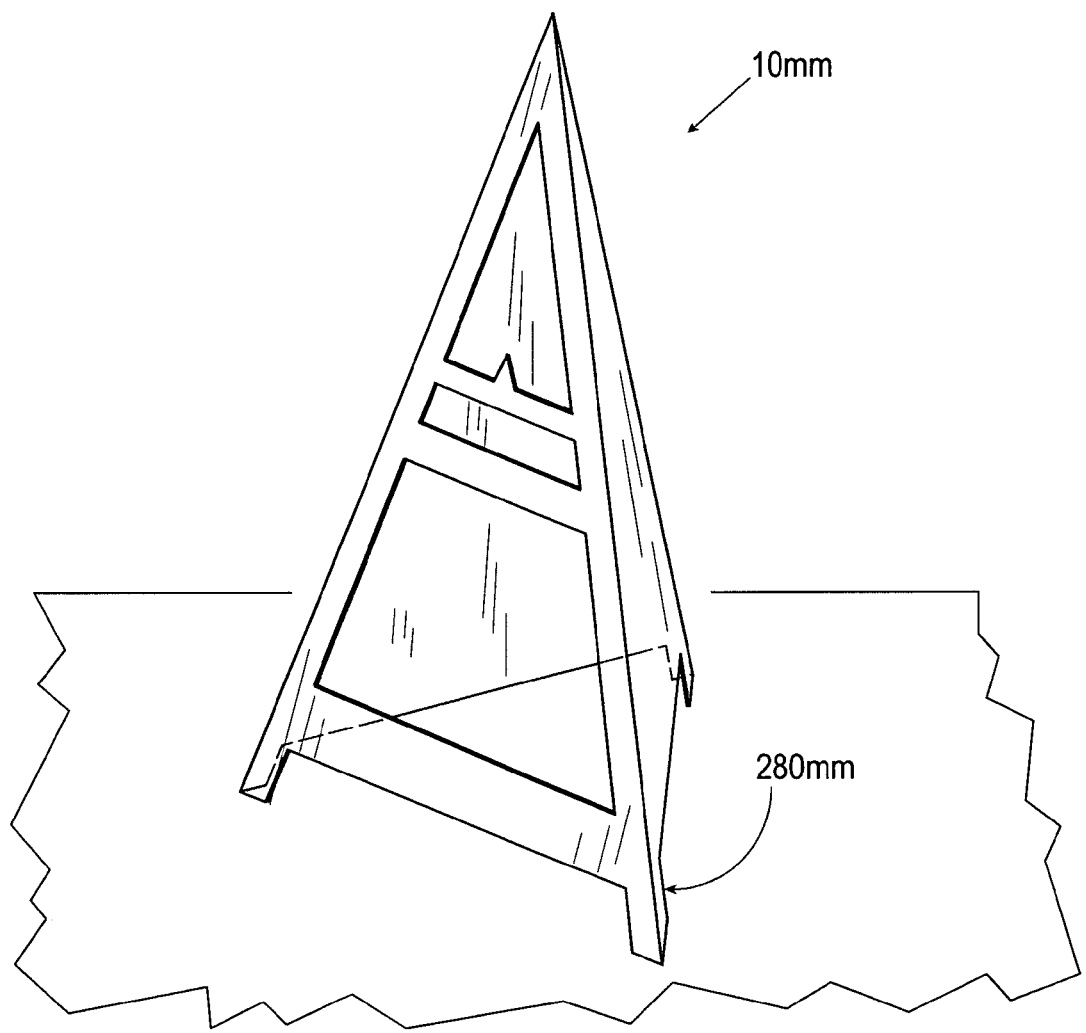
FIG. 16C is a perspective view of another embodiment of the floral easel of the present invention.
Figure 16D:
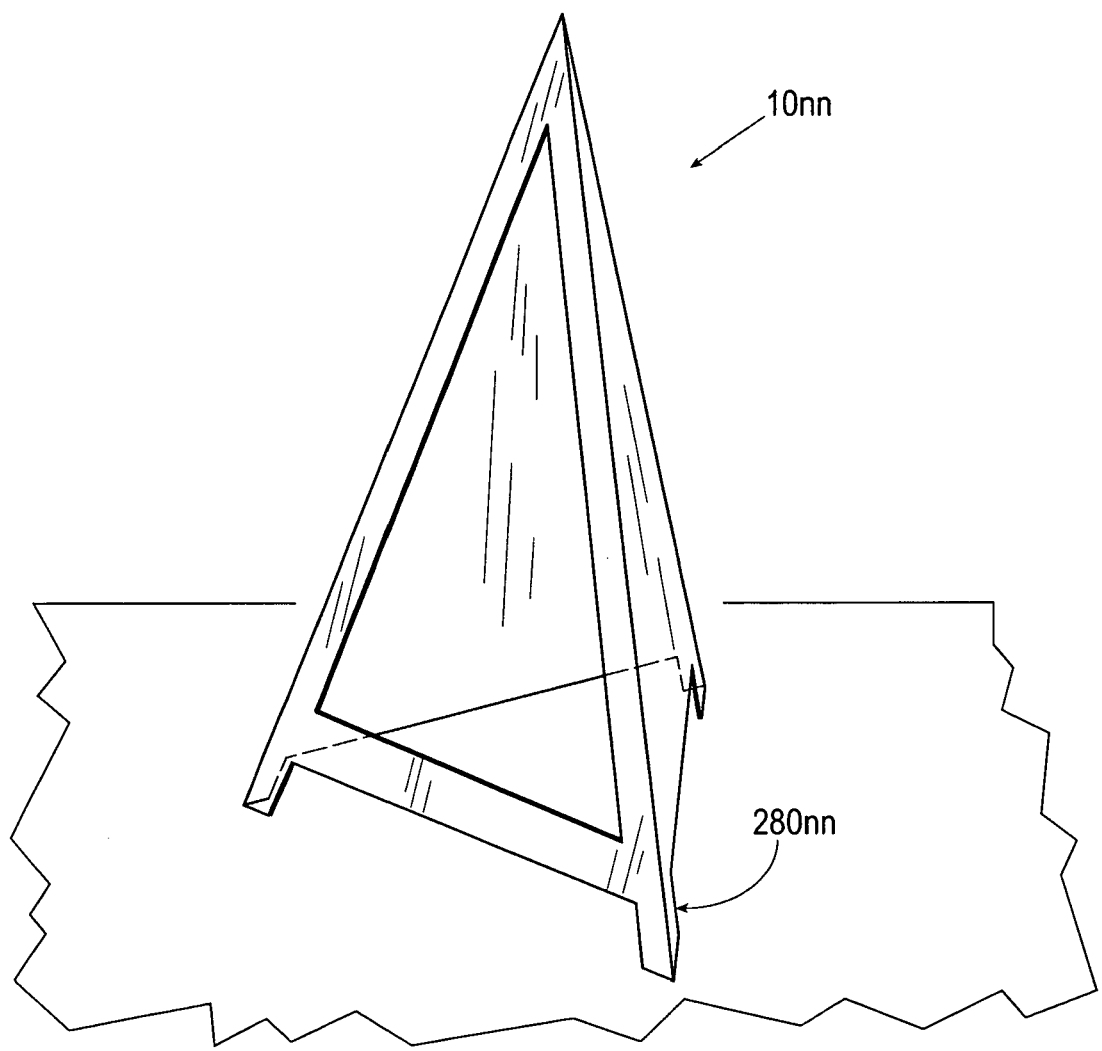
FIG. 16D is a perspective view of another embodiment of the floral easel of the present invention.
Figure 16E:
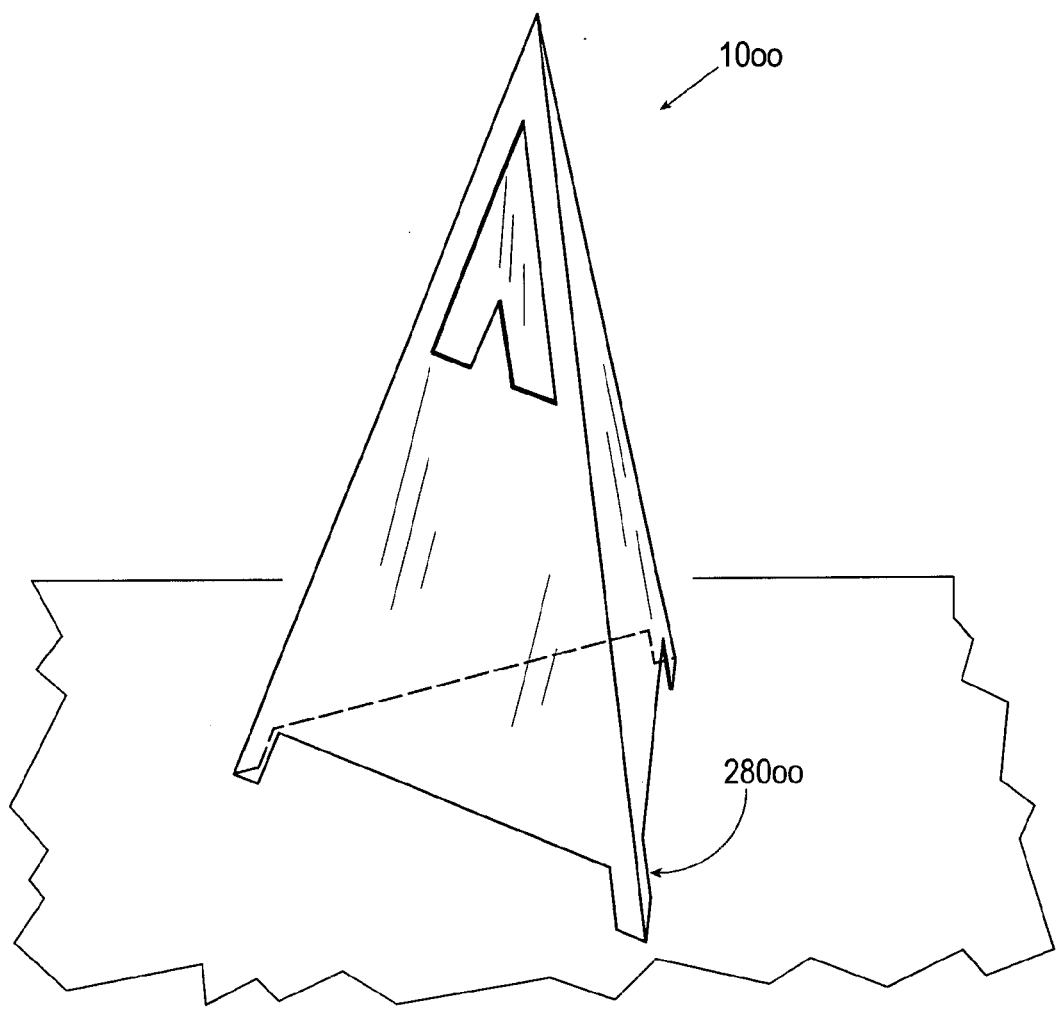
FIG. 16E is a perspective view of another embodiment of the floral easel of the present invention.
Figure 16F:
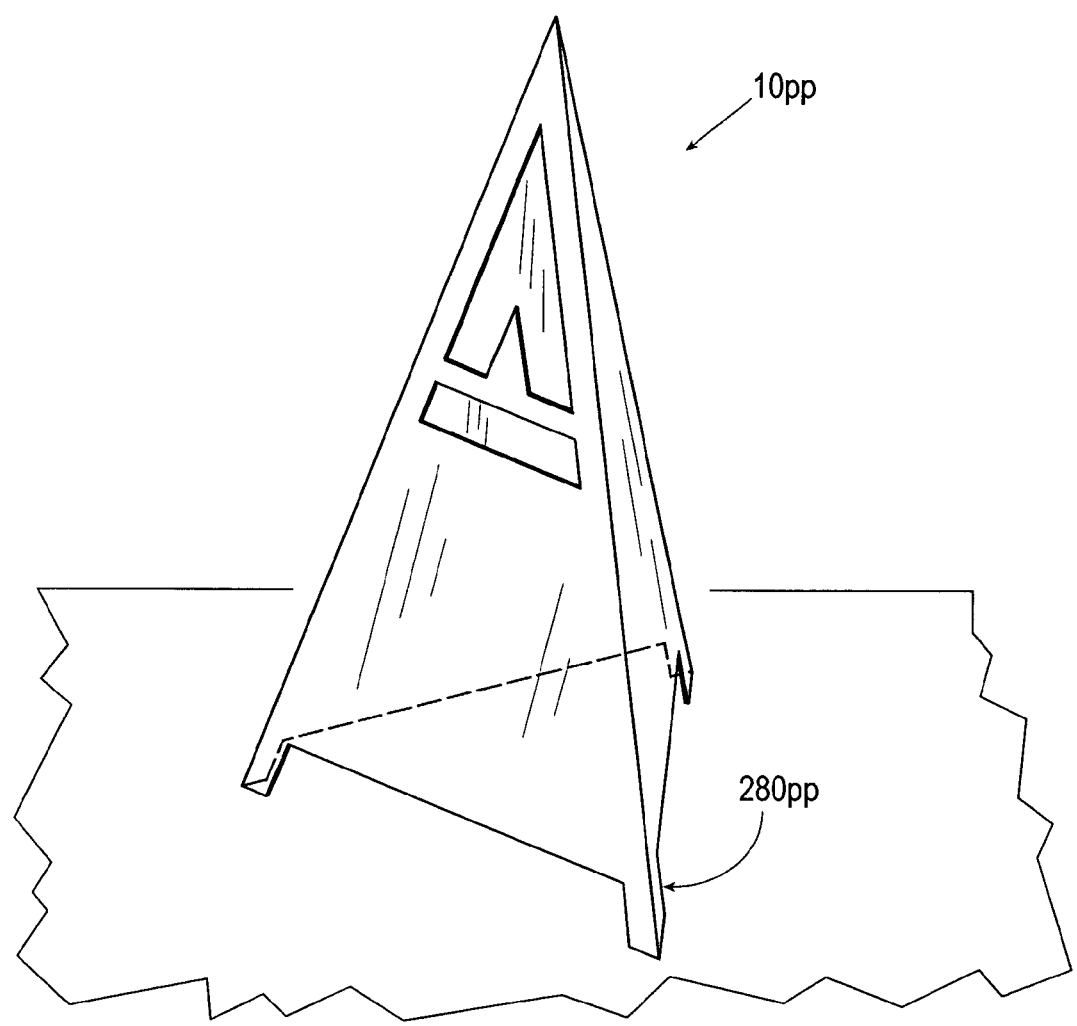
FIG. 16F is a perspective view of another embodiment of the floral easel of the present invention.

It should be understood that in the various embodiments of the floral easel described herein, the floral easel may have multiple portions of the sidewall 40*t*-40*u* removed as shown in FIGS. 12H and 12I, respectively. The removed portions of the sidewall 40*t*-40*u* may serve to allow placement of the floral object therethrough for support of the floral object. Further, the floral easel 10*t*-10*u*, as shown in FIGS. 12H and 12I, includes a support member 50*t*-50*u*, such as a triangular tab, for holding and/or supporting a floral object thereon. It should be understood that the support member 50*t*-50*u* may be any shape and/or size such as, for example, triangular, square, or circular, so long as the support member 50*t*-50*u* is capable of holding and/or supporting the floral object.

It should be understood that the various embodiments of the floral easel described herein may be any shape and/or size. For example, as shown in FIGS. 13A-13E, the floral easel 10*v-z*, respectively, is a five-sided pyramid. Shown in FIGS. 14A-14E, the floral easel 10*aa*-10*ee*, respectively, is a five-sided pyramid having a plurality of leg members 280*aa*-280*ee*. Shown in FIGS. 15A-15E, the floral easel 10*ff*-10*jj* is a three-sided pyramid. Shown in FIGS. 16A-16F, the floral easel 10*kk*-10*pp* is a three-sided pyramid having a plurality of leg members 280*kk*-280*pp*, respectively.

Changes may be made in the construction and operation of the various components, elements and assemblies described herein or in the steps or sequence of steps of the methods described herein without departing from the spirit and scope of the invention as defined in the following claims.

What is claimed:

1. A method of using a floral easel, comprising the steps of:
providing a floral easel for holding a floral object, the floral easel comprising:
at least three legs intersected with one another to define a vertex, each of the at least three legs moveable with respect to one another about the vertex such that the at least three legs are moveable from a collapsed position to an opened position and from an opened position to a collapsed position, in the collapsed position at least a portion of each of the at least three legs disposed substantially adjacent one another, in the opened position at least a portion of each of the at least three legs spaced a distance from each other, and wherein at least two of the at least three legs have a first side and a second side, the second side of the at least two of the at least three legs capable of engaging a substrate;
a bracing assembly capable of holding the at least three legs in the opened position;
a retaining member capable of holding the at least three legs in the collapsed position, the retaining member attached to the bracing assembly; and
a floral object support member capable of holding the floral object on the floral easel, the floral object support member connected to a portion of one of the at least three legs so as to be disposed a distance from the substrate;
disengaging the retaining member from engagement with the at least three legs;
erecting the floral easel to the opened position whereby the second side of the at least two of the at least three legs engage the substrate;
attaching the floral object to the floral object support member; and
displaying the floral object on the floral easel.

2. The method of claim 1 wherein, in the step of providing a floral easel, the retaining member is selected from the group consisting of a hook, a loop, a wire, a bow, a rope, a magnet, a cord, a chain, a strap, a cable, adhesive, elastic, clip, spring, band, shrink material, stretch material, a carton, a tube, a bend in at least one of the leg members, a groove, a slot, and combinations thereof.

3. The method of claim 1 wherein, in the step of erecting the floral easel to the opened position, the at least three legs form a pyramidal configuration.

4. The method of claim 1 wherein, in the step of erecting the floral easel to the opened position, the at least three legs and the bracing assembly form a pyramidal configuration when the floral easel is in the opened position.

5. The method of claim 1 wherein, in the step of providing a floral easel, the at least three legs of the floral easel are formed of a material selected from the group consisting of steel rod, steel wire, aluminum rod, aluminum wire, stainless steel rod, stainless steel wire, plastic material, polymer material, wood, synthetic or man-made materials, natural materials, and combinations thereof.

6. The method of claim 5, wherein the material from which the at least three legs are formed is provided with at least one of a tubular shape, a flat shape and a profile shape.

7. The method of claim 5, wherein at least a portion of the material from which the at least three legs are formed is coated.

8. The method of claim 5, wherein at least a portion of the material from which the at least three legs are formed is anodized.

* * * * *

UNITED STATES PATENT AND TRADEMARK OFFICE
CERTIFICATE OF CORRECTION

PATENT NO. : 7,958,702 B2
APPLICATION NO. : 12/287170
DATED : June 14, 2011
INVENTOR(S) : Donald E. Weder Page 1 of 1

It is certified that error appears in the above-identified patent and that said Letters Patent is hereby corrected as shown below:

Column 22, line 18: After "110f" insert -- of --
Column 23, line 48: After "first side" delete "10g" and replace with -- 100g --
Column 25, line 22: After "second end" delete "10h." and replace with -- 110h. --
Column 32, line 46: After "top portion" delete "121" and replace with -- 121k --

Signed and Sealed this
Second Day of August, 2011

David J. Kappos
*Director of the United States Patent and Trademark Office*